(12) United States Patent
Okada et al.

(10) Patent No.: US 10,891,818 B2
(45) Date of Patent: Jan. 12, 2021

(54) IDENTIFICATION DEVICES, IDENTIFICATION METHODS, IDENTIFICATION PROGRAMS AND COMPUTER READABLE MEDIA INCLUDING IDENTIFICATION PROGRAMS

(71) Applicant: TOPPAN PRINTING CO., LTD., Tokyo (JP)

(72) Inventors: Takashi Okada, Tokyo (JP); Tomohito Masuda, Tokyo (JP); Eri Miyamoto, Tokyo (JP); Kota Aono, Tokyo (JP); Shogo Fujita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 46 days.

(21) Appl. No.: 16/128,046

(22) Filed: Sep. 11, 2018

(65) Prior Publication Data
US 2019/0012868 A1  Jan. 10, 2019

Related U.S. Application Data

(63) Continuation of application No. PCT/JP2017/010198, filed on Mar. 14, 2017.

(30) Foreign Application Priority Data

Mar. 14, 2016 (JP) ................................. 2016-050172
Mar. 14, 2016 (JP) ................................. 2016-050277

(51) Int. Cl.
*G07D 7/128* (2016.01)
*G07D 7/121* (2016.01)
(Continued)

(52) U.S. Cl.
CPC ............ *G07D 7/128* (2013.01); *B42D 25/30* (2014.10); *B42D 25/328* (2014.10); *B42D 25/36* (2014.10);
(Continued)

(58) Field of Classification Search
CPC .......... G07F 7/086; G06K 9/00; G07D 7/124; G07D 7/00
See application file for complete search history.

(56) References Cited

U.S. PATENT DOCUMENTS

| | | | |
|---|---|---|---|
| 2004/0078299 A1* | 4/2004 | Down-Logan | G06Q 30/02 705/26.1 |
| 2014/0279516 A1 | 9/2014 | Rellas et al. | |
| 2015/0116530 A1 | 4/2015 | Lau et al. | |

FOREIGN PATENT DOCUMENTS

| | | |
|---|---|---|
| JP | 3865763 B2 | 10/2006 |
| WO | WO-2015/044051 | 4/2015 |
| WO | WO-2015/052318 A | 4/2015 |

OTHER PUBLICATIONS

Jegnaw Fentahun Zeggeye, "Automatic Recognition and Counterfeit Detection of Ethiopian Paper Currency", Feb. 2016,MECS (Year: 2016).*

(Continued)

*Primary Examiner* — Maurice C Smith
(74) *Attorney, Agent, or Firm* — Foley & Lardner LLP

(57) ABSTRACT

An identification device according to the present invention that performs authenticity determination of an article provided with an anti-counterfeiting medium whose observed light pattern changes depending on an observation angle includes a similarity calculating unit that calculates a degree of similarity between captured image data of the anti-counterfeiting medium and reference image data; an authenticity determination unit that performs authenticity determination as to whether the anti-counterfeiting medium is genuine or not on the basis of whether the degree of similarity exceeds a predetermined threshold or not; and a match-percentage notification unit that notifies a match-percentage indicative of a degree of match between an imaging viewpoint for imaging the anti-counterfeiting (Continued)

medium and a reference imaging viewpoint which is predefined as the imaging viewpoint for the captured image data used for authenticity determination.

15 Claims, 32 Drawing Sheets

(51) Int. Cl.
*B42D 25/328* (2014.01)
*B42D 25/30* (2014.01)
*B42D 25/36* (2014.01)
*G07D 7/202* (2016.01)
*G06K 9/20* (2006.01)

(52) U.S. Cl.
CPC ......... *G06K 9/2018* (2013.01); *G06K 9/2027* (2013.01); *G06K 9/2036* (2013.01); *G07D 7/121* (2013.01); *G07D 7/202* (2017.05)

(56) References Cited

OTHER PUBLICATIONS

Extended European Search Report dated Oct. 25, 2019 for corresponding Application No. 17766679.9 (9 pages).
International Search Report regarding International Application No. PCT/JP2017/010198, dated Apr. 11, 2017, 2 pps.

* cited by examiner

| CAPTURED IMAGE DATA IDENTIFICATION INFORMATION | OBSERVATION ANGLE | OBSERVATION POSITION | CAPTURED IMAGE DATA ADDRESS |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

FIG.14

| DETERMINATION IMAGE DATA IDENTIFICATION INFORMATION | CAPTURED IMAGE DATA IDENTIFICATION INFORMATION | REFERENCE IMAGE DATA ADDRESS | DEGREE OF SIMILARITY |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

| CAPTURED IMAGE DATA IDENTIFICATION INFORMATION | OBSERVATION ANGLE | OBSERVATION POSITION | CAPTURED IMAGE DATA ADDRESS |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

| DETERMINATION IMAGE DATA IDENTIFICATION INFORMATION | CAPTURED IMAGE DATA IDENTIFICATION INFORMATION | REFERENCE IMAGE DATA ADDRESS | DEGREE OF SIMILARITY |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

IDENTIFICATION DEVICES, IDENTIFICATION METHODS, IDENTIFICATION PROGRAMS AND COMPUTER READABLE MEDIA INCLUDING IDENTIFICATION PROGRAMS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/010198, filed on Mar. 14, 2017, which is based upon and claims the benefit of priority to Japanese Patent Application Nos. 2016-050172 and 2016-050277, both filed on Mar. 14, 2016. The disclosures of which are all hereby incorporated herein by reference in their entireties.

TECHNICAL FIELD

The present invention relates to identification devices, identification methods, identification programs and computer readable media including identification programs used for authenticity determination against forgery of valuable securities such as gift vouchers, credit cards, brand goods, and equipment components.

BACKGROUND ART

In order to prevent illegal use of products by forgery or copying, anti-counterfeiting media have been used for valuable securities such as banknotes, stock certificates, gift vouchers, and credit cards, as well as products such as pharmaceutical products, food products, and high-class brand products. The anti-counterfeiting media are directly printed or transferred on valuable securities. Further, sealing stickers or tags provided with an anti-counterfeiting medium are attached on products.

In recent years, however, there have been produced illegal valuable securities or products provided with forged or copied anti-counterfeiting media, which makes it difficult to distinguish authentic products from non-authentic products (fake or copied products) only relying on the presence of anti-counterfeiting media.

Examples of the anti-counterfeiting media include diffraction gratings and holograms whose color or pattern changes depending on the observation angle at which the anti-counterfeiting medium is observed. There are other known examples of the anti-counterfeiting medium, which include optically variable device (OVD) ink and a pearl pigment whose color or brightness changes.

Whether the anti-counterfeiting medium itself is genuine or not can be easily verified by comparison between a genuine anti-counterfeiting medium and a forged anti-counterfeiting medium, or visual inspection by an expert. However, authenticity determination of an anti-counterfeiting medium by visual inspection is difficult for general users.

In the case where it is difficult to perform authenticity determination of an anti-counterfeiting medium by visual inspection, dedicated authenticity determination devices (e.g., refer to PTL 1) that precisely control an observation angle of an imaging device observing the anti-counterfeiting medium are used.

However, handling of the dedicated authenticity determination devices requires specialized knowledge or special tools. Therefore, it is difficult for general users to perform authenticity determination of the anti-counterfeiting medium by using such authenticity determination devices.

In addition, in determining authenticity of an anti-counterfeiting medium whose observed pattern optically changes at each predetermined observation angle, the optical change of the pattern is different depending on the observation angle. Hence, it is necessary to estimate the observation angle, which indicates an imaging direction of the imaging device observing the anti-counterfeiting medium. In estimation of the observation angle, a gyro sensor incorporated in the image capturing device has been commonly used.

There is a known method of determining authenticity of an anti-counterfeiting medium, in which an observation angle estimated by the gyro sensor together with information on the captured image of the anti-counterfeiting medium for authenticity determination is inputted into an identification program.

CITATION LIST

Patent Literature PTL 1: JP 3865763 B2

SUMMARY OF THE INVENTION

Technical Problem

However, in the above authenticity determination device, the user cannot sufficiently recognize whether the determination algorithm is being performed and thus the authenticity determination is being performed by using an image of the anti-counterfeiting medium imaged at an observation angle suitable for authenticity determination.

As a consequence, while moving the imaging device to capture an image of the anti-counterfeiting medium, the user cannot determine whether the imaging device is at an imaging viewpoint position suitable for imaging for the authenticity determination.

Further, there is another method in which an outline of the anti-counterfeiting medium is displayed on the screen of the imaging device, prompting the user to image the imaging target so that the anti-counterfeiting medium of the imaging target overlaps this outline to thereby image the anti-counterfeiting medium at a predetermined angle.

This method, however, still does not allow for smooth authenticity determination, because it is burdensome for the user to overlap the anti-counterfeiting medium of the imaging target with the outline and the user cannot intuitively recognize whether the imaging algorithm for the anti-counterfeiting medium is being performed. As a consequence, the user cannot recognize whether the authenticity determination using the captured image is actually in progress until the result of the authenticity determination of the anti-counterfeiting medium imaged by the user is outputted.

Accordingly, the user may be uncertain about the progress of an authenticity determination process such as whether the authenticity determination application is being performed correctly or not due to a failure in imaging by the user. This hinders smooth operation of authenticity determination.

In addition, the user cannot sufficiently recognize whether the determination algorithm is being performed and thus the authenticity determination is being performed by using an image of the anti-counterfeiting medium imaged at a suitable observation angle. As a consequence, while moving the imaging device to capture an image of the anti-counterfeiting medium, the user cannot recognize whether the authenticity determination using the captured image is actually in progress until the result of the authenticity determination is outputted.

Accordingly, the user may be concerned about the progress of the authenticity determination process such as whether the authenticity determination application is being performed correctly or not due to a failure in imaging by the user. This hinders smooth operation of the authenticity determination.

The present invention has been made in light of the aforementioned circumstances, and provides an identification device, an identification method, an identification program, and a computer readable medium which include the identification program that do not require use of any conventional dedicated authenticity determination device and indicates the progress of the authenticity determination process, allowing a user to more easily and intuitively recognize the progress of the process and smoothly perform the authenticity determination even if the user does not necessarily recognize whether the determination algorithm for the authenticity determination is being performed.

The present invention has been made in light of the aforementioned circumstances, and provides an identification device, an identification method, an identification program, and a computer readable medium which includes the identification program that do not require use of any conventional dedicated authenticity determination device and allow a user to smoothly perform authenticity determination without being concerned about the process of the authenticity determination even if the user does not sufficiently recognize whether the determination algorithm for the authenticity determination is being performed.

Solution to Problem

In order to improve or even solve the above problem, according to a first aspect of the present invention, an identification device is provided that performs an authenticity determination of an article provided with an anti-counterfeiting medium whose observed light pattern changes depending on an observation angle, the identification device including: a similarity calculating unit that calculates a degree of similarity between captured image data of the anti-counterfeiting medium and reference image data; an authenticity determination unit that performs authenticity determination as to whether the anti-counterfeiting medium is genuine or not on the basis of whether the degree of similarity exceeds a predetermined threshold or not; and a match-percentage notification unit that notifies a match-percentage indicative of a degree of match between an imaging viewpoint for imaging the anti-counterfeiting medium and a reference imaging viewpoint which is predefined as the imaging viewpoint for the captured image data used for authenticity determination.

In the identification device according to the first aspect of the present invention, the match-percentage notification unit may calculate the match-percentage on the basis of an imaging angle difference and a coordinate value difference, which are differences between an imaging angle and an imaging device coordinate value of the imaging viewpoint and a reference imaging angle and a reference imaging device coordinate value of the reference imaging viewpoint, respectively, in a three-dimensional coordinate system.

In the identification device according to the first aspect of the present invention, the match-percentage notification unit may calculate and notify the match-percentage of the imaging viewpoint for each reference imaging viewpoint, as well as a captured percentage of the captured image data which is required for authenticity determination.

The identification device according to the first aspect of the present invention may further include a reference image generation unit that generates the reference image data corresponding to the predefined reference imaging viewpoint, the reference image data being used for comparison with the captured image data in which the anti-counterfeiting medium is captured.

In the identification device according to the first aspect of the present invention, the authenticity determination unit may use a frame image corresponding to the reference imaging viewpoint of the reference image data as the captured image data from among frame images in a video of the anti-counterfeiting medium.

The identification device according to the first aspect of the present invention may further include a display unit that displays an image corresponding to the captured image data, wherein the match-percentage notification unit displays a match-percentage indicator indicative of the match-percentage on a screen of the display unit to notify the match-percentage.

According to a second aspect of the present invention, an identification method is provided for performing authenticity determination of an article provided with an anti-counterfeiting medium whose observed light pattern changes depending on an observation angle, the method including: calculating a degree of similarity between captured image data of the anti-counterfeiting medium and reference image data, the degree of similarity being calculated by a similarity calculating unit; performing authenticity determination as to whether the anti-counterfeiting medium is genuine or not on the basis of whether the degree of similarity exceeds a predetermined threshold or not, the authenticity determination being performed by an authenticity determination unit; and notifying a match-percentage indicative of a degree of match between an imaging viewpoint for imaging the anti-counterfeiting medium and a reference imaging viewpoint which is predefined as the imaging viewpoint for the captured image data used for authenticity determination, the match-percentage being notified by a match-percentage notification unit.

According to a third aspect of the present invention, an identification program is provided for causing a computer to execute an identification method for performing authenticity determination of an article provided with an anti-counterfeiting medium whose observed light pattern changes depending on an observation angle, the identification program including instructions to cause the computer to perform the identification method including: calculating a degree of similarity between captured image data of the anti-counterfeiting medium and reference image data; performing authenticity determination as to whether the anti-counterfeiting medium is genuine or not on the basis of whether the degree of similarity exceeds a predetermined threshold or not; and notifying a match-percentage indicative of a degree of match between an imaging viewpoint for imaging the anti-counterfeiting medium and a reference imaging viewpoint which is predefined as the imaging viewpoint for the captured image data used for authenticity determination.

According to a fourth aspect of the present invention, a computer readable medium is provided including an identification program for causing a computer to execute an identification process for performing authenticity determination of an article provided with an anti-counterfeiting medium whose observed light pattern changes depending on an observation angle, the medium including instructions to cause the computer to perform: calculating a degree of similarity between captured image data of the anti-counterfeiting medium and reference image data; performing authenticity determination as to whether the anti-counterfeiting medium is genuine or not on the basis of whether the degree of similarity exceeds a predetermined threshold or not; and notifying a match-percentage indicative of a degree of match between an imaging viewpoint for imaging the anti-counterfeiting medium and a reference imaging viewpoint which is predefined as the imaging viewpoint for the captured image data used for the authenticity determination.

According to a fifth aspect of the present invention, an identification device is provided that performs authenticity determination of an article provided with an anti-counterfeiting medium whose observed light pattern changes depending on an observation angle, the identification device including: a similarity calculating unit that calculates a degree of similarity between captured image data of the anti-counterfeiting medium and reference image data; an authenticity determination unit that performs an authenticity determination as to whether the anti-counterfeiting medium is genuine or not on the basis of whether the degree of similarity exceeds a predetermined threshold or not; and a progress notification unit that calculates and notifies a degree of progress, which is a ratio of a completed number of authenticity determinations to a predetermined number of authenticity determinations to thereby indicate a progress state of the authenticity determination.

In the identification device according to the fifth aspect of the present invention, the progress notification unit calculates a degree of progress as a ratio of the number of pieces of captured image data which are determined to be "genuine" with respect to a predetermined reference image data to a predetermined number of pieces of reference image data.

In the identification device according to the fifth aspect of the present invention, the reference image data may be obtained for each predetermined imaging angle, and the degree of progress may be calculated including the number of pieces of captured image data captured at an imaging angle corresponding to the predetermined imaging angle.

The identification device according to the fifth aspect of the present invention may further include a reference image generation unit that generates the reference image data corresponding to the predefined imaging viewpoint, the reference image data being used for comparison with the captured image data in which the anti-counterfeiting medium is captured.

In the identification device according to the fifth aspect of the present invention, the authenticity determination unit may use a frame image corresponding to the imaging viewpoint of the reference image data as the captured image data from among frame images in a video of the anti-counterfeiting medium.

The identification device according to the fifth aspect of the present invention may further include a display unit that displays an image corresponding to the captured image data, wherein the progress notification unit displays a progress indicator indicative of the degree of progress on a screen of the display unit to notify the degree of progress.

According to a sixth aspect of the present invention, an identification method is provided for performing authenticity determination of an article provided with an anti-counterfeiting medium whose observed light pattern changes depending on an observation angle, the method including: calculating a degree of similarity between captured image data of the anti-counterfeiting medium and reference image data, the degree of similarity being calculated by a similarity calculating unit; performing authenticity determination as to whether the anti-counterfeiting medium is genuine or not on the basis of whether the degree of similarity exceeds a predetermined threshold or not, the authenticity determination being performed by an authenticity determination unit; and calculating and notifying a degree of progress, which is a ratio of a completed number of authenticity determinations to a predetermined number of authenticity determinations to thereby indicate a progress state of the authenticity determination, the progress being notified by a progress notification unit.

According to a seventh aspect of the present invention, an identification program is provided for causing a computer to execute an identification method for performing authenticity determination of an article provided with an anti-counterfeiting medium whose observed light pattern changes depending on an observation angle, the identification program including instructions to cause the computer to perform the identification method comprising: calculating a degree of similarity between captured image data of the anti-counterfeiting medium and reference image data; performing authenticity determination as to whether the anti-counterfeiting medium is genuine or not on the basis of whether the degree of similarity exceeds a predetermined threshold or not; and calculating and notifying a degree of progress, which is a ratio of a completed number of authenticity determinations to a predetermined number of authenticity determinations to thereby indicate a progress state of the authenticity determination.

According to an eighth aspect of the present invention, a computer readable medium is provided including an identification program for causing a computer to execute an identification process for performing authenticity determination of an article provided with an anti-counterfeiting medium whose observed light pattern changes depending on an observation angle, the medium including instructions to cause the computer to perform the identification process comprising: calculating a degree of similarity between captured image data of the anti-counterfeiting medium and reference image data; performing authenticity determination as to whether the anti-counterfeiting medium is genuine or not on the basis of whether the degree of similarity exceeds a predetermined threshold or not; and calculating and notifying a degree of progress, which is a ratio of a completed number of authenticity determinations to a predetermined number of authenticity determinations to thereby indicate a progress state of the authenticity determination.

Desired Advantageous Effect of the Invention

As described above, the first to fourth aspects of the present invention can provide an identification device, an identification method, an identification program, and a computer readable medium which include the identification program that does not require use of any conventional dedicated authenticity determination device and indicates the progress of the authenticity determination process, allowing a user to more easily and intuitively recognize the progress of the process and smoothly perform the authenticity determination even if the user does not necessarily recognize whether the determination algorithm for the authenticity determination is being performed.

As described above, the fifth to eighth aspects of the present invention can provide an identification device, an identification method, an identification program, and a computer readable medium which includes the identification program that do not require use of any conventional dedicated authenticity determination device and allow a user to smoothly perform authenticity determination without being concerned about the process of authenticity determination even if the user does not sufficiently recognize whether the determination algorithm for the authenticity determination is being performed.

BRIEF DESCRIPTION OF THE DRAWINGS

FIG. 14 is a diagram which illustrates a configuration example of a captured image data table for authenticity determination in the image data storage unit 113.

DESCRIPTION OF REPRESENTATIVE EMBODIMENTS

Figure 1:
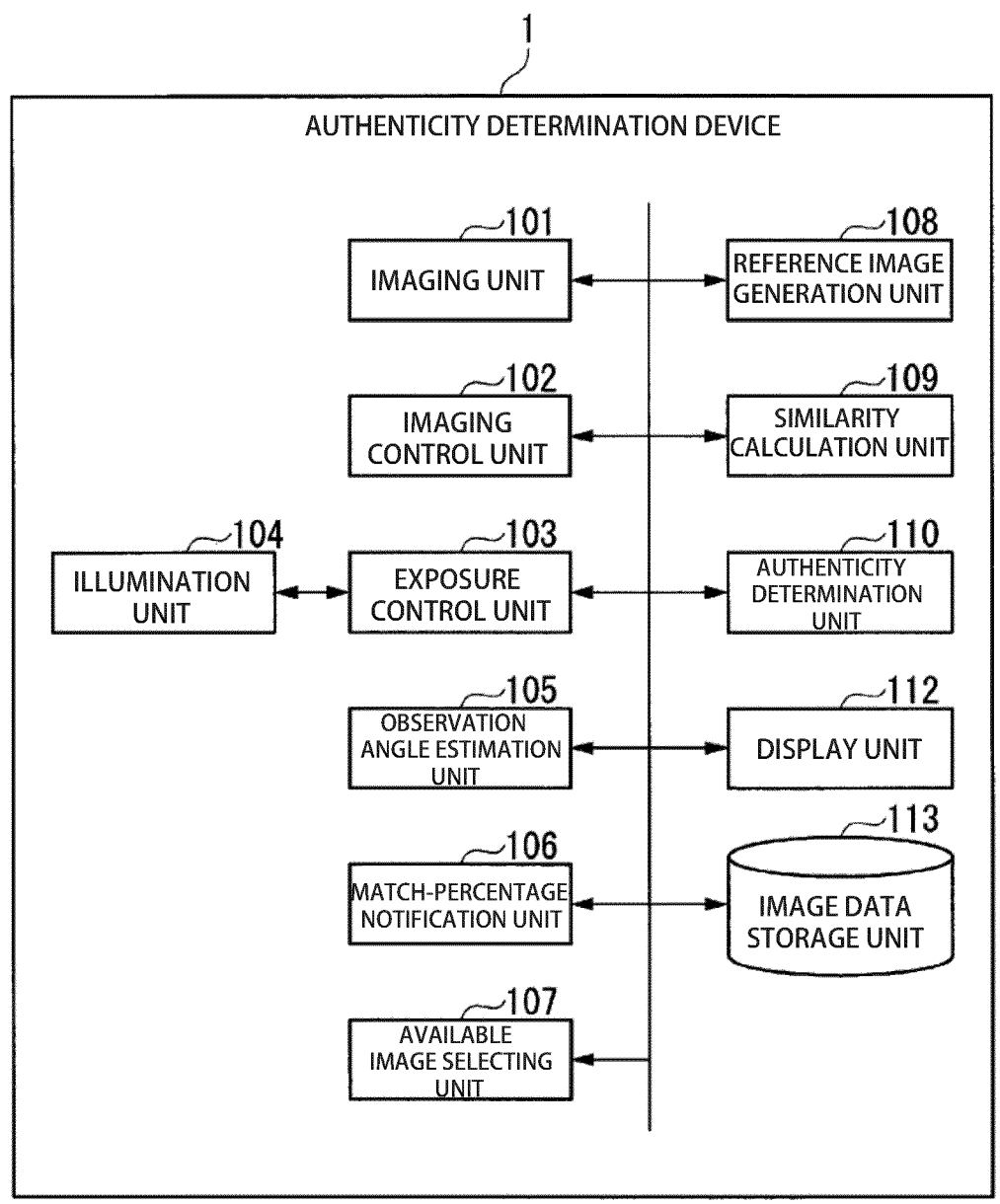
FIG. 1 is a block diagram which illustrates a configuration example of an identification device according to a first embodiment.

With reference to the drawings, preferred or representative embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. In the drawings and embodiment descriptions, the same or corresponding components are denoted by the same reference characters, and duplicate description thereof will be omitted.

First Embodiment

With reference to the drawings, a first embodiment of the present invention will be described.

FIG. 1 is a block diagram which illustrates a configuration example of an identification device (authenticity determination device) according to a first embodiment. In FIG. 1, an authenticity determination device 1 includes an imaging unit 101, an imaging control unit 102, an exposure control unit 103, an illumination unit 104, an observation angle estimation unit 105, a match-percentage notification unit 106, an available image selecting unit 107, a reference image generation unit 108, a similarity calculation unit 109, an authenticity determination unit 110, a display unit 112, and an image data storage unit 113. In the identification device according to the first embodiment, the imaging unit 101 and the illumination unit 104 are integrated to provide a configuration corresponding to authenticity determination of retroreflective anti-counterfeiting media.

The imaging unit 101 may be a camera including a CCD (charge coupled device) or a CMOS (complementary metal oxide semiconductor) image sensor. The imaging unit 101 is configured to capture an image of a target object, and write and store the captured image as captured image data in the image data storage unit 113.

The imaging control unit 102 controls imaging conditions of the imaging unit 101, including a depth of focus and an imaging element sensitivity (International Organization for Standardization (ISO) sensitivity) when the imaging unit 101 captures image data, which is an image of a light pattern (color of light (wavelength) or an image of letters or pictures) emitted from the anti-counterfeiting medium in response to the incident light.

The exposure control unit 103 controls imaging conditions of the imaging unit 101 in exposure, including a shutter speed, an aperture value, the presence or absence of illumination light, and illumination light intensity. Moreover, the exposure control unit 103 is configured to output a light emission instruction to the illumination unit 104 to emit imaging light (illumination light) as required during imaging according to the brightness around the anti-counterfeiting medium to be imaged by the authenticity determination device 1.

The illumination unit 104 is not limited to general illumination which continuously irradiates an imaging target with light, but also may be a light emission device called an electronic flash or Strobe (registered trademark) which irradiates the imaging target with light for a short period of time. The illumination unit 104 irradiates the imaging target with a predetermined intensity of light in response to the light emission instruction from the exposure control unit 103. Here, the imaging control unit 102 supplies a control signal indicative of an imaging timing to the exposure control unit 103. Accordingly, in response to the control signal supplied from the imaging control unit 102 for indicating an imaging timing, the exposure control unit 103 outputs a light emission instruction to the illumination unit 104 to emit illumination light for illuminating the anti-counterfeiting medium as described above.

The observation angle estimation unit 105 is configured to calculate an imaging viewpoint from a coordinate conversion equation (described later). The imaging viewpoint is information including an imaging position (imaging coordinate value), which is a position at which the image data of the anti-counterfeiting medium are captured in a three-dimensional space, and an imaging direction (imaging angle) of the imaging unit 101. That is, the observation angle estimation unit 105 calculates a coordinate position of the anti-counterfeiting medium 400 and an imaging coordinate value of the imaging unit 101 from the captured image data, and thus calculates an imaging angle of the imaging unit 101 relative to the anti-counterfeiting medium 400 which is captured for deriving image data. Thus, the imaging viewpoint (a set of imaging coordinate value and imaging angle) is obtained.

The observation angle estimation unit 105 writes and stores the captured image data information including the imaging viewpoint obtained as above, together with captured image data identification information added to the captured image data for identification of the captured image data, in a captured image data table of the image data storage unit 113. This observation angle causes a difference in the pattern of observed light when emitted from the anti-counterfeiting medium in response to the incident light.

In the present embodiment, one or more pieces of the anti-counterfeiting medium are imaged by the imaging unit 101 with a predetermined focal length. In capturing multiple pieces of the image data, the image data needs to be captured with different observation angles among the pieces of the captured image data. On the basis of these one or more pieces of the captured image data, the observation angle estimation unit 105 estimates the observation angle of each piece of the captured image data of the anti-counterfeiting medium in the three-dimensional space by using a predetermined coordinate conversion equation as described above.

The coordinate conversion equation used herein is an equation generated in such a manner that a pixel position in the two-dimensional coordinate in each piece of the captured image data and a coordinate position in the three-dimensional space are correlated to each other when the three-dimensional space is reproduced from multiple pieces of the captured image data (the captured image data of a calibration board, which is described later) in advance as a pre-process for authenticity determination (preparation for authenticity determination) of the anti-counterfeiting medium provided in an authenticity determination object. The pre-generated coordinate conversion equation is written and stored in the image data storage unit 113 in advance for the authenticity determination object or for each authenticity determination object.

Figures 2, 3:
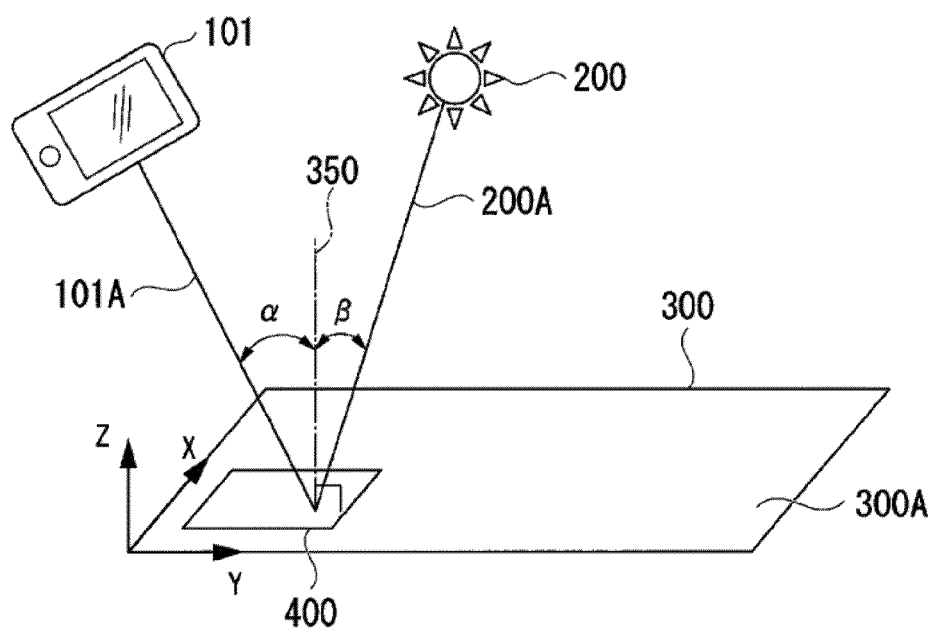
FIG. 2 is a diagram which illustrates a configuration example of a captured image data table in an image data storage unit 113.
FIG. 3 is a diagram which illustrates an observation angle at which an anti-counterfeiting medium is observed by the imaging unit 101.

FIG. 2 is a diagram which illustrates a configuration example of a captured image data table in the image data storage unit 113. In the captured image data table shown in FIG. 2, pieces of captured image data identification information, imaging coordinate values (observation positions) and imaging angles (observation angles), which are imaging viewpoints of the captured image data corresponding to the respective pieces of captured image data identification information, and captured image data addresses are written and stored.

The captured image data identification information refers to information for identifying the captured image data.

The imaging angle (observation angle) refers to, for example, an angle formed between the imaging direction of the imaging unit 101 located at the imaging coordinate value when capturing the image data and the line normal to the surface of the anti-counterfeiting medium, where an authenticity determination object is placed in a coordinate system of a three-dimensional space (hereinafter referred to as a three-dimensional coordinate system) with the origin being at any one of vertices or coordinate points of the authenticity determination object. The imaging coordinate value (observation position) refers to a coordinate position at which the imaging unit 101 captures an image of the authenticity determination object in the three-dimensional space. The captured image data address refers to an address pointing to a region including each captured image data stored in the image data storage unit 113 and serves as an index of the captured image data when it is read out.

FIG. 3 is a diagram which illustrates the observation angle of the imaging unit 101 relative to the anti-counterfeiting medium. In FIG. 3, the anti-counterfeiting medium 400 is used to prevent forgery and copying of articles, including banknotes, stock certificates, and notes such as gift vouchers, valuable securities such as credit cards, products such as pharmaceutical products, food products and high-class brand products. The anti-counterfeiting medium 400 is directly printed or transferred onto the notes or valuable securities, or printed or transferred onto sealing stickers or tags attached to products (or packages of products).

In FIG. 3, the anti-counterfeiting medium 400 is provided on the surface 300A of a credit card 300. Examples of the anti-counterfeiting medium 400 according to the present embodiment include a diffraction grating or a hologram whose color or pattern changes depending on the observation angle, and may be formed using optically variable device (OVD) ink or a pearl pigment whose color or brightness changes depending on the observation angle. A light source (also referred to as illumination) 200 is configured to irradiate the anti-counterfeiting medium 400 with imaging light at the irradiation angle β, which is an angle formed between a light irradiation direction 200A and a normal line 350. With the supply of the imaging light, the anti-counterfeiting medium emits light of a predetermined pattern. The light pattern emitted from the anti-counterfeiting medium in response to the irradiation light depends on the observation angle α and the irradiation angle β.

The normal line 350 is a line normal to the plane of the surface 300A of the credit card 300. The observation angle α is an angle formed between an imaging direction 101A of the imaging unit 101 and the normal line 350. Here, the observation angle estimating unit 105 positions the credit card 300 in a three-dimensional space in which the Z-axis is taken as a direction parallel with the normal line 350, and the X-axis and Y-axis are taken as directions parallel with each side of the credit card. For example, the credit card 300 is positioned in a two-dimensional plane including the X-axis and the Y-axis such that any of the vertices formed by the sides of the credit card 300 corresponds to the origin O of the three-dimensional coordinate system. Hence, the thickness direction of the credit card 300 is parallel with the Z-axis. The three-dimensional shape of the credit card 300 is written and stored in the image data storage unit 113 in advance as known information, together with the coordinate conversion equation described above.

The anti-counterfeiting medium 400 will be detailed below.

The anti-counterfeiting medium 400 may be a hologram or the like, which emits various types of diffracted light according to the diffraction structure. In this case, various types of holograms such as reflection, transmission, phase, and volume holograms can be used.

The following description will be made particularly on the example of relief structure having uneven structure.

Figure 4:
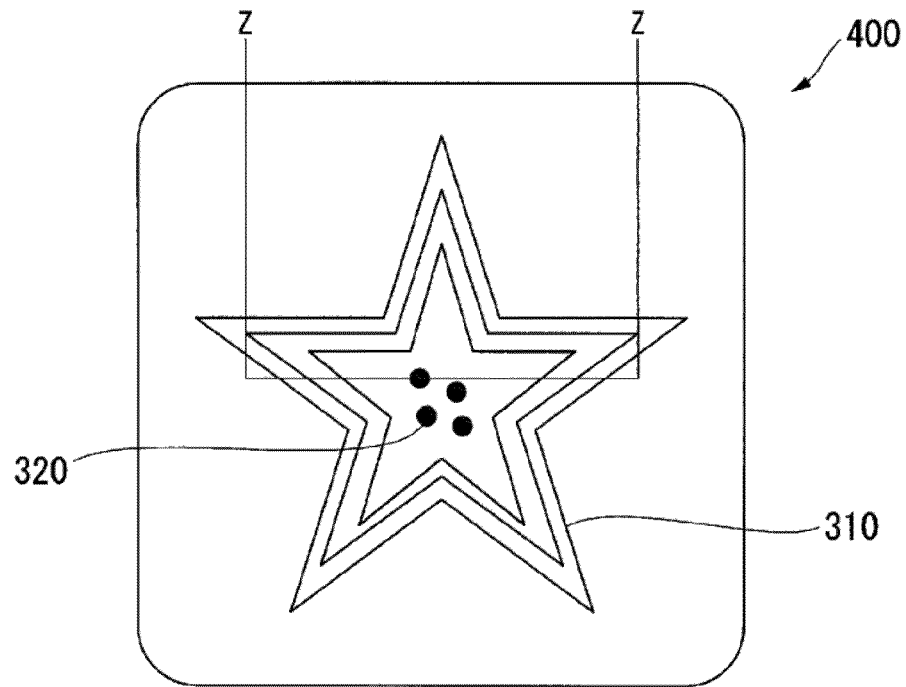
FIG. 4 is a schematic plan view of an anti-counterfeiting medium according to the first embodiment.
Figure 5:
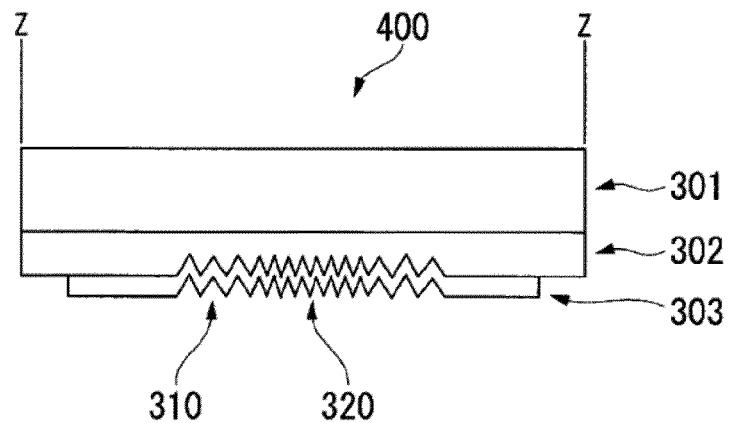
FIG. 5 is a schematic cross-sectional view of the anti-counterfeiting medium taken along the line Z-Z in FIG. 4.

Methods for forming uneven structures such as a first uneven structure 310 and a second uneven structure 320 which are formed in a relief structure forming layer 302 as shown in FIGS. 4 and 5 include various techniques such as radiation curable molding, extrusion molding and thermal press molding using a metal stamper or the like.

The first uneven structure 310, having a groove-shaped structure including bumps and recesses, may have an uneven structure such as a relief diffraction grating structure or a directional scattering structure having a plurality of regions in which a plurality of linear-shaped bumps and recesses are arrayed in the same direction such that the plurality of regions of mutually different directions are combined with each other.

In general, most diffraction gratings typically used for displays have spatial frequencies in the range from 500 to 1600/mm so that different colors can be displayed to a user observing from a certain direction according to the spatial frequency or the direction of the diffraction grating.

Figure 8:
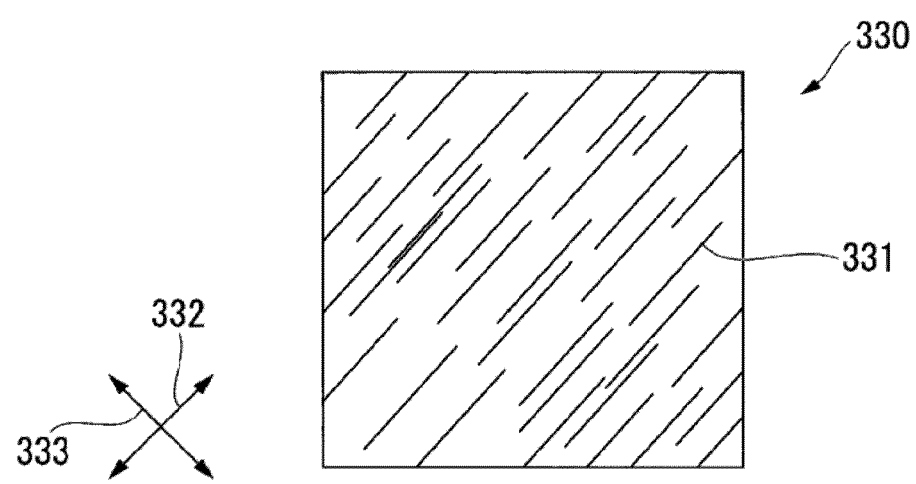
FIG. 8 is a perspective view which illustrates an example of a first uneven structure of the anti-counterfeiting medium according to the first embodiment.

On the other hand, the directional scattering structure shown in FIG. 8 includes a plurality of light scattering structures 331 having a constant orientation direction 332 in a particular segment or cell. The light scattering structures 331 are each in a straight shape, and arrayed substantially parallel with each other in a particular segment or cell.

The light scattering structures 331 may not necessarily be fully parallel with each other, and a longitudinal direction of some of the light scattering structures 331 and a longitudinal direction of other ones of the light scattering structures 331 may intersect with each other as long as the regions of the directional scattering structure 330 have scattering ability with sufficient anisotropy.

According to the above structure, when the region formed of the directional scattering structure 330 is observed from the front with light irradiated from an oblique direction perpendicular to the orientation direction 332, the region appears relatively bright due to the high scattering ability.

On the other hand, when the region including the directional scattering structure 330 is observed from the front with light irradiated from an oblique direction perpendicular to a light scattering axis 333, the region appears relatively dark due to low scattering ability.

Accordingly, in the segment or cell including the light scattering structures 331, any orientation direction 332 may be determined for each segment or cell to provide a pattern formed of a combination of relatively bright parts and relatively dark parts, and reversing of light and dark parts is observed by changing the observation position or light irradiation position.

The above first uneven structure 310 can be formed of, but not limited to, a single or composite structure of the above relief diffraction grating structure or directional scattering structure.

Figure 6:
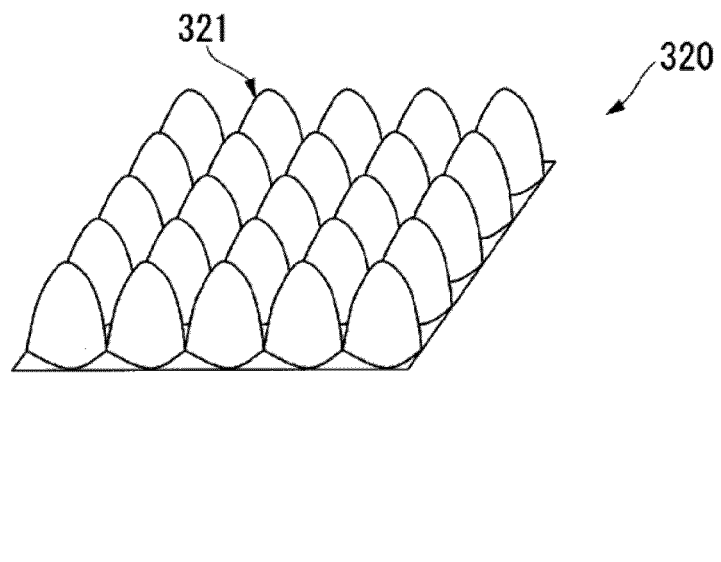
FIG. 6 is a perspective view which illustrates an example of a second uneven structure of the anti-counterfeiting medium according to the first embodiment.

Further, FIG. 6 shows a perspective view of an example of a structure that can be applied to the second uneven structure 320.

The second uneven structure 320 shown in FIG. 6 includes a plurality of bumps 321.

Although the second uneven structure 320 is formed solely by the bumps 321, this is merely an example. The second uneven structure 320 of the present embodiment can also be formed by a plurality of recesses.

In the present embodiment, each recess or bump on the second uneven structure 320 preferably has a surface area 1.5 times larger than the footprint required for each recess or bump when disposed on the surface of the relief structure forming layer 302.

When the surface area of each recess or bump is at least 1.5 times larger than the footprint, favorable low reflectivity and low scattering properties can be obtained. This is because the second uneven structure 320 exhibits a color tone obviously different from that of the first uneven structure, and can be readily recognized when imaged by the imaging unit 101. On the other hand, when the surface area of each recess or bump is less than 1.5 times the footprint, the reflectivity is increased, which is not favorable.

Further, the plurality of bumps or recesses in the second uneven structure 320 formed in the relief structure formed layer 302 preferably has a forward tapered shape.

The forward tapered shape refers to a shape having a cross-sectional area of the bumps or recesses, measured parallel with the substrate surface, decreasing from the proximal end to the distal end of the bumps or recesses. More specifically, the forward tapered shape may be conical, pyramid, elliptical, columnar or cylindrical, prismatic or rectangular cylindrical, truncated conical, truncated pyramid, or truncated elliptical shapes, a shape where cone is adjoined to column or cylinder, or a shape where a pyramid is adjoined to a prism or rectangle, hemisphere, semi-ellipsoid, bullet, or round-bowl shape.

Figure 7:
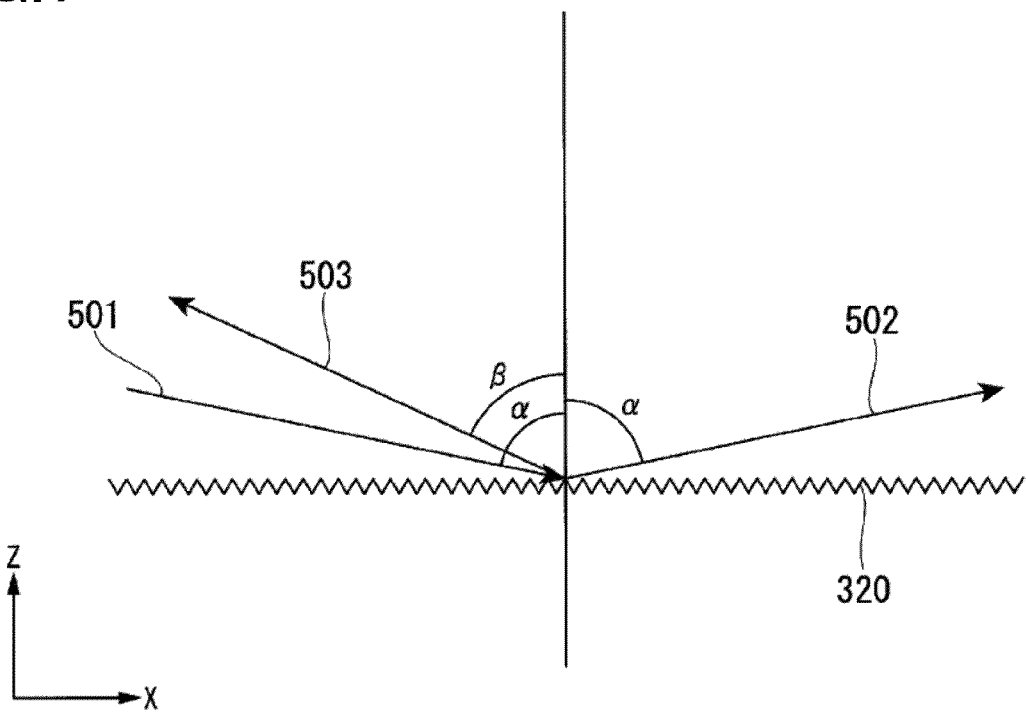
FIG. 7 is a schematic view which illustrates the second uneven structure emitting diffracted light.

FIG. 6 shows an example where the second uneven structure 320 has a constant center distance between adjacent bumps or recesses. As shown in FIG. 7, when light is irradiated to the second uneven structure 320, the second uneven structure 320 emits diffracted light in a specific direction relative to the travel direction of an incident light 501.

In general, the diffracted light can be represented by the following expression:

$$d(\sin \alpha \pm \sin \beta) = n\lambda \tag{1}$$

In equation (1), d represents the center distance between the bumps or recesses, and $\lambda$ represents the wavelengths of the incident light and the diffracted light. Moreover, $\alpha$ represents the incident angle of the incident light, and $\beta$ represents the emission angle of the diffracted light. Further, n represents an order. Since the most representative diffracted light is primary diffracted light, it can be considered that n=1 is satisfied.

The incidence angle $\alpha$ may be the same as the emission angle of zero order diffracted light, that is, regular reflected light. For parameters $\alpha$ and $\beta$, the positive direction is defined as a clockwise direction with respect to the direction normal to the display, that is, the Z axis shown in FIG. 5. Hence, equation (1) can be transformed as below:

$$d(\sin \alpha - \sin \beta) = \lambda \tag{2}$$

Thus, when the center distance d between the bumps or recesses, and the incident angle $\alpha$, that is, the incident angle of zero order diffracted light are constant, the emission angle $\beta$ of a primary diffracted light 503 changes according to the wavelength $\lambda$ as clearly seen from equation (2). Therefore, in the case where the illumination light is white, the color imaged by the imaging unit 101 changes with the change of the observation angle relative to the uneven structure.

The second uneven structure 320 has a forward tapered shape having the center distance of 400 nm or less between the bumps or recesses. Accordingly, the image appears almost black when captured in the normal direction. However, under a specific condition, that is, an environment where the incident angle α of white light is in the range of 60° to 90°, the emission angle |β| of the primary diffracted light 503 with a particular wavelength can be designed to be close to the incident angle.

For example, in a case where the incident angle α=60° and d=340 nm are satisfied, the emission angle |β| at λ=600 nm is approximately 64°.

On the other hand, since the first uneven structure 310 is a diffraction grating structure or the like, it is difficult to design the emission angle of the primary diffracted light to be close to the incident angle.

Accordingly, in an identification operation by the authenticity determination device 1, when the light source 200 and the imaging unit 101 are disposed relatively close to each other, a clear change in the color of the second uneven structure 320 can be captured under a specific condition.

Moreover, the anti-counterfeiting medium 400 may have a configuration which uses surface plasmon propagation produced by a fine structure such as nano-meter size fine holes provided on the surface, or a configuration which uses a structural color that controls the color of the reflected light or transmitted light with respect to the incident light by controlling the depth of the uneven structure.

The anti-counterfeiting medium 400 may also have a configuration which uses retro-reflection properties of microspheres or a spherical structure; a configuration like an angle-controlled mirror in which a surface structure of a micro region is provided with an inclination to thereby obtain reflective properties that allows the incident light to be reflected or transmitted only in a specific direction; and a configuration like printed products having an uneven structure produced by intaglio printing.

Further, the anti-counterfeiting medium 400 may also have a configuration that uses a structure in which a large number of walls with some height, which are used for a peep prevention film or the like, are disposed in a narrow area to limit vision; a configuration which uses a parallax barrier in which thin lines are arrayed at specific intervals on a surface to limit vision so that the image formed behind the surface looks as if it changes; and a configuration which uses lenticular lens or microlens arrays so that the image formed behind the lens looks as if it changes.

Further, the anti-counterfeiting medium 400 may also have a configuration which includes a pearl pigment in which mica is coated with metal oxide, by printing or the like.

The anti-counterfeiting medium 400 may have, for example, a configuration using a multi-layered thin film in which a plurality of thin films having different refractive indexes composed of a transparent material or a metal are provided to produce a change in the color depending on the reflection angle and the transmission angle of the incident light due to interference phenomenon; a configuration in which a multi-layered thin film is crushed into flake shapes and applied as a pigment by printing or the like; a configuration using printed particles where micro particles producing an interference phenomenon are coated with thin film by chemical processing; and a configuration in which a liquid crystal material represented by cholesteric liquid crystal is immobilized in polymer or the like. The liquid crystal material may include a material in a planar shape or a material crushed into pigment to be used for printing or the like.

Further, the anti-counterfeiting medium 400 may have, for example, a configuration which uses a magnetically oriented material in which a magnetic substance such as iron oxide, chromium oxide, cobalt and ferrite is magnetically aligned in a planar shape to impart directivity to the reflective light and transmission light; a configuration having a multi-layered film by using the above magnetically oriented material as a core and additionally performing chemical processing or the like as described above; and a configuration using an optical effect produced by nano-meter sized particles represented by silver nano particles or quantum dots.

Referring back to FIG. 1, the observation angle estimation unit 105 reads the captured image data from the image data storage unit 113 when calculating the imaging angle of each piece of the captured image data, and then correlates each coordinate of the three-dimensional shape of the credit card 300 in the three-dimensional coordinate system to each pixel (coordinate) of the captured image data (two-dimensional coordinate system) by using the above coordinate conversion equation. Thus, the imaging coordinate value at which the image data is captured in the three-dimensional coordinate system of the three-dimensional space, and the imaging angle of the captured image data from the imaging coordinate value are obtained. Here, the observation angle estimating unit 105 positions the credit card 300 in the three-dimensional space as described above such that any of the vertices of the three-dimensional shape of the credit card 300 corresponds to the origin O of the three-dimensional coordinate system, the normal line 350 is parallel with the Z axis, and each side is parallel with the X axis or Y axis.

Then, on the basis of the three-dimensional shape of the credit card 300, the observation angle estimation unit 105 calculates an imaging coordinate value and an imaging direction of the imaging unit 101 capturing the image data in the three-dimensional coordinate system. Accordingly, the observation angle estimating unit 105 calculates an imaging angle (observation angle) α formed between the normal line 350 and the imaging direction of the imaging unit 101. The observation angle estimation unit 105 writes and stores the captured image data identification information of the captured image data, together with the calculated imaging coordinate value, imaging angle, and a captured image data address of the captured image data in the image data storage unit 113.

In the present embodiment, it is assumed that camera calibration (camera correction) is performed in advance for the imaging unit 101. In the camera calibration, a calibration board whose three-dimensional shape is known is captured one or more times in the imaging region, and one or more pieces of the captured image data are used to correlate coordinate points in a three-dimensional coordinate system of the three-dimensional space to a plurality of coordinate points (two-dimensional pixels) in a two-dimensional coordinate system of the captured image data. Accordingly, the above-described coordinate conversion equation which indicates a relative positional relationship between the imaging unit 101 and the calibration board (hereinafter, "external parameters"), as well as an optical center of the imaging unit 101, a light beam incident vector at each pixel (two-dimensional pixel), lens distortion, and the like (hereinafter, "internal parameters of the imaging unit 101") are estimated.

In other words, according to the present embodiment, since the observation angle estimation unit 105, which will be described later, estimates the observation angle of the captured image data, a global coordinate system (three-dimensional coordinate system) is re-configured based on the two-dimensional image of the calibration board captured from a plurality of different imaging viewpoints by the imaging unit 101 in advance, that is, based on captured image data of multiple viewpoints. The coordinate conversion equation, which indicates a correlation between the coordinate points in the three-dimensional coordinate system re-configured in the same pixels and the coordinate points of the captured image data captured by the imaging unit 101 in the two-dimensional coordinate system, is acquired when the camera calibration is performed.

As described above, in the present embodiment, estimation of the observation angle is on the premise that camera calibration (camera correction) is performed in advance for the imaging unit 101, and internal parameters of the imaging unit 101 are known at the time of authenticity determination of the anti-counterfeiting medium in the identification device, and the three-dimensional shapes of the authenticity determination object and the anti-counterfeiting medium are also known. Accordingly, image data of the anti-counterfeiting medium is captured from a plurality of different imaging viewpoints, and the above-described coordinate conversion equation is used to obtain information on a plurality of corresponding points between the coordinate points in the three-dimensional coordinate system and the pixels of the captured image data in the two-dimensional coordinate system. Thus, based on the plurality of corresponding point coordinates, the relative positional relationship between the imaging unit 101 and the anti-counterfeiting medium can be estimated. Similarly, in the case where the anti-counterfeiting medium is captured only once, the above-described coordinate conversion equation is used in a single piece of captured image data to obtain information on a plurality of corresponding points between the coordinate points in the three-dimensional coordinate system and the pixels in the two-dimensional coordinate system. Thus, based on the plurality of corresponding point coordinates, the relative positional relationship between the imaging unit 101 and the anti-counterfeiting medium can be estimated. That is, the imaging coordinate value and imaging angle (obtained from the imaging direction as described above) of the imaging unit 101 in capturing of an image of the anti-counterfeiting medium can be estimated.

In the present embodiment, an observation angle in capturing of image data can be estimated by applying an analysis method of Z. Zhang (Z. Zhang, "A flexible new technique for camera calibration", IEEE Transactions on Pattern Analysis and Machine Intelligence, Vol. 22, No. 11, pages 1330-1334, 2000), which is one of the well-known techniques of camera calibration. Note that, when the analysis method of Z. Zhang is used to estimate the observation angle, the captured image data to be inputted to the identification device is required to be image data captured with a focus similar to (preferably the same focus as) the fixed focus when the camera calibration is performed.

The match-percentage notification unit 106 calculates a difference between the imaging viewpoint (imaging coordinate value and imaging angle) of the imaging unit 101 and a reference imaging viewpoint as an amount of deviation on the basis of the coordinate position of the anti-counterfeiting medium 400 in the three-dimensional coordinate system, the imaging coordinate value (imaging position) of the imaging unit 101, and the imaging angle (observation angle) obtained by the observation angle estimation unit 105. The three-dimensional coordinate system is generated, for example, taking a marker positioned on the surface of the credit card 300 by the imaging control unit 102 as the origin. Alternatively, a marker may not necessarily be provided by printing or attaching. A feature of the captured image such as a vertex of the shape of the anti-counterfeiting medium 400 on the credit card 300 may be used as a marker. The reference imaging viewpoint is a combination of data of a reference imaging angle and a reference imaging coordinate value.

Further, the reference imaging viewpoint is pre-set, for example, on the basis of an irradiation angle of the irradiation light irradiated onto the anti-counterfeiting medium 400 from the illumination unit 104, and the interrelation among the coordinate values of the illumination unit 104, the imaging unit 101, and the anti-counterfeiting medium 400 in the three-dimensional coordinate system so that the pattern of light emitted from the anti-counterfeiting medium 400 is incident on the imaging unit 101 when an image of the anti-counterfeiting medium 400 is captured. Since the positions of the illumination unit 104 and (a lens of) the imaging unit 101 in the authenticity determination device 1 are different depending on the product type of the authenticity determination devices (e.g., mobile terminals including cell phones in which an authenticity determination application is installed), the reference imaging viewpoint is set for each authenticity determination device, taking the above marker as a reference. Here, the reference imaging viewpoint (reference imaging coordinate value and reference imaging angle), which is the imaging viewpoint for capturing an image of the anti-counterfeiting medium 400 on the credit card 300 in the three-dimensional coordinate system, can be readily pre-set since the relative positions of the imaging unit 101 and the illumination unit 104 in the authenticity determination device 1 are known.

The match-percentage notification unit 106 calculates a difference between an imaging coordinate value Q (x1, y1, z1) of the imaging unit 101 and an imaging angle α1 indicative of the imaging direction of the imaging unit 101 at the imaging viewpoint, and a reference coordinate value P (x, y, z) and a reference imaging angle α at the reference imaging viewpoint, respectively, as an imaging coordinate value difference ΔP (Δx, Δy, Δz) and an imaging angle difference Δα. The match-percentage notification unit 106 may also calculate a square difference ΔR between the reference coordinate value P and the reference coordinate value Q as a distance between the reference coordinate value P and the reference coordinate value Q.

Here, the following equations are established:

$$\Delta\alpha = \alpha - \alpha 1$$

$$\Delta P = ((x-x1)+(y-y1)+(z-z1))$$

$$\Delta R = ((x-x1)2+(y-y1)2+(z-z1)2)^{\frac{1}{2}}$$

Moreover, the match-percentage notification unit 106 correlates each of the imaging coordinate value difference ΔP and the imaging angle difference Δα to evaluation levels in a predetermined evaluation level table. The evaluation level table is different depending on the method of progress notification. Furthermore, the match-percentage notification unit 106 converts the imaging coordinate value difference ΔP and the imaging angle difference Δα into an evaluation value that indicates whether the imaging viewpoint is close to the reference imaging viewpoint or not, that is, a match-percentage that notifies a user whether authenticity determination is ready to be performed or not.

Then, the match-percentage notification unit 106 displays on a screen 111A a match-percentage indicator, which indicates a degree to which the reference imaging viewpoint and the imaging viewpoint match each other to thereby prompt the user to move the imaging viewpoint of the imaging unit 101 relative to the anti-counterfeiting medium 400 so as to match the imaging viewpoint with the reference imaging viewpoint.

Figure 9A:
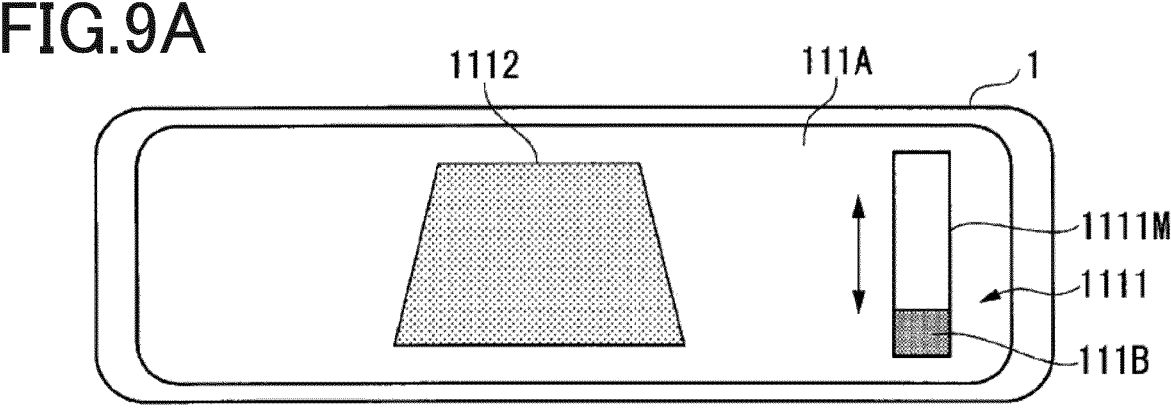
FIG. 9A is a view which illustrates an example of a match-percentage indicator that is displayed on a screen of a display unit 112 by a match-percentage notification unit 106.
Figure 9B:
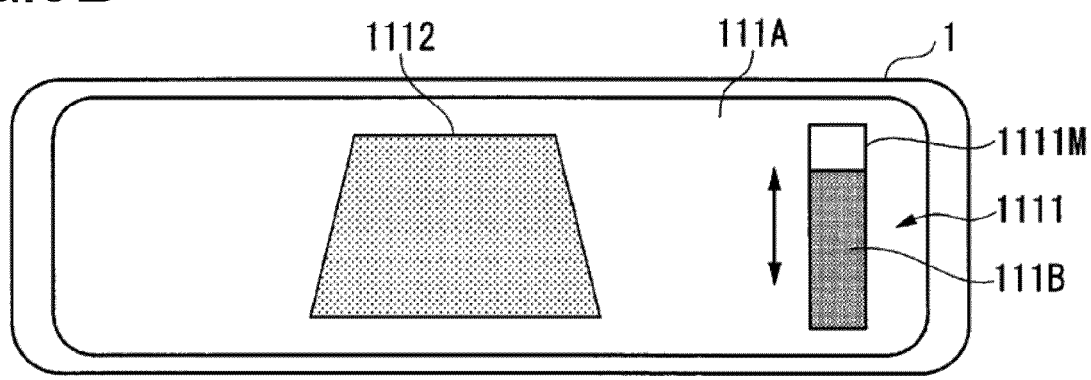
FIG. 9B is a view which illustrates an example of a match-percentage indicator that is displayed on a screen of a display unit 112 by a match-percentage notification unit 106.
Figure 9C:
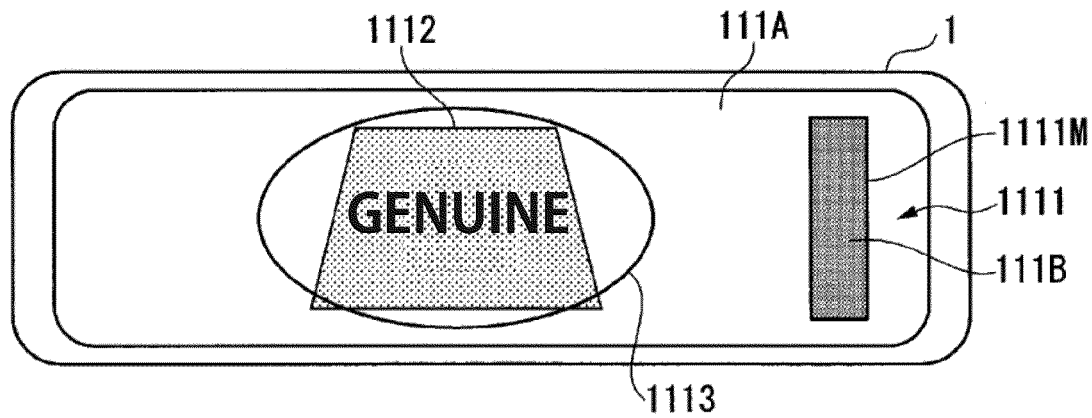
FIG. 9C is a view which illustrates an example of a match-percentage indicator that is displayed on a screen of a display unit 112 by a match-percentage notification unit 106.

FIGS. 9A to 9C are views which illustrate examples of the match-percentage indicator displayed on the screen of the display unit 112 by the match-percentage notification unit 106. In FIGS. 9A to 9C, a captured image including an image 1112 of the credit card 300 and a match-percentage indicator 1111 is displayed on the screen 111A (screen of the display unit 112 in FIG. 1) of the authenticity determination device 1.

In FIGS. 9A to 9C, a progress bar is used as the match-percentage indicator 1111.

As shown in FIGS. 9A and 9B, a progress meter 1111M is configured such that a bar 1111B fills the area corresponding to the calculated match-percentage. Accordingly, in the present embodiment, the user can easily recognize whether authenticity determination of the anti-counterfeiting medium is ready to be performed. Therefore, the user can visually recognize that the process of authenticity determination is actually in progress, and smoothly perform the process of authenticity determination.

The match-percentage notification unit 106 assigns the imaging angle difference $\Delta\alpha$ and the square difference $\Delta R$ into a predetermined evaluation formula to calculate a match-percentage as an evaluation value in the progress bar. This evaluation formula is a function for calculating a match-percentage to be displayed in the progress bar in FIGS. 9A to 9C, by assigning the imaging angle difference $\Delta\alpha$ and the square difference $\Delta R$ into variables.

Alternatively, another configuration is possible in which the imaging angle difference $\Delta\alpha$ and the square difference $\Delta R$ are each used as a dimension, and a two-dimensional evaluation table is written in advance in the image data storage unit 113 to read the match-percentage therefrom. In this configuration, the match-percentage notification unit 106 reads out the match-percentage from the evaluation table as an evaluation value corresponding to the obtained imaging angle difference $\Delta\alpha$ and the square difference $\Delta R$.

On the basis of the obtained imaging angle difference $\Delta\alpha$ and the square difference $\Delta R$, the match-percentage notification unit 106 updates the bar 111B to fill the area corresponding to the match-percentage in the progress meter 1111M every time when a new match-percentage is obtained.

FIG. 9C is a view which illustrates an example of the progress indicator in the case where authenticity determination of the anti-counterfeiting medium makes a determination of "genuine".

When the reference imaging viewpoint matches the imaging viewpoint (within a predetermined error range), the match-percentage in the progress bar becomes 100%. Accordingly, the match-percentage notification unit 106 fills the entire progress meter 1111M of the progress bar (match-percentage indicator 1111) with the bar 1111B.

Then, when the process of authenticity determination process produces a result of "genuine", the authenticity determination unit 110 notifies the user in an intuitive manner that the authenticity determination result is "genuine" by displaying a result notification image 1113 on the screen 111A. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the authenticity determination unit 110 notifies the user in an intuitive manner that the authenticity determination result is "fake" by displaying the result notification image 1113 which includes a symbol image representing "fake" on the screen 111A.

Figure 10A:
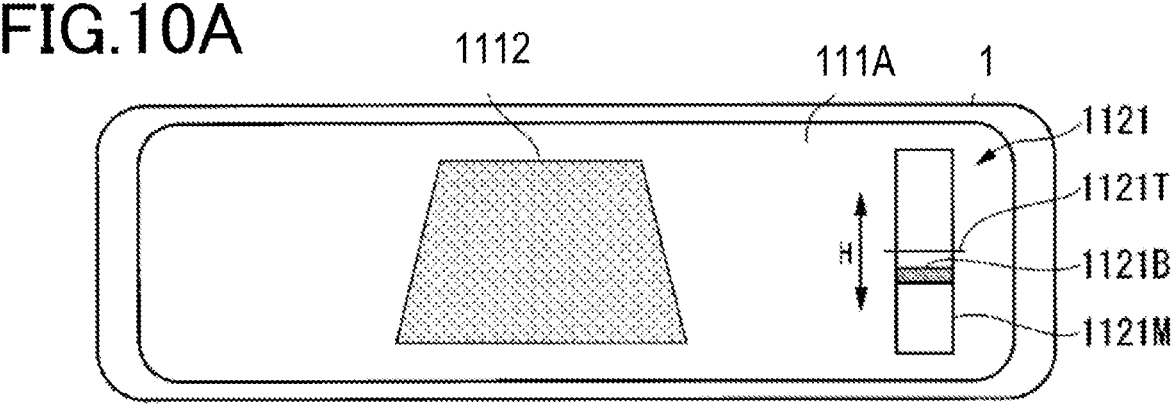
FIG. 10A is a view which illustrates an example of a match-percentage indicator that is displayed on a screen of a display unit 112 by a match-percentage notification unit 106.
Figure 10B:
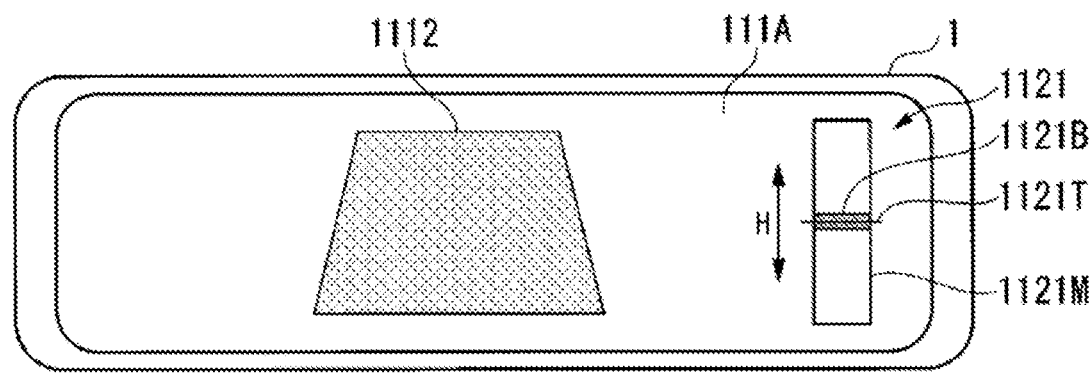
FIG. 10B is a view which illustrates an example of a match-percentage indicator that is displayed on a screen of a display unit 112 by a match-percentage notification unit 106.
Figure 10C:
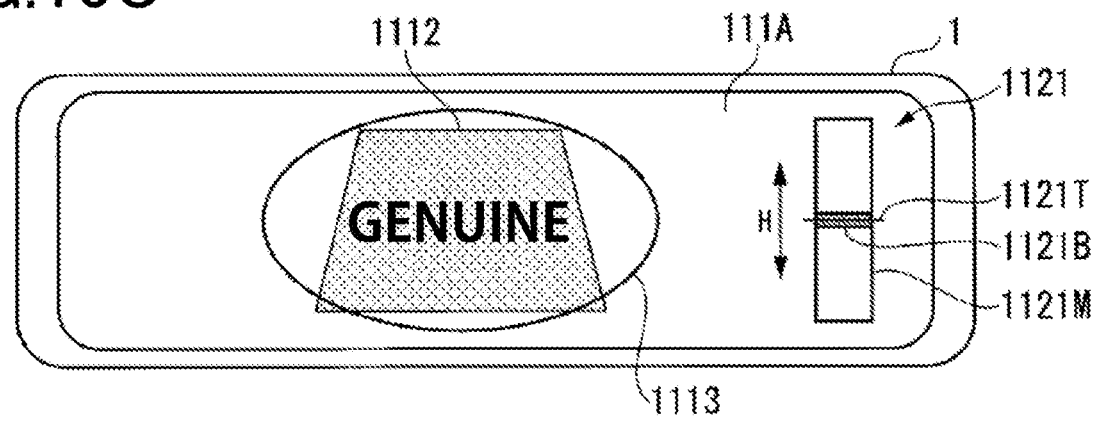
FIG. 10C is a view which illustrates an example of a match-percentage indicator that is displayed on a screen of a display unit 112 by a match-percentage notification unit 106.

FIGS. 10A to 10C are views which illustrate examples of the match-percentage indicator displayed on the screen of the display unit 112 by the match-percentage notification unit 106. In FIGS. 10A to 10C, a captured image including an image 1112 of the credit card 300 and the match-percentage indicator (spirit level image) 1121 is displayed on the screen 111A (screen of the display unit 112 in FIG. 1) of the authenticity determination device 1. In FIGS. 10A to 10C, the match-percentage indicator is displayed as the spirit level image 1121 representing a one-dimensional spirit level. As shown in FIG. 10A, in a spirit level 1121M in the spirit level image 1121, the calculated match-percentage is indicated by an evaluation bar 1121B as a distance from a reference value 1121T in an H direction.

The match-percentage notification unit 106 correlates the evaluation bar 1121B to the match-percentage of the imaging viewpoint to the reference imaging viewpoint, and moves the evaluation bar 1121B closer to the reference value 1121T with an increase in the match-percentage, and moves the evaluation bar 1121B farther from the reference value 1121T with a decrease in the match-percentage. Further, the match-percentage notification unit 106 moves the evaluation bar 1121B upward relative to the reference value 1121T when the distance is positive, and moves the evaluation bar 1121B downward relative to the reference value 1121T when the distance is negative.

The match-percentage notification unit 106 assigns the imaging angle difference $\Delta\alpha$ and the imaging coordinate value difference $\Delta P$ into a predetermined evaluation formula to calculate a match-percentage as an evaluation value in the spirit level. This evaluation formula is a function for calculating a match-percentage to be displayed in the level 1121M in FIGS. 10A to 10C as a distance (evaluation value) between the reference value 1121T and the evaluation bar 1121B, by assigning the imaging angle difference $\Delta\alpha$ and the imaging coordinate value difference $\Delta P$ into variables.

Alternatively, another configuration is possible in which the imaging angle difference $\Delta\alpha$ and the imaging coordinate value difference $\Delta P$ are each used as a dimension, and a two-dimensional evaluation table is written in advance in the image data storage unit 113 to read the match-percentage therefrom. In this configuration, the match-percentage notification unit 106 reads out the match-percentage, which is the distance between the reference value 1121T and the evaluation bar 1121B, from the evaluation table as an evaluation value corresponding to the obtained imaging angle difference $\Delta\alpha$ and the imaging coordinate value difference $\Delta P$.

FIG. 10B shows that the evaluation bar 1121B overlaps the reference value 1121T by a predetermined area, indicating that the reference imaging viewpoint matches the imaging viewpoint. The user can visually recognize that authenticity determination of the anti-counterfeiting medium 400 is ready to be performed.

Then, when the process of authenticity determination process produces a result of "genuine", the authenticity determination unit 110 notifies the user in an intuitive manner that the authenticity determination result is "genuine" by displaying a result notification image 1113 on the screen 111A. FIG. 10C shows that the result notification image 1113 is displayed. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the authenticity determination unit 110 notifies the user in an intuitive manner that the authenticity determination result is "fake" by displaying the result notification image 1113 which includes a symbol image representing "fake" on the screen 111A.

Figure 11A:
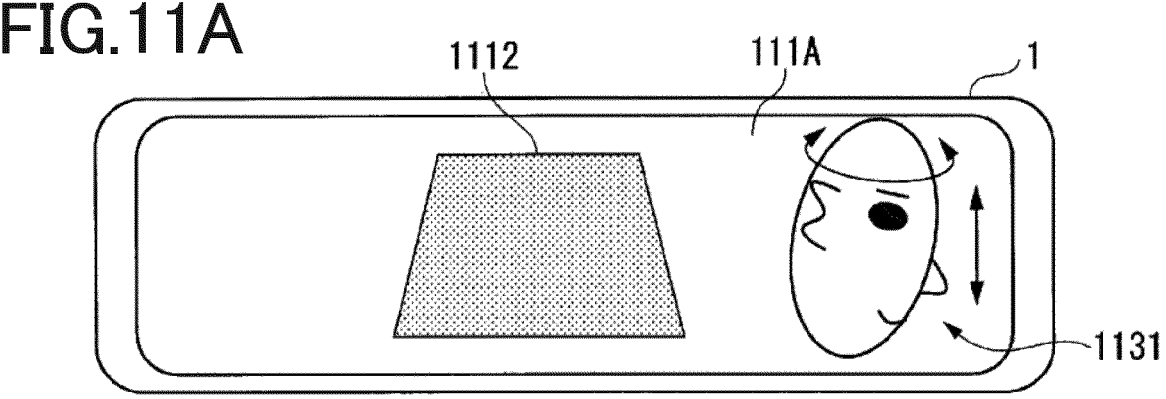
FIG. 11A is a view which illustrates an example of a match-percentage indicator that is displayed on a screen of a display unit 112 by a match-percentage notification unit 106.
Figure 11B:
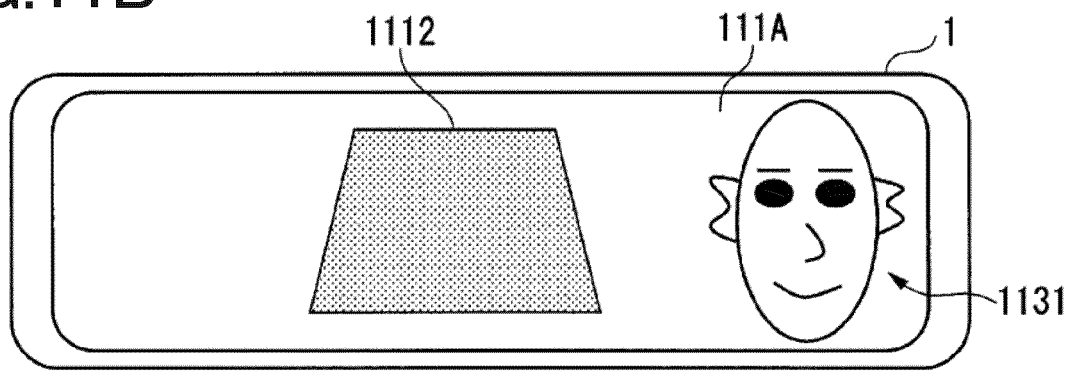
FIG. 11B is a view which illustrates an example of a match-percentage indicator that is displayed on a screen of a display unit 112 by a match-percentage notification unit 106.
Figure 11C:
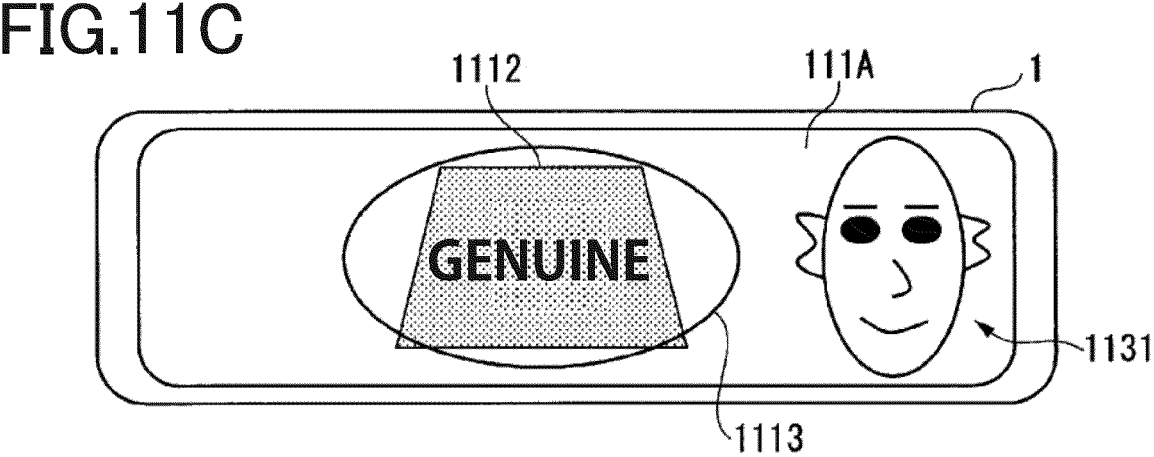
FIG. 11C is a view which illustrates an example of a match-percentage indicator that is displayed on a screen of a display unit 112 by a match-percentage notification unit 106.

FIGS. 11A to 11C are views which illustrate examples of the match-percentage indicator displayed on the screen of the display unit 112 by the match-percentage notification unit 106. In FIGS. 11A to 11C, a captured image including an image 1112 of the credit card 300 and a match-percentage indicator (face image) 1131 is displayed on the screen 111A (screen of the display unit 112 in FIG. 1) of the authenticity determination device 1. In FIGS. 11A to 11C, the match-percentage indicator is displayed as a three-dimensional computer graphics (CG) image (hereinafter, face image) representing a human face. In FIGS. 11A to 11C, the match-percentage between the reference imaging viewpoint and the imaging viewpoint is notified in two-dimension by the face image of the face image 1131 which tilts in the horizontal or vertical direction corresponding to the match-percentage. In the present embodiment, for example, a rotation angle in the horizontal direction indicates an evaluation value by the imaging coordinate value difference $\Delta P$, which is a difference between the reference imaging coordinate value and the imaging coordinate value, while a tilt angle in the vertical direction from a horizontal position indicates an evaluation value by the imaging angle difference $\Delta \alpha$, which is a difference between the reference imaging angle and the imaging angle. Thus, the match-percentage notification unit 106 rotates the face in the face image 1131 to the left by an amount of rotation angle when the rotation angle, which is an evaluation value by the imaging coordinate value difference $\Delta P$ is negative (−), and rotates the face in the face image 1131 to the right by an amount of rotation angle when the rotation angle is positive (+). Further, the match-percentage notification unit 106 downwardly tilts the face in the face image 1131 by an amount of tilt angle when the tilt angle, which is an evaluation value by the imaging angle difference $\Delta \alpha$, is negative, and upwardly tilts the face in the face image 1131 by an amount of tilt angle when the tilt angle is positive.

The match-percentage notification unit 106 assigns the imaging coordinate value difference $\Delta P$ into a predetermined first evaluation formula to calculate a horizontal rotation angle of the face image 1131 as the match-percentage. This first evaluation formula is a function for calculating a rotation angle (evaluation value) of the face image 1131 as the match-percentage, by assigning the imaging coordinate value difference $\Delta P$ into variables. The first evaluation formula outputs a negative rotation angle when the imaging coordinate value difference $\Delta P$ is negative, and outputs a positive rotation angle when the imaging coordinate value difference $\Delta P$ is positive. Further, the rotation angle decreases with an increase in the match-percentage, indicating an inverse relationship. Further, the match-percentage notification unit 106 assigns the imaging angle difference $\Delta \alpha$ into a predetermined second evaluation formula to calculate a vertical rotation angle of the face image 1131 as the match-percentage. This second evaluation formula is a function for calculating a vertical tilt (evaluation value) of the face image 1131 as the match-percentage, by assigning the imaging angle difference $\Delta \alpha$ into variables. The second evaluation formula outputs a negative rotation angle when the imaging angle difference $\Delta \alpha$ is negative, and outputs a positive rotation angle when the imaging angle difference $\Delta \alpha$ is positive. The rotation angle decreases with an increase in the match-percentage.

Alternatively, another configuration is possible in which the imaging coordinate value difference $\Delta P$ is used as a dimension, and a one-dimensional first evaluation table is written in advance in the image data storage unit 113 to read the match-percentage therefrom. In this configuration, the match-percentage notification unit 106 reads out the horizontal rotation angle of the face image 1131 as the match-percentage from the first evaluation table as an evaluation value corresponding to the obtained imaging coordinate value difference $\Delta P$. Still another configuration is possible in which the imaging angle difference $\Delta \alpha$ is used as a dimension, and a one-dimensional second evaluation table is written in advance in the image data storage unit 113 to read the match-percentage therefrom. In this configuration, the match-percentage notification unit 106 reads out the vertical rotation angle of the face image 1131 as the match-percentage from the second evaluation table as an evaluation value corresponding to the obtained imaging angle difference $\Delta \alpha$.

FIG. 11B shows the face image 1131 faces the front, that is, both the horizontal rotation angle and vertical tilt angle of the face image 1131 are 0 (or within a predetermined range judged as a match). The user can visually recognize that authenticity determination of the anti-counterfeiting medium 400 is ready to be performed when the face image 1131 faces the front as if it gazes the user.

Then, when the process of authenticity determination process produces a result of "genuine", the authenticity determination unit 110 notifies the user in an intuitive manner that the authenticity determination result is "genuine" by displaying a result notification image 1113 on the screen 111A. FIG. 11C shows that the result notification image 1113 is displayed. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the authenticity determination unit 110 notifies the user in an intuitive manner that the authenticity determination result is "fake" by displaying the result notification image 1113 which includes a symbol image representing "fake" on the screen 111A.

Alternatively, instead of the human face image described above, a CG of a ball rolling on a table may be displayed while the table is tilted horizontally and vertically. In this case, the user can move the authenticity determination device 1 relative to the anti-counterfeiting medium 400 to hold the ball stable at a position of a stop mark at the center of the table.

Alternatively, a cup positioned on the table may be displayed. The user can move the authenticity determination device 1 relative to the anti-counterfeiting medium 400 to prevent spilling of liquid from the cup by holding the table horizontally stable.

Figure 12A:
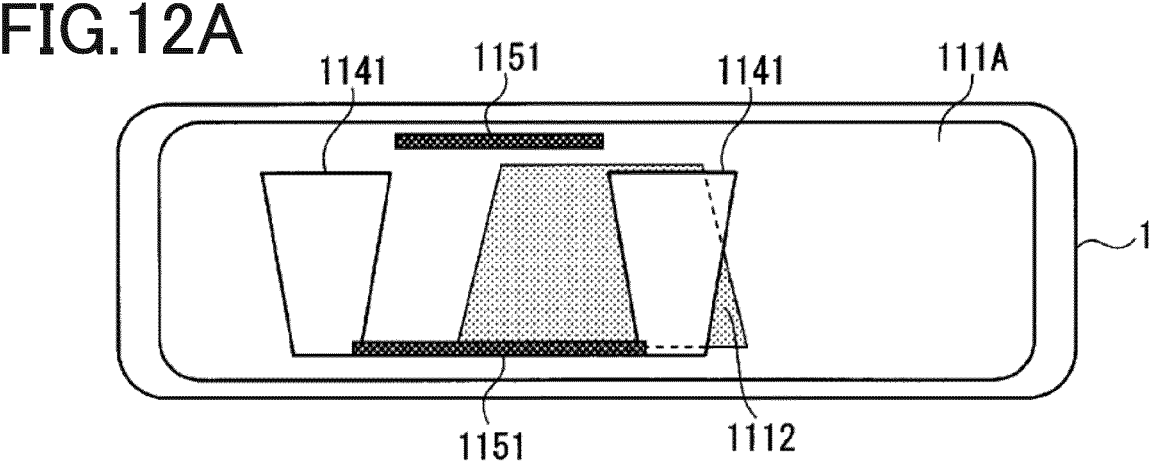
FIG. 12A is a view which illustrates an example of a match-percentage indicator that is displayed on a screen of a display unit 112 by a match-percentage notification unit 106.
Figure 12B:
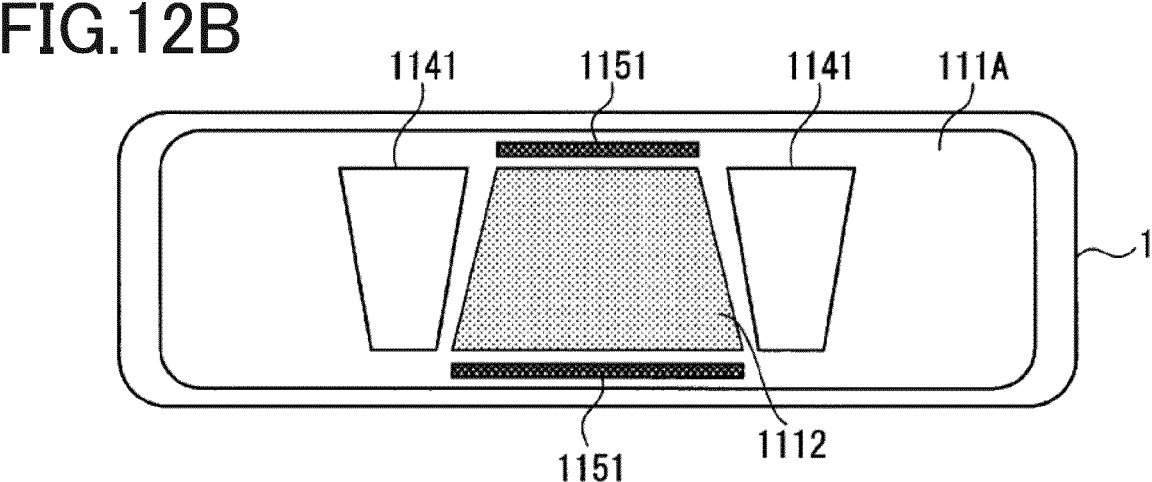
FIG. 12B is a view which illustrates an example of a match-percentage indicator that is displayed on a screen of a display unit 112 by a match-percentage notification unit 106.
Figure 12C:
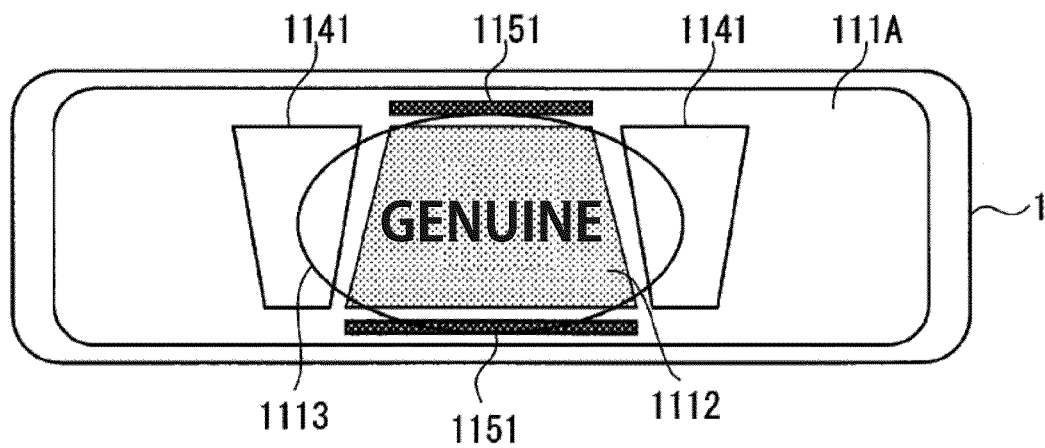
FIG. 12C is a view which illustrates an example of a match-percentage indicator that is displayed on a screen of a display unit 112 by a match-percentage notification unit 106.

FIGS. 12A to 12C are views which illustrate examples of the match-percentage indicator displayed on the screen of the display unit 112 by the match-percentage notification unit 106. In FIGS. 12A to 12C, a captured image including an image 1112 of the credit card 300, a match-percentage indicator 1141, and a match-percentage indicator 1151 is displayed on the screen 111A (screen of the display unit 112 in FIG. 1) of the authenticity determination device 1. In FIGS. 12A to 12C, the match-percentage indicators 1141 and 1151 are each displayed as a masking image for the image 1112. As shown in FIGS. 12A to 12C, the match-percentage is notified by an area of a region of the image 1112 masked by the match-percentage indicator 1141 and the match-percentage indicator 1151 corresponding to the match-percentage. In the present embodiment, for example, a region masked by the match-percentage indicator 1141 in the horizontal direction indicates an evaluation value by the imaging coordinate value difference $\Delta P$, which is a difference between the reference imaging coordinate value and the imaging coordinate value, while a region masked by the match-percentage indicator 1151 in the vertical direction indicates an evaluation value by the imaging angle difference $\Delta \alpha$, which is a difference between the reference imaging angle and the imaging angle. As the match-percentage between the reference imaging viewpoint and the imaging viewpoint decreases, a region of the image 1112 masked by the match-percentage indicator 1141 and the match-percentage indicator 1151 increases.

Accordingly, when the evaluation value of the imaging coordinate value difference $\Delta P$ is negative (−), the match-percentage notification unit 106 masks an area of the region on the left of the image 1112 corresponding to the match-percentage by the match-percentage indicator 1141. On the other hand, when the evaluation value of the imaging coordinate value difference $\Delta P$ is positive (+), the match-percentage notification unit 106 masks an area of the region on the right of the image 1112 corresponding to the match-percentage by the match-percentage indicator 1141. Further, when the evaluation value of the imaging angle difference $\Delta \alpha$ is negative (−), the match-percentage notification unit 106 masks an area of the region on the lower part of the image 1112 corresponding to the match-percentage by the match-percentage indicator 1151. On the other hand, when the evaluation value of the imaging angle difference $\Delta \alpha$ is positive (+), the match-percentage notification unit 106 masks an area of the region on the upper part of the image 1112 corresponding to the match-percentage by the match-percentage indicator 1151.

The match-percentage notification unit 106 assigns the imaging coordinate value difference $\Delta P$ into a predetermined first evaluation formula to calculate an area of the region on the left and right of the image 1112. This first evaluation formula is a function for calculating a shift amount of the match-percentage indicator 1141 to be shifted in the horizontal direction as the match-percentage, by assigning the imaging coordinate value difference $\Delta P$ into variables. The first evaluation formula outputs a shift amount to move the match-percentage indicator 1141 to the right in the screen 111A when the imaging coordinate value difference $\Delta P$ is negative, and outputs a shift amount to move the match-percentage indicator 1141 to the left in the screen 111A when the imaging coordinate value difference $\Delta P$ is positive. The first evaluation formula calculates the shift amount of the match-percentage indicator 1141 relative to a reference position so that the masked region of the image 1112 decreases with an increase in the match-percentage. Further, the match-percentage notification unit 106 assigns the imaging angle difference $\Delta \alpha$ into a predetermined second evaluation formula to calculate a shift amount of the match-percentage indicator 1151 corresponding to the match-percentage to be shifted in the vertical direction as the match-percentage. The second evaluation formula outputs a shift amount to move the match-percentage indicator 1151 upward in the screen 111A when the imaging angle difference $\Delta \alpha$ is negative, and outputs a shift amount to move the match-percentage indicator 1151 downward in the screen 111A when the imaging coordinate value difference $\Delta P$ is positive by assigning the imaging angle difference $\Delta \alpha$ into variables. Further, the second evaluation formula calculates the shift amount relative to a reference position so that the masked region of the image 1112 decreases with an increase in the match-percentage.

Alternatively, another configuration is possible in which the imaging coordinate value difference $\Delta P$ is used as a dimension, and a one-dimensional first evaluation table is written in advance in the image data storage unit 113 to read the shift amount of the match-percentage indicator 1141 therefrom. In this configuration, the match degree notification unit 106 reads out the shift amount of the match-percentage indicator 1141 in the horizontal direction as the match-percentage from the first evaluation table as an evaluation value corresponding to the obtained imaging coordinate value difference $\Delta P$. Another configuration is possible in which the imaging angle difference $\Delta \alpha$ is used as a dimension, and a one-dimensional second evaluation table is written in advance in the image data storage unit 113 to read the shift amount of the match-percentage indicator 1151 therefrom. In this configuration, the match degree notification unit 106 reads out the shift amount of the image 1151 (match-percentage indicator) in the vertical direction as the match-percentage from the second evaluation table as an evaluation value corresponding to the obtained imaging angle difference $\Delta \alpha$.

FIG. 12B shows that the image 1112 is not masked by the match-percentage indicator 1141 and the match-percentage indicator 1151, that is, the reference imaging viewpoint matches the imaging viewpoint within a predetermined range of tolerance. The user can visually recognize that authenticity determination of the anti-counterfeiting medium 400 is ready to be performed when the image 1112 is not masked by the match-percentage indicator 1141 and the match-percentage indicator 1151.

Then, when the process of authenticity determination process produces a result of "genuine", the authenticity determination unit 110 notifies the user in an intuitive manner that the authenticity determination result is "genuine" by displaying a result notification image 1113 on the screen 111A. FIG. 12C shows that the result notification image 1113 is displayed. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the authenticity determination unit 110 notifies the user in an intuitive manner that the authenticity determination result is "fake" by displaying the result notification image 1113 which includes a symbol image representing "fake" on the screen 111A.

Alternatively, instead of the aforementioned match-percentage indicator 1141 and the match-percentage indicator 1151, a CG of a dome having a hole on the top may be displayed in the screen 111A together with the image 1112. In this configuration, the display position of the dome is moved corresponding to the match-percentage so that an area of the image 1112 exposed from the hole of the dome increases with an increase in the match-percentage of the imaging viewpoint to the reference imaging viewpoint.

Figure 13A:
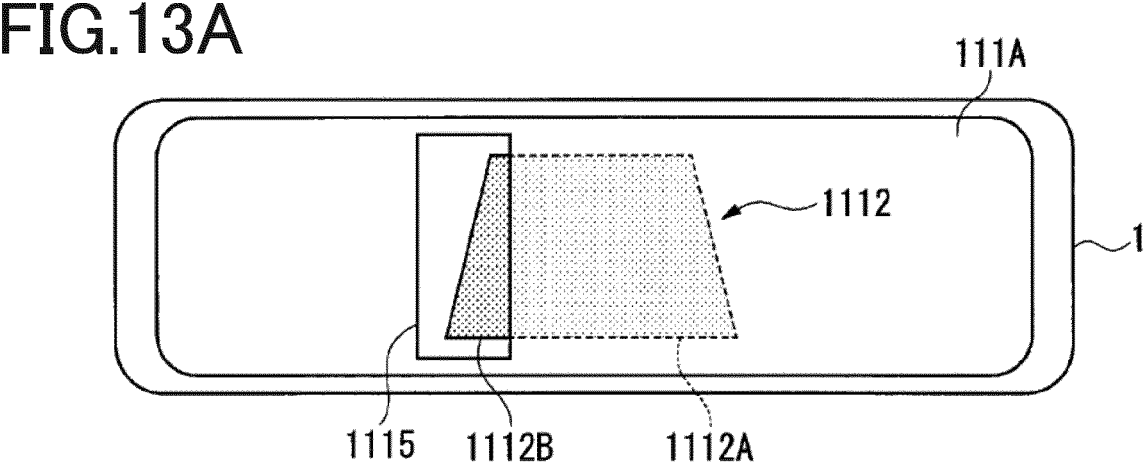
FIG. 13A is a view which illustrates an example of a match-percentage indicator that is displayed on a screen of a display unit 112 by a match-percentage notification unit 106.
Figure 13B:
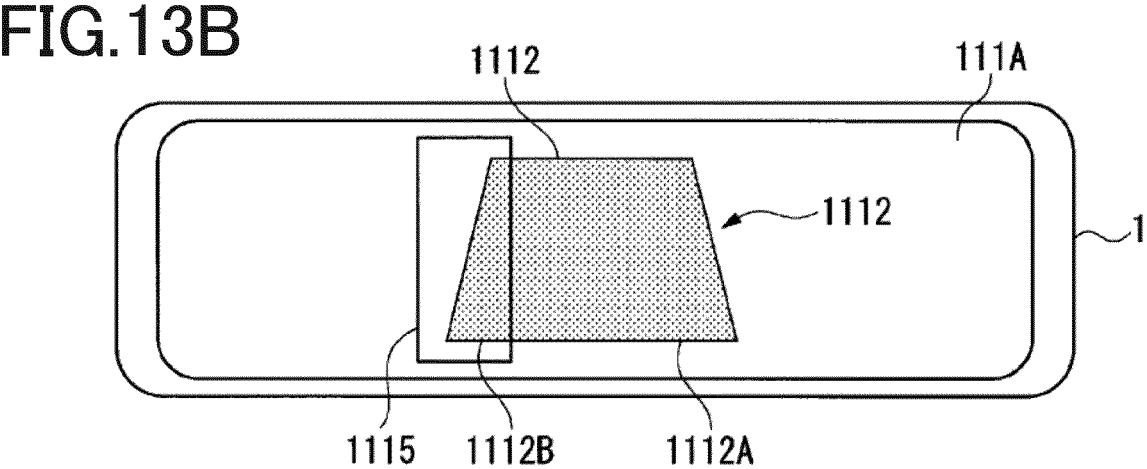
FIG. 13B is a view which illustrates an example of a match-percentage indicator that is displayed on a screen of a display unit 112 by a match-percentage notification unit 106.
Figure 13C:
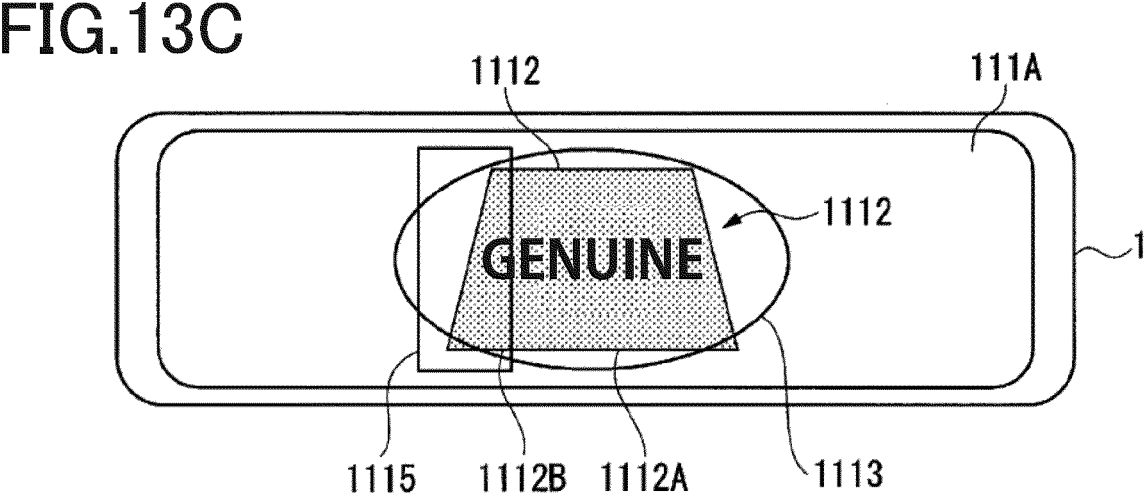
FIG. 13C is a view which illustrates an example of a match-percentage indicator that is displayed on a screen of a display unit 112 by a match-percentage notification unit 106.

FIGS. 13A to 13C are views which illustrate examples of the match-percentage indicator displayed on the screen of the display unit 112 by the match degree notification unit 106. In FIGS. 13A to 13C, a captured image including an image 1112 of the credit card 300 and a reference density frame 1115 is displayed on the screen 111A (screen of the display unit 112 in FIG. 1) of the authenticity determination device 1. In FIGS. 13A to 13C, an image in the reference density frame 1115 is displayed at a density as captured. On the other hand, an image outside the reference density frame 1115 is displayed at a density corresponding to the match-percentage between the reference imaging viewpoint and the imaging viewpoint. As shown in FIG. 13A, the match-percentage notification unit 106 is configured to display the image outside the reference density frame 1115 at a density corresponding to the match-percentage.

The match degree notification unit 106 assigns the imaging angle difference $\Delta\alpha$ and the square difference $\Delta R$ into a predetermined evaluation formula to calculate a match-percentage as a density coefficient $\eta(\leq 1)$ of an image outside the reference density frame 1115. This evaluation formula is a function for calculating a density coefficient $\eta$ to be multiplied by the gradient of an image outside the reference density frame 1115 in FIGS. 13A to 13C, by assigning the difference $\Delta\alpha$ and the difference $\Delta R$ into variables.

Alternatively, another configuration is possible in which the imaging angle difference $\Delta\alpha$ and the square difference $\Delta R$ are each used as a dimension, and a two-dimensional evaluation table is written in advance in the image data storage unit 113 to read the match-percentage therefrom. In this configuration, the match degree notification unit 106 reads out the density coefficient $\eta$ which is the match-percentage from the evaluation table as an evaluation value corresponding to the obtained imaging angle difference $\Delta\alpha$ and the square difference $\Delta R$.

Accordingly, as shown in FIG. 13A, a gradient of each pixel is multiplied by the density coefficient $\eta$ corresponding to the match-percentage. Thus, a region 1112A of the image 1112 outside the reference density frame 1115 is displayed at a density corresponding to the match-percentage. On the other hand, a region 1112B of the image 1112 in the reference density frame 1115 is displayed at a density as captured. The density coefficient $\eta$ is determined to approach 1 as the match-percentage approaches 100%.

Accordingly, the user recognizes that the density of the image of the region 1112A in the image 1112 outside the reference density frame 1115 changes as the user moves the authenticity determination device 1. Thus, the user is prompted to move the authenticity determination device 1 to a position where the density of the image of the region 1112A in the image 1112 outside the reference density frame 1115 approaches the density of the image of the region 1112B in the image 1112 in the reference density frame 1115.

Accordingly, in the present embodiment, the user can easily recognize whether authenticity determination of the anti-counterfeiting medium is ready to be performed. Therefore, the user can visually recognize that the process of authenticity determination is actually in progress, and smoothly perform the process of authenticity determination.

The match-percentage notification unit 106 reads the density coefficient $\eta$ corresponding to the match-percentage from the evaluation table on the basis of the obtained imaging angle difference $\Delta\alpha$ and the square difference $\Delta R$, and multiplies the gradient of each pixel with the density coefficient $\eta$ which has been read each time a new match-percentage is obtained. Thus, the match-percentage notification unit 106 updates the display of the region 1112A. FIG. 13B shows that the region 1112A of the image 1112 is displayed at the same density as that of the region 1112B, that is, the reference imaging viewpoint matches the imaging viewpoint within a predetermined range of tolerance.

The user can visually recognize that authenticity determination of the anti-counterfeiting medium 400 is ready to be performed when the region 1112A is displayed at the same density as that of the region 1112B.

FIG. 13C is a view which illustrates an example of the match-percentage indicator in the case where authenticity determination of the anti-counterfeiting medium makes a determination of "genuine".

When the process of authenticity determination process produces a result of "genuine", the authenticity determination unit 110 notifies the user in an intuitive manner that the authenticity determination result is "genuine" by displaying a result notification image 1113 on the screen 111A. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the authenticity determination unit 110 notifies the user in an intuitive manner that the authenticity determination result is "fake" by displaying the result notification image 1113 which includes a symbol image representing "fake" on the screen 111A.

Referring back to FIG. 1, the match-percentage notification unit 106 outputs an imaging command signal to the imaging unit 101 via the imaging control unit 102 when determining that the match-percentage falls within a predetermined range.

When the imaging command signal is supplied from the match-percentage notification unit 106, the imaging unit 101 performs imaging process to write and store the captured image data in the image data storage unit 113.

The available image selecting unit 107 determines whether the captured image data captured by the imaging unit 101 is an available for use in the authenticity determination process. When selecting the captured image data that is available for use in the authenticity determination process from among the captured image data captured by the imaging unit 101, the available image selecting unit 107 performs determination process such as whether the entire shape of the anti-counterfeiting medium 400 is captured in the captured image data, the anti-counterfeiting medium 400 is in focus, and luminance histogram is appropriately distributed (described later).

When the captured image data satisfy the above determination processes, the available image selecting unit 107 determines that the data are available captured image data for use in the authenticity determination process. The available image selection unit 107 adds determination image data identification information to the captured image data determined as being available for use in the authenticity determination process, and writes and stores the captured image data together with the captured image data identification information of the captured image data, into the captured image data table for authenticity determination in the image data storing unit 113.

FIG. 14 is a diagram which illustrates a configuration example of a captured image data table for authenticity determination in the image data storage unit 113. In the captured image data table for authenticity determination shown in FIG. 14, pieces of determination image data identification information, pieces of captured image data of the captured image data indicated by the determination image data identification information, reference image data addresses that indicate a start address in a region storing the reference image data, and similarities between captured image data and reference image data, which are correlated to each other, are written and stored.

In this captured image data table for authenticity determination, the determination image data identification information refers to identification information for identifying the captured image data available for use in authenticity determination. The captured image data identification information refers to identification information for identifying the captured image data. The reference image data address refers to an address pointing to a region including each image data stored in the image data storage unit 113 and serves as an index of the reference image data when it is read out from the image data storage unit 113. The reference image data stored in the reference image data address is image data for comparison with the corresponding captured image data. The degree of similarity is a numerical value representing a similarity between the captured image data and the reference image data.

Referring back to FIG. 1, the reference image generation unit 108 generates the reference image data to be used for a comparison with the captured image data selected by the available image selection unit 107. The reference image data is image data observed from the same observation angle as that of the captured image data, and is obtained by simulating the structure of the anti-counterfeiting medium 400 or obtained from pre-captured image data of the anti-counterfeiting medium 400. As described above, the anti-counterfeiting medium 400 may have a configuration formed of diffraction gratings or holograms, a configuration formed of OVD ink or pearl pigment including a pigment in which mica is coated with metal oxide, a configuration formed of a laminate of layers having different refractive indexes, or a configuration formed of cholesteric liquid crystal.

Accordingly, the reference image generation unit 108 generates the reference image data in accordance with each of the above configurations. For example, in the case where the anti-counterfeiting medium 400 is formed using the diffraction grating, the reference image data is calculated and generated by simulation using a reference image generation function, which takes the observation angle as a parameter, based on diffraction grating design information. Then, the reference image generation unit 108 writes and stores the generated reference image data into the image data storage unit 113, and sets the start address of a region in which the reference image data is written as a reference image data address. The reference image generation unit 108 writes and stores the above-described reference image data address into the captured image data table for authenticity determination in the image data storage unit 113, correlating them with the captured image identification information of the captured image data to be compared.

In some cases such as where OVD ink or pearl pigment is used, layers having different refractive indexes are repeatedly laminated, or cholesteric liquid crystal is used, an object cannot be calculated using a function of the reference image data. In such cases, the anti-counterfeiting medium 400 is imaged at every observation angle so that the captured image data are stored as a database of reference image data in the image data storage unit 113. Thus, the reference image generation unit 108 can read the reference image data from the database corresponding to the observation angle of the captured image data to be compared, and write and store the reference image data into the captured image data table for authenticity determination so as to be correlated to the captured image data identification information of the captured image data to be compared.

The similarity calculation unit 109 refers to the captured image data table for authenticity determination in the image data storage unit 113, and sequentially reads the captured image data identification information and the reference image data address corresponding to the determination image data identification information. Then, the similarity calculation unit 109 reads the captured image data address corresponding to the captured image data identification information from the captured image data table in the image data storage unit 113. Thus, the similarity calculation unit 109 reads the captured image data corresponding to the captured image data address and the reference image data corresponding to the reference image data address from the image data storage unit 113.

The similarity calculation unit 109 calculates a degree of similarity of the captured image data to the reference image data thus read out, by using template matching. For example, the similarity calculation unit 109 calculates a mean square error in the luminance of each pixel (each of RGB (red, green, and blue) if a color image is used) corresponding to the captured image data and the reference image data, accumulates the mean square error of all the pixels or part of corresponding pixels, and outputs the addition result as a numerical value indicative of the degree of similarity. Hence, the lower the numerical value of similarity, the higher the similarity between the captured image data and the reference image data. As part of corresponding pixels, a pixel portion having a characteristic light pattern which is significantly different from other pixels in the reference image data depending on the observation angle is selected and used.

Alternatively, the similarity calculation unit 109 may also be configured to convert numerical values of RGB of all pixels or some corresponding pixels of the captured image data and the reference image data into an appropriate color space, accumulate a square value of a Euclidean distance of the color space, and output the addition result as the numerical value indicative of the degree of similarity. As with the case of using mean square error, the lower the numerical value of similarity, the higher the similarity between the captured image data and the reference image data.

As described above, the similarity calculation unit 109 calculates a degree of similarity between the captured image data and the reference image data corresponding to the captured image data in sequence for each determination image data identification information in the captured image data table for authenticity determination in the image data storage unit 113. The similarity calculation unit 109 correlates the calculated degree of similarity with the captured image data identification information of the captured image data from which the degree of similarity is calculated, and writes and stores the calculated similarity into the captured image data table for authenticity determination in the image data storage unit 113.

Further, in the case where the intensity of the illumination light for the captured image data does not correspond to the reference image data, pixels cannot be simply compared.

For this reason, evaluation can be performed based on the color tone of RGB between predetermined pixels. That is, a difference in mean square error between R/G (a ratio between the gradient of R and the gradient of G) between predetermined pixels in the captured image data and R/G between pixels in the reference image data corresponding to the predetermined pixels of the captured image data may be calculated to thereby eliminate a difference in intensity of the illumination light and calculate the numerical value indicative of degree of similarity with high accuracy. The R/G is calculated for a set of two pixels, a pixel A and a pixel B, as a ratio where the gradient of R of the pixel A is divided by the gradient of G of the pixel B. Alternatively, not only R/G but also B/G (a ratio between the gradient of B and the gradient of G) may also be used in combination. The predetermined pixels as described herein are defined in advance as a combination of pixels of a large R/G or B/G.

Each time a degree of similarity is written in the captured image data table for authenticity determination corresponding to the determination image data identification information, the authenticity determination unit 110 reads the degree of similarity corresponding to the determination image data identification information, from the captured image data table for authenticity determination. Then, the authenticity determination unit 110 compares each of the similarities corresponding to the determination image data identification information, which have been read, with a predetermined similarity threshold. The similarity threshold is obtained and set in advance as an experimental value obtained as follows: a degree of similarity between the captured image data captured at a certain imaging viewpoint (within a predetermined range of reference imaging viewpoint) and the reference image data obtained corresponding to the reference imaging viewpoint of the captured image data is calculated, and a numerical value exceeding the degree of similarity between the captured image data and the reference image data for each identical observation angle is taken as the experimental value. The similarity thresholds are different depending on the observation angle, and the authenticity determination unit 110 performs an authenticity determination process for the anti-counterfeiting medium using the similarity threshold which corresponds to the observation angle.

The authenticity determination unit 110 calculates a degree of similarity of the captured image data to the reference image data, and determines a credit card 300 (object for authenticity determination) to which the anti-counterfeiting medium 400 is attached as fake (a non-authentic product) if the degree of similarity to the reference image data is not less than the similarity threshold.

Further, the authenticity determination unit 110 calculates similarities for one or more pieces of the captured image data, and determines that the credit card 300 (object for authenticity determination) to which the anti-counterfeiting medium 400 is attached as genuine (an authentic product) if all the similarities are less than the similarity threshold.

Moreover, the imaging control unit 102 determines whether the imaging unit 101 when capturing images satisfies imaging conditions for capturing image data having a quality available for comparison with the reference image data.

The imaging conditions may include, if necessary, presence or absence of an illumination or intensity of the illumination as an exposure condition.

The imaging control unit 102 generates, as an imaging condition, a luminance histogram when setting the exposure condition of the imaging unit 101. The imaging control unit 102 indicates a gradient distribution of pixels and uses the generated luminance histogram to determine whether the gradient distribution in the captured image data is not biased to a high gradient region or a low gradient region. For example, when the gradient distribution in the luminance histogram is biased to the low gradient region, that is, when the pixels are dominant at the gradient near 0 in the captured image data while the gradient is expressed by 256 tones ranging from 0 to 255, black defects occur in the captured image data so that the comparison with the reference image data cannot be performed. On the other hand, when the gradient distribution in the luminance histogram is biased to the high gradient region, that is, when pixels are dominant at the gradient near 255 in the captured image data, halation occurs in the captured image data so that the comparison with the reference image data cannot be performed.

Therefore, the exposure condition is required to be set to allow the distribution in the luminance histogram to be present around the median of the gradient ranging from 0 to 255.

The imaging control unit 102 determines whether the illumination is required to be adjusted on the basis of the gradient distribution of the luminance histogram. When the black defects are expected to appear and the illumination is required to be adjusted to shift the distribution of the luminance histogram toward the high gradient region, the imaging control unit 102 causes the exposure control unit 103 to illuminate the anti-counterfeiting medium 400 by the lighting unit 104 with a predetermined intensity during imaging (for example, by irradiating flash light in the imaging direction). Further, when the authenticity determination device 1 does not include the exposure control unit 103 and the lighting unit 104, the imaging control unit 102 displays information prompting the user to irradiate illumination with necessary light intensity to the anti-counterfeiting medium 400 on the screen of the display unit 112.

On the other hand, when halation is expected to occur and the illumination is required to be adjusted to shift the distribution of the luminance histogram toward the low gradient region, the imaging control unit 102 controls the exposure control unit 103 so that the lighting unit 104 does not illuminate the anti-counterfeiting medium 400, or can illuminate the anti-counterfeiting medium 400 with a predetermined intensity during imaging. Further, the imaging control unit 102 displays information prompting the user to lower the intensity of current ambient illumination around the anti-counterfeiting medium 400 on the screen of the display unit 112 in order to irradiate illumination with required light intensity to the anti-counterfeiting medium 400.

In the above-described processes, an exposure control table, which includes distributions of luminance histogram and control conditions such as exposure conditions and illumination intensities corresponding to the distributions, may be prepared. The exposure control table may be written and stored in the image data storage unit 113 in advance. In this case, the imaging control unit 102 searches a luminance histogram similar to the luminance histogram pattern of the image data to be captured from the exposure control table in the image data storage unit 113, reads the information on the control condition such as the exposure condition and the illumination intensity of the image data to be captured, and displays the control condition on the screen of the display unit 112 as described above.

Further, an illuminance sensor may also be provided for the exposure control unit 103, and the exposure condition and the degree of illuminance may be set based on the illuminance detected by the illuminance sensor. Here, an exposure control table, which includes illuminances and control conditions such as exposure conditions and illumination intensities corresponding to the illuminances, may be prepared. The exposure control table may be written and stored into the image data storage unit 113 in advance. In this case, the imaging control unit 102 searches through the exposure control table in the image data storage unit 113, finding correlation with the illuminance in capturing the image data, to read the information on the control condition such as the exposure condition and the illumination intensity of the image data to be captured, and displays the control condition on the screen of the display unit 112 as described above.

In the image data storage unit 113, the above-described captured image data, reference image data, captured image data table and the captured image data table for authenticity determination are written and stored.

The display unit 112 is configured of, for example, a liquid crystal display, and displays images on the screen thereof.

Figure 15:
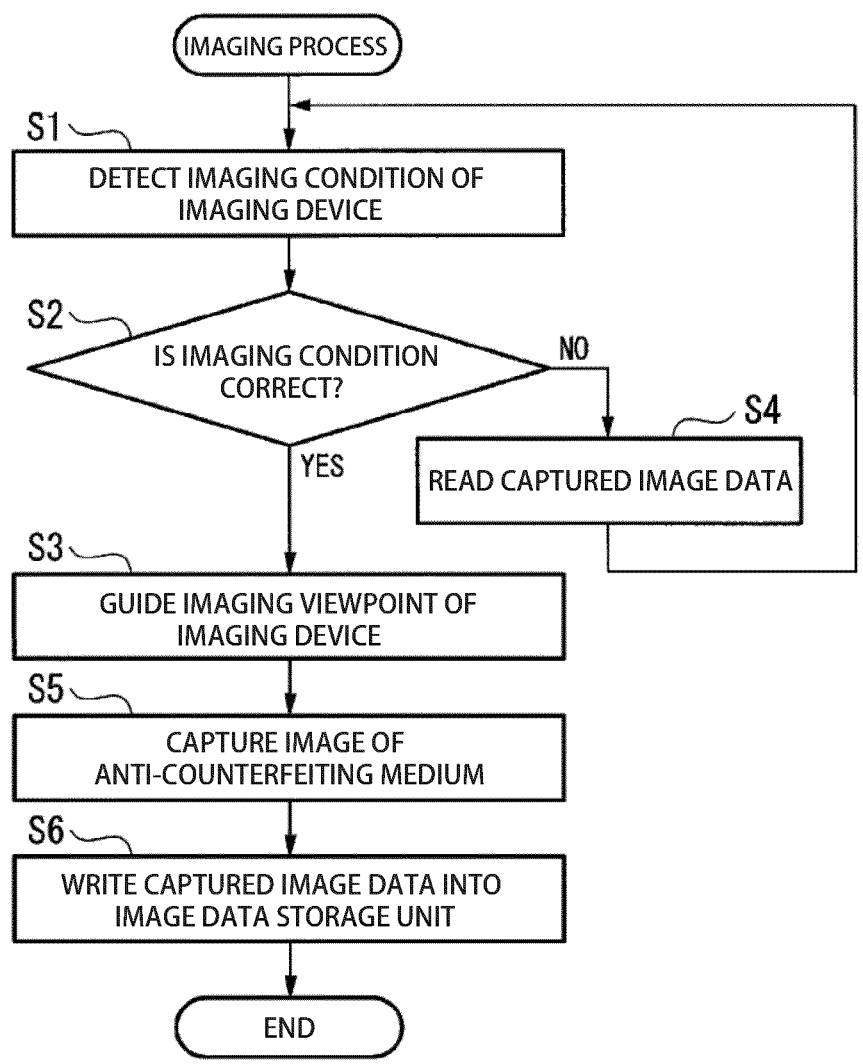
FIG. 15 is a flowchart of an exemplary operation of capturing image data in authenticity determination process for an authenticity determination object using an anti-counterfeiting medium in the identification device according to the first embodiment.

FIG. 15 is a flowchart of an exemplary operation of capturing image data used for an authenticity determination process for an authenticity determination object using an anti-counterfeiting medium in the identification device according to the first embodiment. In the present embodiment, it is assumed that the anti-counterfeiting medium 400 is imaged on video mode.

Step S1:

The imaging control unit 102 detects current imaging conditions such as an exposure condition for the authenticity determination object in the imaging unit 101.

Step S2:

The imaging control unit 102 determines whether all the imaging conditions such as the exposure condition satisfy the conditions for capturing the image data having a quality available for comparison with the reference image data.

If the imaging conditions satisfy the conditions for capturing the image data having a quality available for comparison with the reference image data, the imaging control unit 102 proceeds the process to step S3. On the other hand, if the imaging conditions do not satisfy the conditions for capturing the image data having a quality available for comparison with the reference image data, the imaging control unit 102 proceeds the process to step S4.

Step S3:

When calculating the imaging angle of the imaging unit 101 at the imaging viewpoint, the observation angle estimation unit 105 calculates a coordinate position of the anti-counterfeiting medium 400 in the three-dimensional coordinate system and an imaging coordinate value of the imaging unit 101 at the imaging viewpoint from the captured image data. Further, the observation angle estimation unit 105 calculates an imaging angle of the imaging unit 101 relative to the anti-counterfeiting medium 400 on the basis of the coordinate position of the anti-counterfeiting medium 400 in the three-dimensional coordinate system and the imaging coordinate value of the imaging unit 101, and the imaging coordinate value and the imaging angle of the imaging unit 101 are each defined as the imaging viewpoint of the imaging unit 101.

The match-percentage notification unit 106 displays a match-percentage indicator on the screen 111A, prompting the user to move the authenticity determination device 1 so that the imaging viewpoint of the imaging unit 101 matches with the reference imaging viewpoint which is set in advance corresponding to the authenticity determination device 1.

Then, the match-percentage notification unit 106, when determining that the imaging viewpoint matches with the reference imaging viewpoint, outputs an imaging command signal to the imaging control unit 102.

Step S4:

The imaging control unit 102 displays unsatisfied imaging conditions on the screen of the display unit 112 to prompt the user to adjust the unsatisfied imaging conditions, and proceeds the process to step S1.

Step S5:

The imaging control unit 102 causes the imaging unit 101 to perform imaging process to obtain captured image data of the anti-counterfeiting medium 400. In the case where imaging is performed on video mode, the imaging control unit 102 extracts video frames at the imaging viewpoint that matches with the reference imaging viewpoint as captured image data. In video mode, the process of extracting frames corresponds to the process of capturing image data.

Step S6:

The imaging control unit 102 adds captured image data identification information to the captured image data, and writes and stores the captured image data in the image data storage unit 113 together with a captured image data address, which is an address pointing to a region of the image data storage unit 113 in which the captured image data is written.

Figure 16:
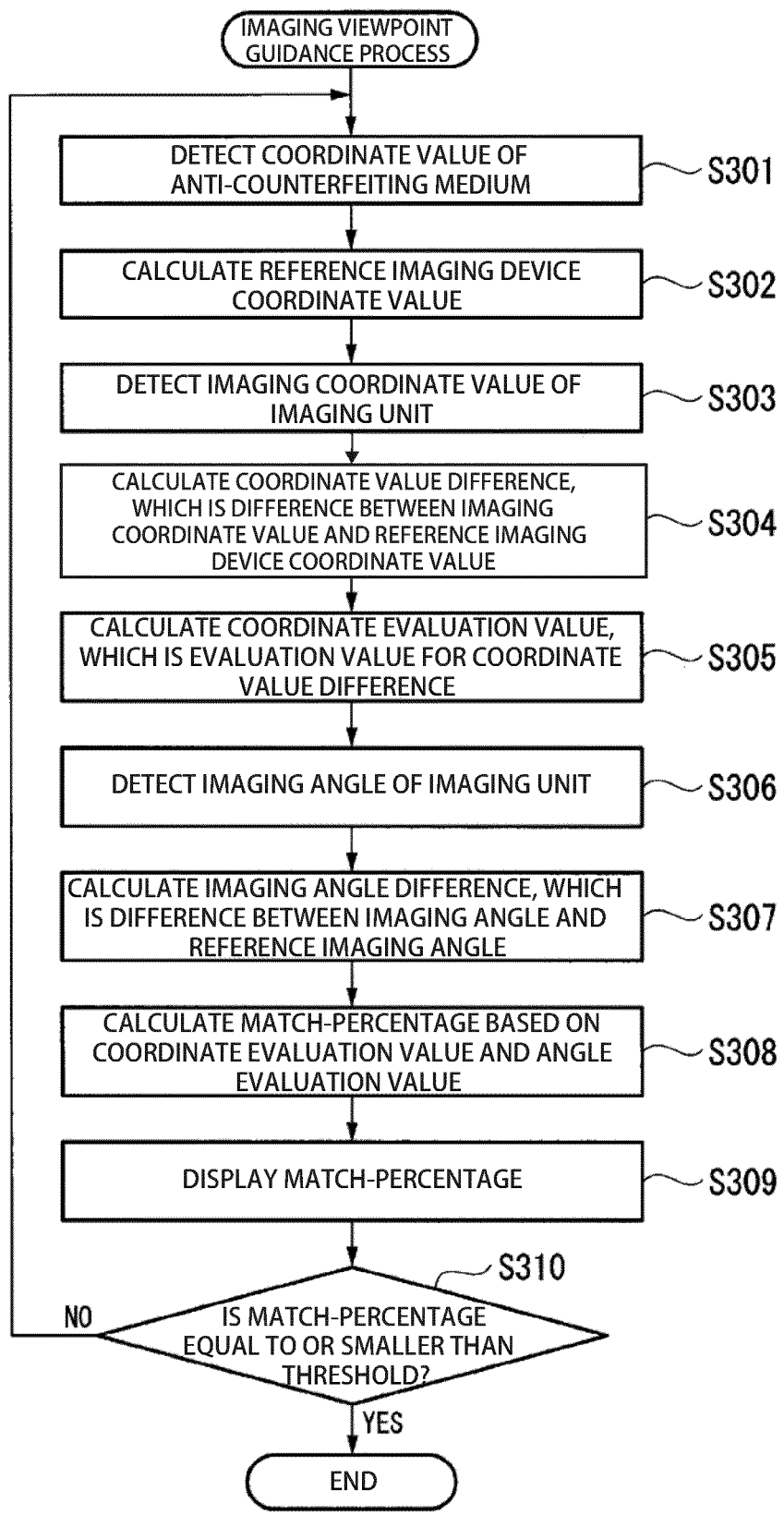
FIG. 16 is a flowchart that details a process of imaging viewpoint guidance for an imaging device at Step S3 in the flowchart shown in FIG. 15.

FIG. 16 is a flowchart that details a process of imaging viewpoint guidance for an imaging device at Step S3 in the flowchart shown in FIG. 15. The following describes the process by means of an example in which the match-percentage indicator in FIGS. 9A to 9C is displayed on the screen 111A.

Step S301:

The observation angle estimation unit 105 calculates a coordinate position of the anti-counterfeiting medium 400 in the three-dimensional coordinate system from the captured image data by a predetermined coordinate conversion equation.

Step S302:

The match-percentage notification unit 106 calculates the reference imaging viewpoint (reference imaging angle and reference imaging coordinate value) of the reference image data, which is set as a relative position to the coordinate position of the anti-counterfeiting medium 400, into an absolute position correlated to the three-dimensional coordinate system calculated by the observation angle estimation unit 105.

Step S303:

The observation angle estimation unit 105 calculates the imaging coordinate value of the imaging unit 101 in the three-dimensional coordinate system from the captured image data by the coordinate conversion equation.

Step S304:

The match-percentage notification unit 106 calculates a difference between the reference imaging coordinate value and the imaging coordinate value as an imaging coordinate value difference $\Delta P$.

Step S305:

The match-percentage notification unit 106 calculates a square difference $\Delta R$ as a coordinate evaluation value from the coordinate difference $\Delta P$ obtained as above.

Step S306:

The observation angle estimation unit 105 calculates an imaging angle of the imaging unit 101 in the three-dimensional coordinate system from the captured image data by the coordinate conversion equation.

Step S307:

The match-percentage notification unit 106 calculates a difference between the reference imaging angle and the imaging angle value as an imaging angle difference $\Delta \alpha$.

Step S308:

The match-percentage notification unit 106 reads the match-percentage correlated to the square difference $\Delta R$ and the imaging angle difference $\Delta \alpha$ from the evaluation table.

Step S309:

The match-percentage notification unit 106 displays the match-percentage thus obtained on the screen 111A as shown in FIG. 9A.

Step S310:

The match-percentage notification unit 106 determines whether the match-percentage falls within a predetermined range, that is, whether the imaging viewpoint matches with the reference imaging viewpoint.

If the imaging viewpoint matches with the reference imaging viewpoint, the match-percentage notification unit 106 terminates the procedure (proceeds the process to step S5 in FIG. 15). On the other hand, if the imaging viewpoint does not match the reference imaging viewpoint, the match-percentage notification unit 106 proceeds the process to step S301.

Figure 17:
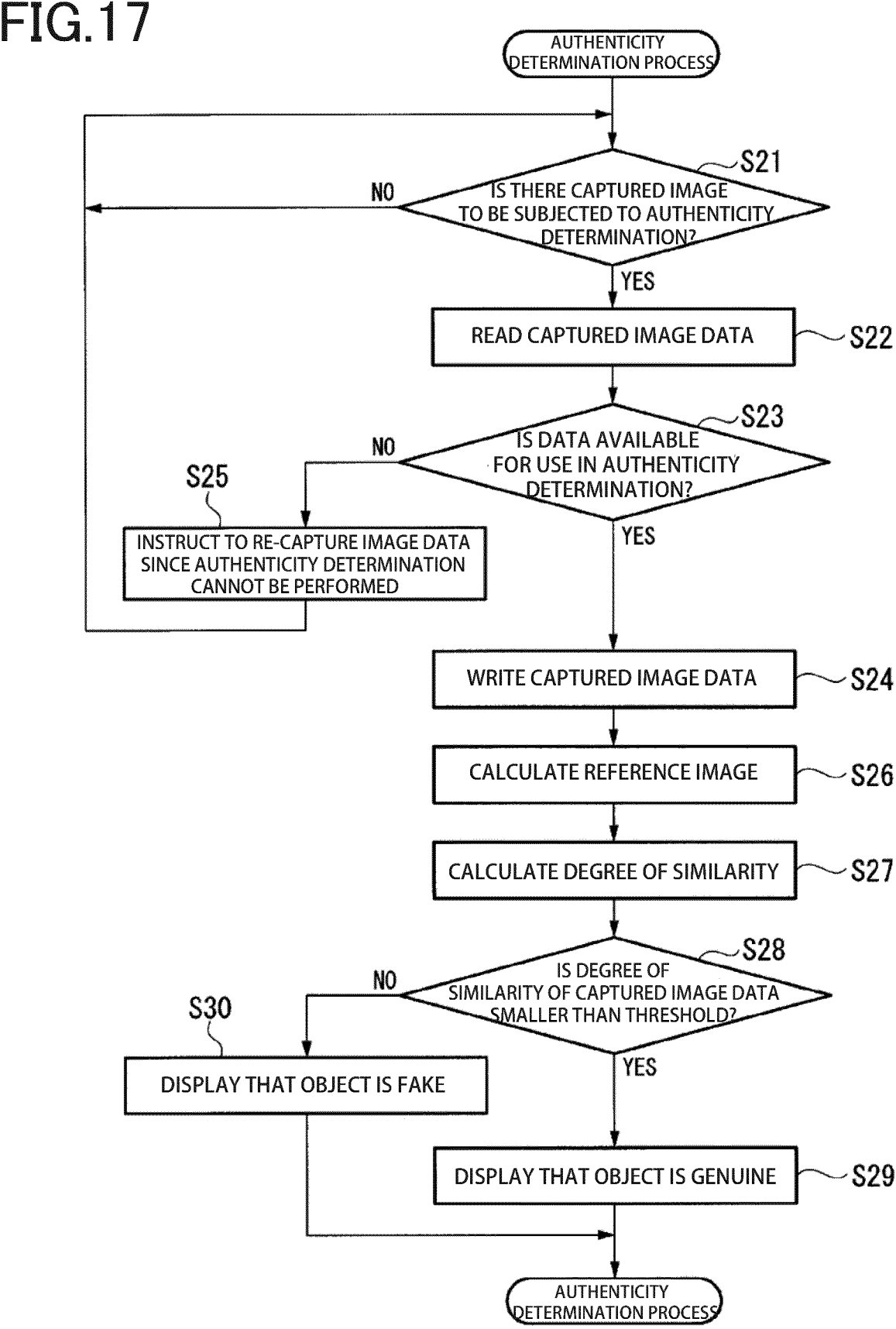
FIG. 17 is a flowchart of an exemplary operation of authenticity determination process for an authenticity determination object using an anti-counterfeiting medium in the identification device according to the first embodiment.

FIG. 17 is a flowchart of an exemplary operation of authenticity determination process for an authenticity determination object using an anti-counterfeiting medium in the identification device according to the first embodiment.

Step S21:

The available image selecting unit 107 determines whether the unprocessed captured image data is present in the captured image data table in the image data storage unit 113.

If the unprocessed captured image data is present in the captured image data table, the available image selecting unit 107 proceeds the process to step S22. On the other hand, if the unprocessed captured image data are not present in the captured image data table, the available image selecting unit 107 repeats step S21.

Step S22:

The available image selecting unit 107 reads a captured image data address of unprocessed captured image data from the captured image data table.

The available image selection unit 107 reads the unprocessed captured image data from the captured image data storage unit 113 by using the captured image data address to determine whether the data are available for comparison with the reference image data.

Step S23:

The available image selecting unit 107 determines whether the captured image data which have been read are available for comparison with the reference image data.

The available image selecting unit 107 determines, for example, whether the entire shape of the anti-counterfeiting medium 400 is included in the captured image data, whether the anti-counterfeiting medium 400 is in focus, and whether the luminance histogram is appropriately distributed. The available image selecting unit 107 proceeds the process to step S23 if the captured image data are available for comparison with the reference image data, and proceeds the process to step S24 if the captured image data are not available for comparison with the reference image data.

Step S24:

If the captured image data are determined as being available for comparison with the reference image data, the available image selecting unit 107 adds determination image data identification information to the captured image data. The available image selecting unit 107 writes and stores the determination image data identification information of the captured image data, together with the determination image data identification information which has been added as above, in the captured image data table for authenticity determination in the image data storage unit 113.

Step S25:

If the captured image data are determined as not being available for comparison with the reference image data, the available image selecting unit 107 returns the process to step S21 and again obtains the captured image data.

Here, the available image selecting unit 107 may be configured to display a message on the screen of the display unit 112, suggesting to change the current imaging viewpoint and image the anti-counterfeiting medium 400. This message is provided for obtaining the captured image data having appropriate focus and distribution of luminance histogram. With this message suggesting to change the imaging viewpoint, the user can recognize that the authenticity determination process for the anti-counterfeiting medium 400 is being in progress and further information on the anti-counterfeiting medium 400 is required to advance the authenticity determination process.

Step S26:

Based on the imaging viewpoint of the captured image data, the reference image generation unit 108 generates reference image data corresponding to the imaging viewpoint of the captured image data by calculation using predetermined simulation or the like. The reference image generation unit 108 writes the generated reference image data in the image data storage unit 113, and writes and stores the address of the written data as a reference image data address in the captured image data table for authenticity determination.

Step S27:

The similarity calculation unit 109 reads the captured image data identification information to which calculation of degree of similarity has not yet been performed from the captured image data table for authenticity determination in the image data storage unit 113. Then, the similarity calculation unit 109 reads, from the captured image data table in the image data storage unit 113, a captured image data address corresponding to the captured image data identification information which has been read. The similarity calculation unit 109 reads, from the image data storage unit 113, captured image data corresponding to the captured image data address which has been read. Further, the similarity calculation unit 109 reads the reference image data address of the corresponding imaging angle from the captured image data table for authenticity determination, and reads the reference image data from the image data storage unit 113 by using the reference image data address.

The similarity calculation unit 109 calculates the degree of similarity of the captured image data to the reference image data by using template matching. The similarity calculation unit 109 correlates the calculated degree of similarity to the captured image data identification information for storage and writing into the captured image data table in the image data storage unit 113 for authenticity determination.

Step S28:

The authenticity determination unit 110 reads, from the captured image data table for authenticity determination in the image data storage unit 113, the captured image data to which calculation of degree of similarity has not yet been performed and determines whether the degree of similarity which has been read is less than the predetermined similarity threshold.

Then, the authenticity determination unit 110 determines whether the degree of similarity of the captured image data indicated by the captured image data identification information which has been read from the captured image data table for authenticity determination is less than the similarity threshold. When the degree of similarity of the captured image data indicated by the captured image data identification information is less than the similarity threshold, the authenticity determination unit 110 determines that the anti-counterfeiting medium is genuine and thus the authenticity determination object is genuine (an authentic product), and proceeds the process to step S29. On the other hand, when the degree of similarity of the captured image data indicated by the captured image data identification information is not less than the similarity threshold, the authenticity determination unit 110 determines that the anti-counterfeiting medium is fake and thus the authenticity determination object is fake (a non-authentic product), and proceeds the process to step S30.

Step S29:

The authenticity determination unit 110 displays an image on the display unit 112 indicating that the authenticity determination object is an authentic product (for example, see FIG. 9C). Then, the authenticity determination device 1 terminates the authenticity determination process for the authenticity determination object.

Step S30:

The authenticity determination unit 110 displays an image on the display unit 112 indicating that the authenticity determination object is a non-authentic product. Then, the authenticity determination device 1 terminates the authenticity determination process for the authenticity determination object.

According to the configuration described above, in the present embodiment, the match-percentage notification unit 106 determines whether the imaging viewpoint is the predetermined reference imaging viewpoint, and displays on the screen of the display unit 112 whether the match-percentage between the reference imaging viewpoint and the imaging viewpoint increases or decreases as the progress of authenticity determination process by using the match-percentage indicator that indicates the match-percentage of the imaging viewpoint to the reference imaging viewpoint. Thus, according to the present embodiment, the user can intuitively recognize by the progress indicator whether the process preparing for the authenticity determination process is being in progress or not by moving the authenticity determination device 1.

Further, according to the present embodiment, the captured image data of the anti-counterfeiting medium is compared with the reference image data which is a genuine anti-counterfeiting medium captured at the observation angle of the captured image data to determine whether the anti-counterfeiting medium is genuine or fake. Hence, without using a conventional special authenticity determination device, and without relying on the disposition condition of the anti-counterfeiting medium, authenticity determination of the anti-counterfeiting medium (genuine or fake) can be readily performed by capturing an image of the anti-counterfeiting medium with a simple image capturing device such as a general purpose digital camera.

In the present embodiment, an example is described in which the match-percentage notification unit 106 displays the match-percentage indicator which displays a progress bar indicative of progress of authenticity determination on the screen 111A of the display unit 112 as a technique of progress notification in authenticity determination.

However, the above progress bar is merely an example, and the match-percentage notification unit 106 may also be configured to display an image such as those shown in FIGS. 10A to 10C, 11A to 11C, 12A to 12C, and 13A to 13C on the screen 111A of the display unit 112 as the match-percentage indicator to thereby notify the degree of progress of authenticity determination.

Second Embodiment

Hereinafter, with reference to the drawings, a second embodiment of the present invention will be described.

Figure 18:
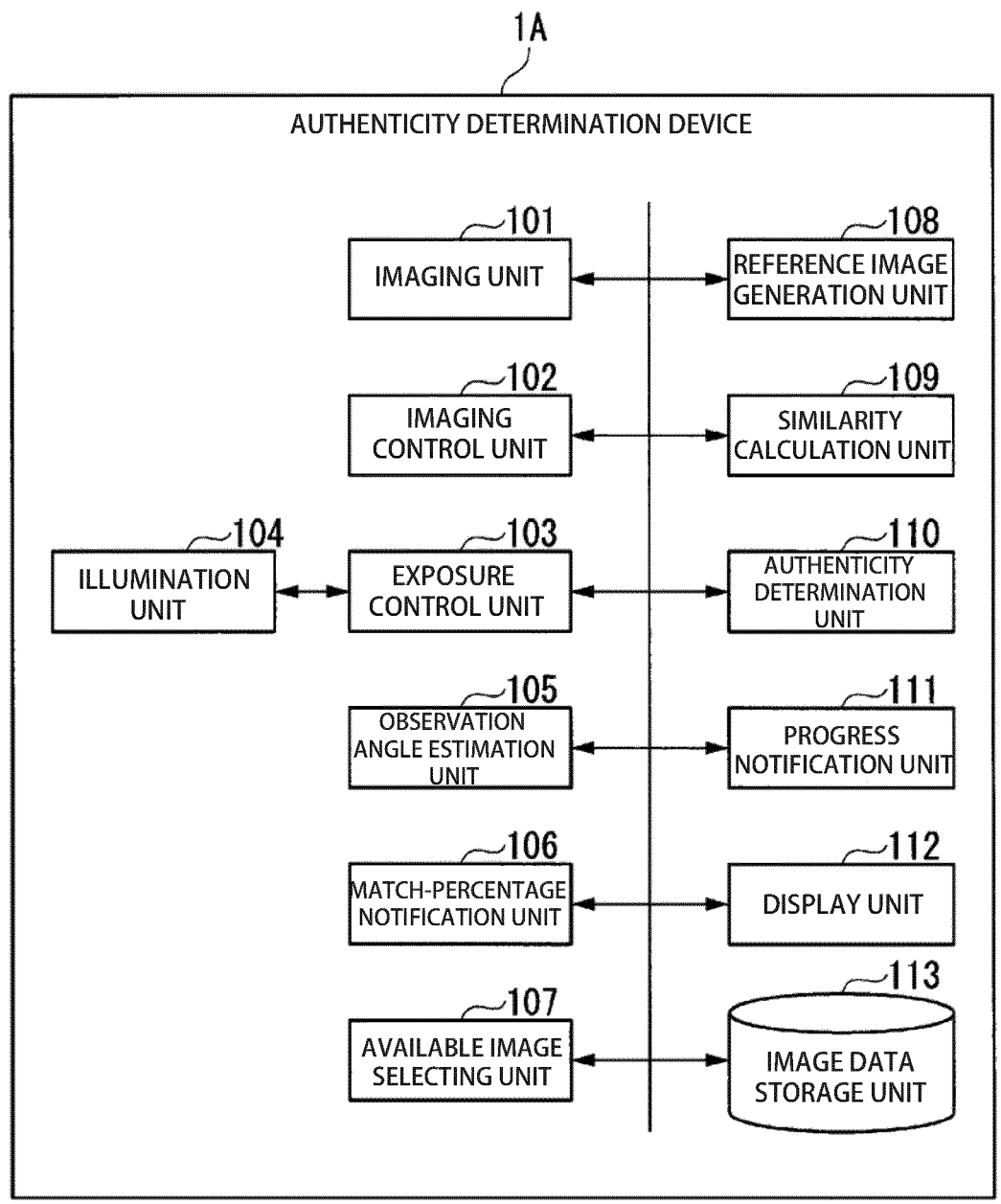
FIG. 18 is a block diagram which illustrates a configuration example of an identification device according to a second embodiment.

FIG. 18 is a block diagram which illustrates a configuration example of an identification device according to a second embodiment. In FIG. 18, an authenticity determination device 1A includes an imaging unit 101, an imaging control unit 102, an exposure control unit 103, an illumination unit 104, an observation angle estimation unit 105, a match-percentage notification unit 106, an available image selecting unit 107, a reference image generation unit 108, a similarity calculation unit 109, an authenticity determination unit 110, a progress notification unit 111, a display unit 112, and an image data storage unit 113. In the identification device according to the first embodiment, the imaging unit 101 and the illumination unit 104 are integrated to provide a configuration corresponding to authenticity determination of retroreflective anti-counterfeiting media. The same elements as those of the first embodiment in FIG. 1 are denoted by the same reference characters, and only the elements different from those of the first embodiment will be described below.

In the authenticity determination device 1A according to the second embodiment, the progress notification unit 111 is provided in addition to the configuration of the first embodiment.

Each time a piece of determination information is supplied from the authenticity determination unit 110, the progress notification unit 111 integrates the supplied piece of determination information to thereby calculate the number of pieces of the determination information. Then, the progress notification unit 111 calculates the degree of progress by dividing the number of obtained pieces of determination information by a specified number, and notifies the user of the progress calculated.

In the case where the reference imaging viewpoints are set for a plurality of specified positions, a guiding process is performed for the user so that the imaging viewpoint of the imaging unit 101 is guided to each of the reference imaging viewpoints. The image data are captured at each imaging viewpoint corresponding to each reference imaging viewpoint, and authenticity determination is performed for each of the captured image data.

Further, each time a piece of determination information is supplied from the authenticity determination unit 110, the progress notification unit 111 integrates the supplied piece of determination information to thereby calculate the number of pieces of the determination information. Then, the progress notification unit 111 calculates the degree of progress by dividing the number of obtained pieces of determination information by a specified number, and notifies the user of the progress calculated. When notifying the degree of progress calculated, the progress notification unit 111 displays, for example, a progress indicator so that the user can intuitively recognize the stage of progress.

The available image selecting unit 107 determines whether newly captured image data matches with the already-obtained reference imaging viewpoint. The number of reference imaging viewpoints is set in advance, which corresponds to the reliability level of the authenticity determination. The number of pieces of captured image data used for authenticity determination, that is, a specified number of different reference imaging viewpoints (combinations of the imaging angle and the imaging coordinate value) at which the image data used for authenticity determination is captured is set in advance. If the captured image data matches with the already-obtained reference imaging viewpoint, the available image selecting unit 107 deletes the data corresponding to the captured image data identification information correlated to the imaging viewpoint, from the captured image data table for authenticity determination. On the other hand, if the calculated imaging viewpoint corresponds to the predetermined reference imaging viewpoint and does not match the already-obtained reference imaging viewpoint, the available image selecting unit 107 causes the reference image generation unit 108 to generate a reference image.

The authenticity determination unit 110 calculates similarities for one or more pieces of the captured image data, and determines a credit card 300 (object for authenticity determination) to which the anti-counterfeiting medium 400 is attached as fake (a non-authentic product) if the degree of similarity of even a single piece of the captured image data to the reference image data is not less than the similarity threshold. Further, the authenticity determination unit 110 calculates similarities for one or more pieces of the captured image data, and determines that the credit card 300 (object for authenticity determination) to which the anti-counterfeiting medium 400 is attached as genuine (an authentic product) if all the similarities are less than the similarity threshold.

Here, each time the captured image data at the imaging viewpoint is determined to be "genuine" by authenticity determination, the authenticity determination unit 110 outputs determination information indicating that the authenticity determination of the anti-counterfeiting medium 400 has made a determination of "genuine" to the progress notification unit 111.

Figure 19A:
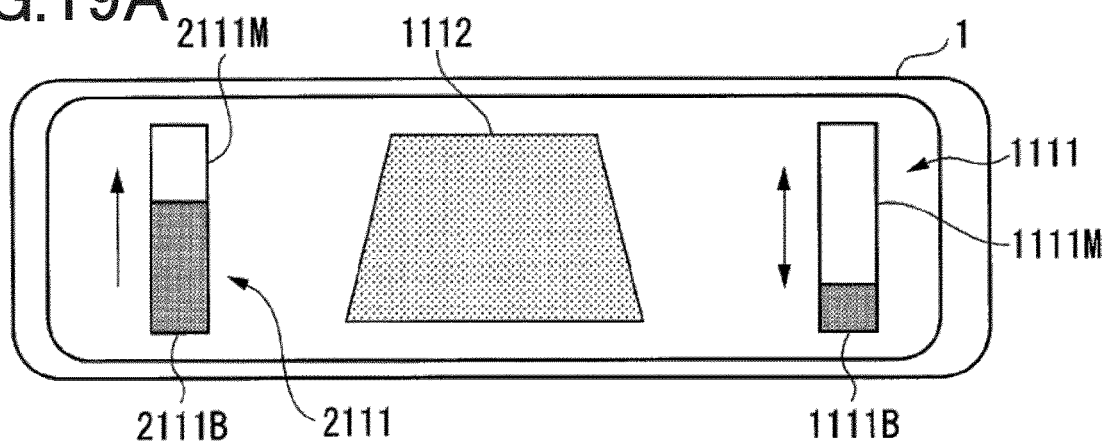
FIG. 19A is a view which illustrates an example of a progress indicator that is displayed on a screen of the display unit 112 by a progress notification unit 111.
Figure 19B:
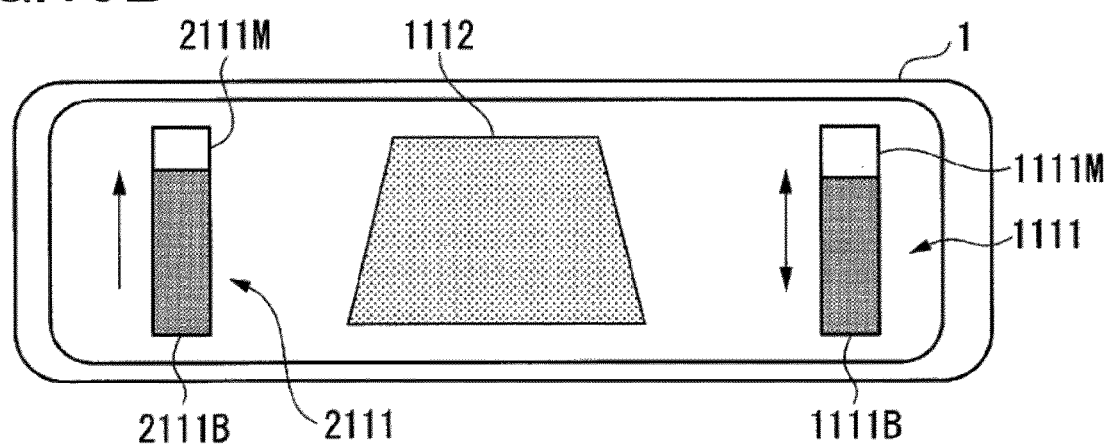
FIG. 19B is a view which illustrates an example of a progress indicator that is displayed on a screen of the display unit 112 by the progress notification unit 111.
Figure 19C:
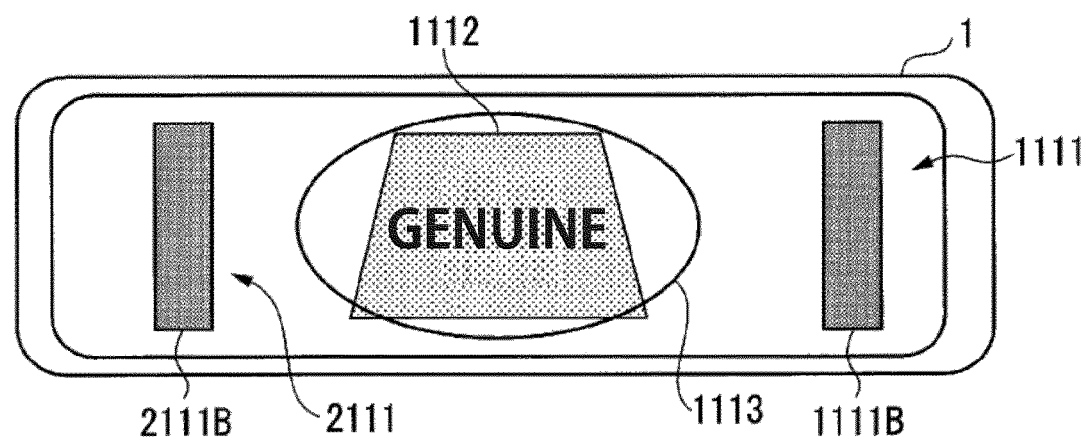
FIG. 19C is a view which illustrates an example of a progress indicator that is displayed on a screen of the display unit 112 by the progress notification unit 111.

FIGS. 19A to 19C are views which illustrate examples of the match-percentage indicator and the progress indicator displayed on the screen of the display unit 112 by the match-percentage notification unit 106 and the progress notification unit 111. In FIGS. 19A to 19C, a captured image including an image 1112 of the credit card 300, a match-percentage indicator 1111, and a progress indicator 2111 is displayed on the screen 111A (screen of the display unit 112 in FIG. 1) of the authenticity determination device 1.

In FIGS. 19A to 19C, a progress bar is each used as the match-percentage indicator 1111 and the progress indicator 2111. Since the match-percentage indicator 1111 is the same as that shown in FIGS. 9A to 9C, the description thereof is omitted. As shown in FIGS. 19A and 19B, a progress meter 2111M is configured such that a bar 2111B fills the area corresponding to the percentage of calculated degree of progress. Accordingly, in the present embodiment, the user can easily recognize the progress state of authenticity determination as well as how the stage of progress of authenticity determination is proceeding. Therefore, the user can visually recognize that the process of authenticity determination is actually in progress, and smoothly perform the process of authenticity determination.

On the basis of the progress obtained by dividing the number of pieces of determination information by a specified number, the progress notification unit 111 updates the bar 2111B to fill the area corresponding to the progress in the progress meter 2111M each time a new degree of progress is obtained.

FIG. 19C is a view which illustrates an example of the progress indicator in the case where authenticity determination of the anti-counterfeiting medium makes a determination of "genuine".

When the authenticity determination process produces a result of "genuine", the degree of progress becomes 100%. Accordingly, the progress notification unit 111 fills the entire progress meter 2111M of the progress bar (progress indicator 2111) with the bar 2111B. Further, the authenticity determination unit 110 notifies the user in an intuitive manner that the authenticity determination result is "genuine" by displaying a result notification image 1113 on the screen 111A. For example, when the process of authenticity determination process produces a result of "genuine", the result notification image 1113 is an image which includes a symbol image 1113A representing "genuine" to thereby visually indicate the result of authenticity determination. Although not shown in the figure, when the process of authenticity determination process produces a result of "fake", the progress notification unit 111 deletes the image of the bar 1111B in the progress meter 1111M of the progress bar. The authenticity determination unit 110 notifies the user in an intuitive manner that the authenticity determination result is "fake" by displaying the result notification image 1113 which includes a symbol image representing "fake" on the screen 111A.

Figure 20:
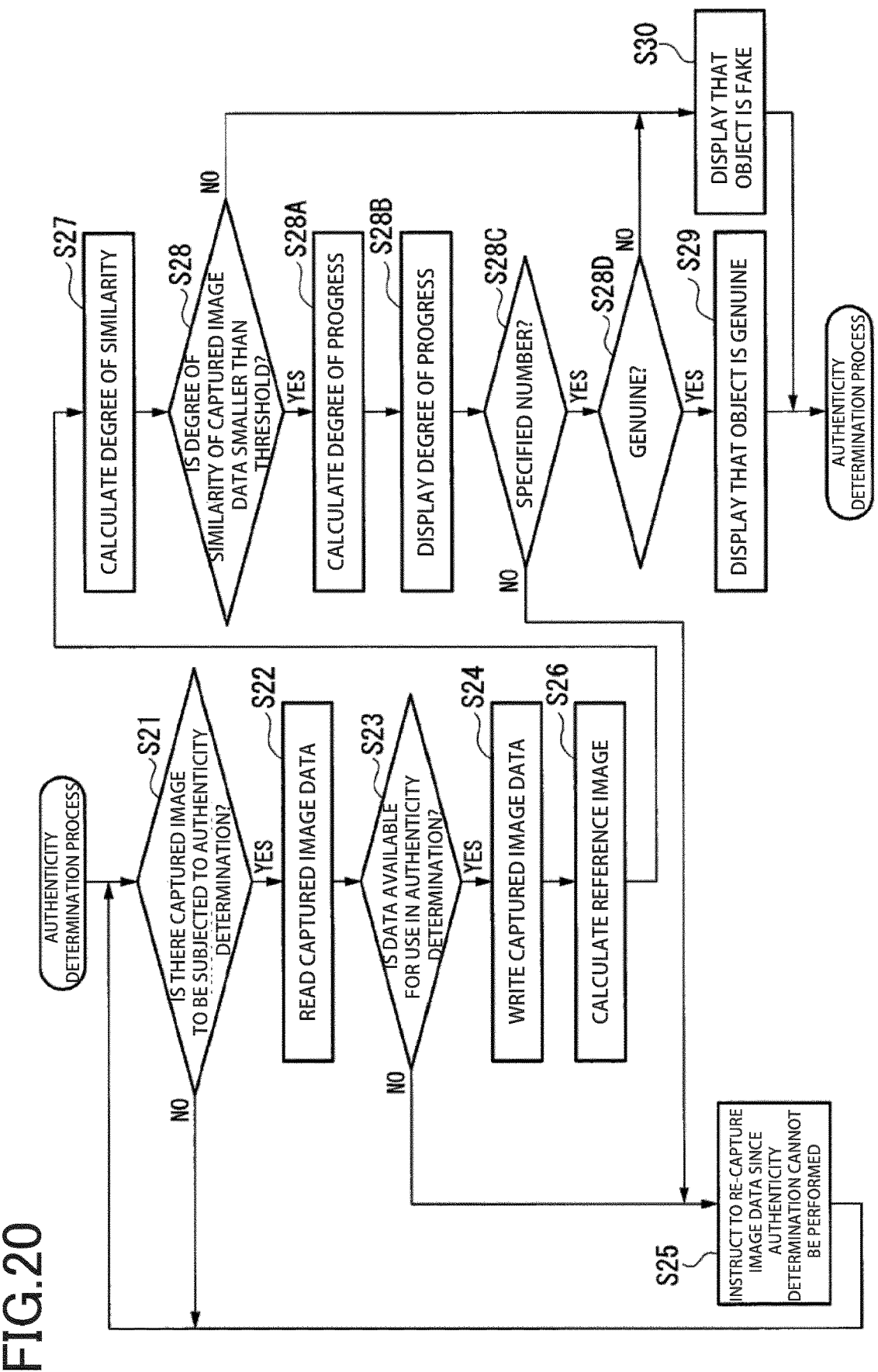
FIG. 20 is a flowchart of an exemplary operation of an authenticity determination process for an authenticity determination object performed using an anti-counterfeiting medium in the identification device according to the second embodiment.

FIG. 20 is a flowchart of an exemplary operation of authenticity determination process for an authenticity determination object using an anti-counterfeiting medium in the identification system according to the second embodiment. In FIG. 20, the same steps as those of FIG. 17 are denoted by the same step numbers, and the description thereof is omitted. The following description will be made on step S28 through step 28D.

Step S28:

The authenticity determination unit 110 sequentially reads, from the captured image data table for authenticity determination in the image data storage unit 113, the captured image data to which calculation of degree of similarity has not yet been performed and determines whether the degree of similarity which has been read is less than the predetermined similarity threshold.

Then, the authenticity determination unit 110 determines whether the degree of similarity of the captured image data indicated by the captured image data identification information which has been read from the captured image data table for authenticity determination is less than the similarity threshold. When the degree of similarity of the captured image data indicated by the captured image data identification information is less than the similarity threshold, the authenticity determination unit 110 determines that the anti-counterfeiting medium is genuine and thus the authenticity determination object is genuine (an authentic product), and proceeds the process to step S28A. On the other hand, when the degree of similarity of the captured image data indicated by the captured image data identification information is not less than the similarity threshold, the authenticity determination unit 110 determines that the anti-counterfeiting medium is fake and thus the authenticity determination object is fake (a non-authentic product), and proceeds the process to step S30.

Step S28A:

The authenticity determination unit 110, when determining that the anti-counterfeiting medium is genuine, outputs determination information to the progress notification unit 111, instructing calculation of the degree of progress as information indicating that the authenticity determination process produces a result of "genuine".

The progress notification unit 111 increments the number of pieces of determination information (adds 1) each time a piece of determination information is supplied from the authenticity determination unit 110 to thereby calculate the integrated value.

Then, the progress notification unit 111 divides the integrated value thus obtained by a predetermined specified number of pieces of determination information to thereby calculate degree of progress.

Step S28B:

The progress notification unit 111 displays the calculated degree of progress as the progress indicator on the screen 111A of the display unit 112 (for example, the progress indicator 2111 shown in FIGS. 19A to 19C) to notify the user of the degree of progress.

Step S28C:

The progress notification unit 111 determines whether the number of pieces of determination information reaches a specified number. When it reaches the specified number, the progress notification unit 111 outputs the calculated degree of progress to the authenticity determination unit 110, and proceeds the process to step S28D.

On the other hand, when the number of pieces of determination information does not reach the specified number, the progress notification unit 111 proceeds the process to step S25.

Step S28D:

The authenticity determination unit 110 determines whether the degree of progress supplied from the progress notification unit 111 exceeds a predetermined "genuine"-determination threshold. The authenticity determination unit 110 proceeds the process to step S29 if the degree of progress exceeds the "genuine"-determination threshold and proceeds the process to step S20 if the degree of progress is not more than the "genuine"-determination threshold.

With this configuration of the present embodiment, the progress notification unit 111 displays the progress indicator corresponding to the stage of the authenticity determination on the screen of the display unit 112. Accordingly, the user can intuitively recognize how the stage of authenticity determination is proceeding as he moves the authenticity determination device 1 from the changes in the progress indicator. Accordingly, even if the user cannot sufficiently recognize whether the determination algorithm for authenticity determination of the anti-counterfeiting medium 400 is being performed, the user can smoothly perform authenticity determination without being concerned about how the process of authenticity determination is proceeding.

In the present embodiment, an example is described in which the progress notification unit 111 displays the progress indicator which displays a progress bar indicative of the degree of progress of authenticity determination on the screen of the display unit 112 as a technique of progress notification in authenticity determination.

However, the above progress bar is merely an example, and the progress notification unit 111 may also be configured to display a progress circle or a progress dialogue on the screen of the display unit 112 as the progress indicator to thereby notify the progress of authenticity determination.

Alternatively, the progress indicator displayed on the screen of the display unit 112 may be an image having a rectangular display region whose color density gradually changes from colorless to dark corresponding to the stage of progress. The progress indicator may be configured to display an image of any shape as long as the image has a size that the user can recognize.

Further, the progress indicator displayed on the screen of the display unit 112 may also be an image of characters or objects that gradually grows to a predetermined final shape corresponding to the stage of progress. In this case, the final shape may be displayed when the authenticity determination is completed as genuine (an authentic product), and a broken shape may be displayed when the authenticity determination is completed as fake (a non-authentic product). The progress indicator may not necessarily be a shape of structure and may be any shape that allows the user to recognize it is approaching the final shape. For example, an image of animal that grows up corresponding to the stage of progress may be displayed. In this case, when the authenticity determination is completed as genuine (an authentic product), an image associated with a matured state or the determination as genuine (for example, an image of an angle) may be displayed. Further, when the authenticity determination is completed as fake (a non-authentic product), an image associated with an initial shape before growing starts or the determination as fake (for example, an image of a demon or devil) may be displayed.

Further, the progress indicator displayed on the screen of the display unit 112 may also be an image of numerical character of percentage (%) that gradually changes corresponding to the stage of progress from 0% to 100%, which indicates the end of determination. In this case, the progress indicator may not necessarily be a percentage and may be any image that allows the user to recognize it is approaching the end of authenticity determination. For example, an image of numerical character that indicates the changes in level or stage may be displayed.

In addition, the progress indicator displayed on the screen of the display unit 112 may also be an image of characters or objects such as sun, light, animal, and structure displayed in a predetermined region. The progress notification unit 111 may be configured to display the character or object in low to high brightness corresponding to the stage of progress of authenticity determination while increasing the frequency of lighting and flashing of the display as the stage of authenticity determination proceeds so that the user can recognize the degree of progress from the flashing state of the display.

Alternatively, the progress indicator displayed on the screen of the display unit 112 may be a triangular shape and configured such that a new vertex appears as the authenticity determination proceeds so that the triangle becomes a circle when the authenticity determination is completed as genuine (an authentic product), and a cross mark is displayed when the authenticity determination is completed as fake (a non-authentic product).

Alternatively, the image of the anti-counterfeiting medium 400 of the captured image displayed on the screen of the display unit 112 may have a luminance that gradually changes from low to high intensity corresponding to the stage of progress of authenticity determination. That is, the progress notification unit 111 extracts the image of the anti-counterfeiting medium 400 from the captured image displayed on the screen of the display unit 112, and displays the image other than the anti-counterfeiting medium 400 in the captured image with the same luminance as that of the captured image, while displaying the image of the anti-counterfeiting medium 400 with the luminance gradually changing from a predetermined low intensity to the same intensity as that of the image of the anti-counterfeiting medium 400 when it is imaged in the captured image, corresponding to the change in the degree of progress of authenticity determination.

Alternatively, in place of using the aforementioned progress indicator, a vibrator of mobile terminals or smartphones may be used to notify the progress state by vibration frequency. For example, the progress notification unit 111 may be configured to control a vibrator function unit in mobile terminals or smartphones upon actuation of the application of authenticity determination so that the vibration frequency of the vibrator gradually decreases from the highest frequency to lower frequency as the stage of the authenticity determination proceeds.

Alternatively, the progress notification unit 111 may be configured to output audio data of a numerical value such as the percentage of the progress of authenticity determination or to what extent the authenticity determination is completed from a speaker or audio output terminal of mobile terminals or smartphones to thereby notify the degree of progress in an intuitive manner as the stage of authenticity determination proceeds.

Alternatively, the progress notification unit 111 may be configured to output audio data of frequencies corresponding to the degree of progress of authenticity determination, such as the scale of do, re, mi, fa, so, la, ti, and do, from a speaker or audio output terminal of mobile terminals or smartphones so that it moves to a scale of higher frequency as the stage of the authenticity determination proceeds. In this case, change in the degree of progress may also be notified when the authenticity determination process produces a result of "genuine" or by simply enhancing the frequency of a predetermined tone.

Third Embodiment

Hereinafter, with reference to the drawings, a third embodiment of the present invention will be described.

An identification device of the third embodiment is the same as the identification device in the second embodiment shown in FIG. 18. In the second embodiment, the authenticity determination process is performed even if a single piece of captured image data is available for use in authenticity determination. In the third embodiment, however, the authenticity determination process is performed only in the case where not less than a predetermined number of pieces of captured image data is available for use in authenticity determination. Here, each of the above number of pieces of captured image data needs to be captured from a different observation angle. The imaging process is performed in the same manner as the second embodiment shown in the flowcharts of FIGS. 15, 16, and 20.

Figure 21:
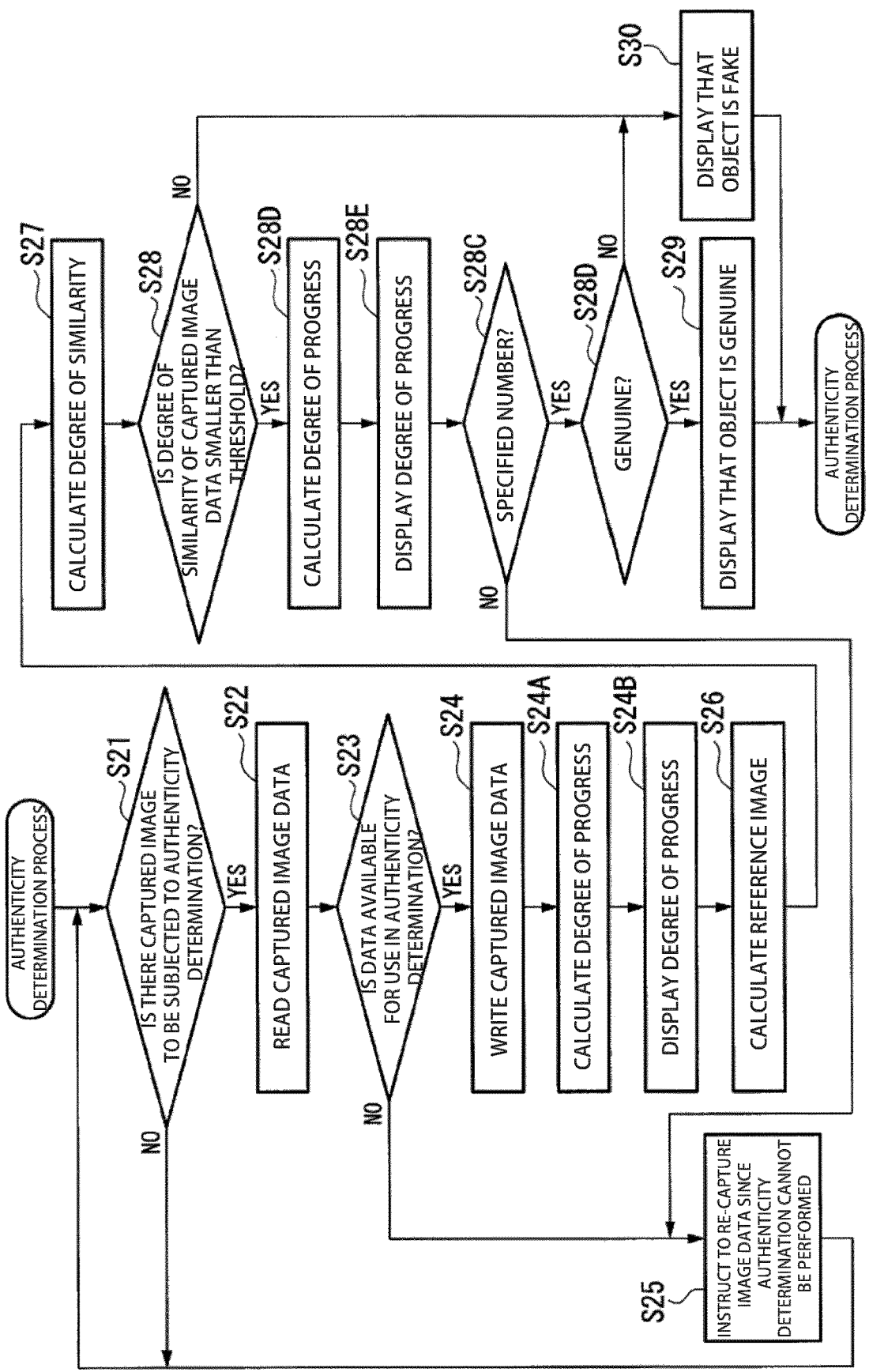
FIG. 21 is a flowchart of an exemplary operation of an authenticity determination process for an authenticity determination object performed by using an anti-counterfeiting medium in the identification device according to a third embodiment.

FIG. 21 is a flowchart of an exemplary operation of authenticity determination process for an authenticity determination object using an anti-counterfeiting medium in the identification device according to the third embodiment.

Steps S21 to S27, S28 to S30, and S33 onward are similar to the operation of the flowchart in the second embodiment shown in FIG. 17. Hereinafter, the description will be given only on operations different from that of the first embodiment.

Step S24A (S28D):

The progress notification unit 111 counts the number of pieces of the captured image data identification information in the captured image data table for authenticity determination in the image data storage unit 113 to thereby obtain the imaging viewpoint.

The progress notification unit 111 adds the current number of imaging viewpoints to the integrated value of the pieces of determination information, and then divides the sum by a value which is twice the specified number (sum of the number of imaging viewpoints and the specified number) to thereby calculate the degree of progress.

Step S24B (28E):

The progress notification unit 111 displays the calculated degree of progress as the progress indicator on the screen of the display unit 112 (for example, the progress indicator 2111 shown in FIGS. 19A to 19C) to notify the user of the degree of progress.

With this configuration of the present embodiment, the progress notification unit 111 displays the progress indicator corresponding to the stage of the authenticity determination on the screen of the display unit 112 together with the state of obtaining the imaging viewpoints corresponding to the reference imaging viewpoints in advance. Accordingly, the user can intuitively recognize how the stage of authenticity determination is proceeding as he moves the authenticity determination device 1 from the changes in the progress indicator indicating the progress state more detailed than the first embodiment. Accordingly, even if the user cannot sufficiently recognize whether the determination algorithm for authenticity determination of the anti-counterfeiting medium 400 is being performed, the user can smoothly perform authenticity determination without being concerned about how the process of authenticity determination is proceeding.

Fourth Embodiment

Hereinafter, with reference to the drawings, a fourth embodiment of the present invention will be described.

Figure 22:
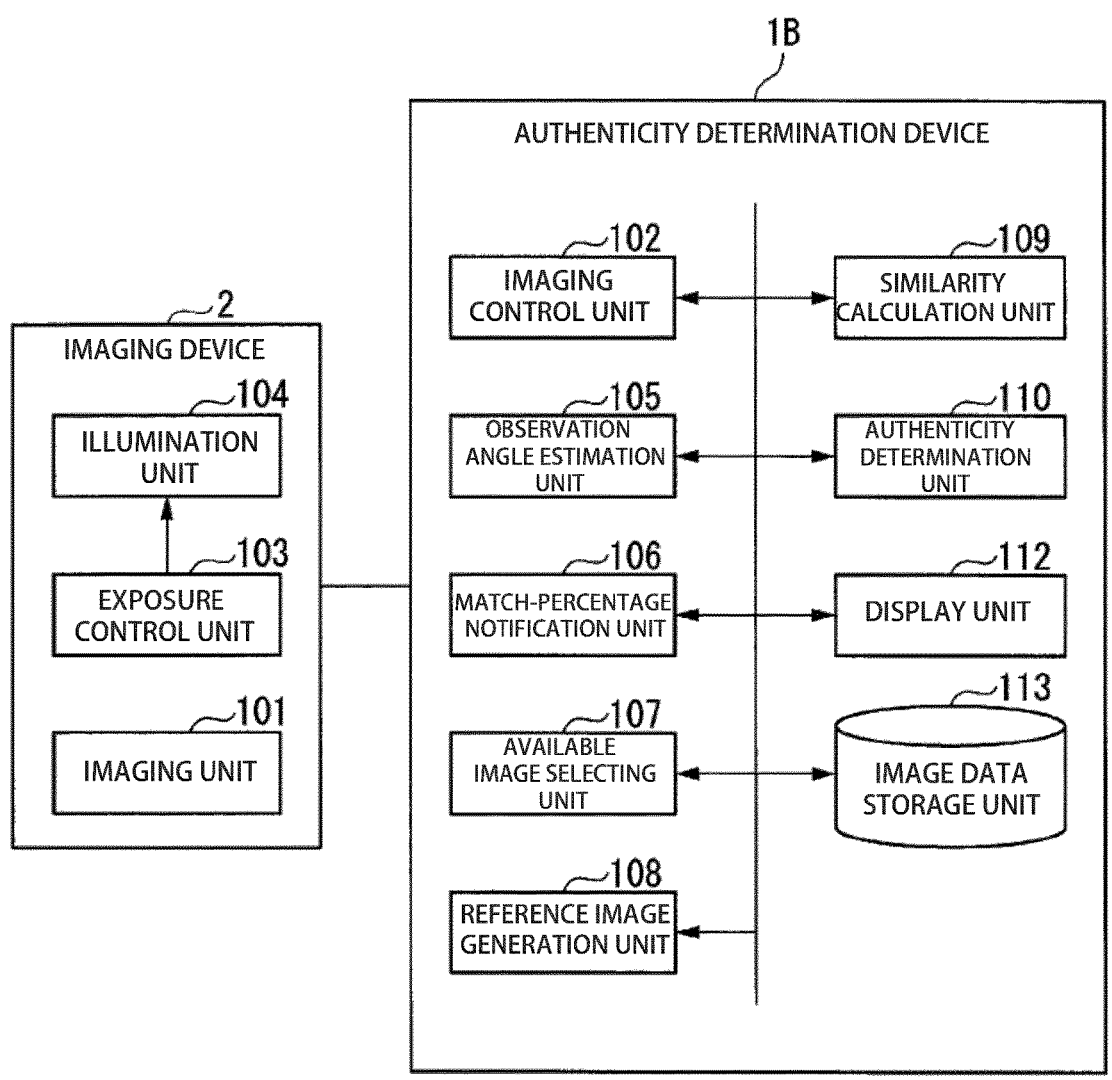
FIG. 22 is a block diagram which illustrates a configuration example of an identification device according to a fourth embodiment.

FIG. 22 is a block diagram which illustrates a configuration example of an identification device according to a fourth embodiment. In FIG. 22, the identification device includes an authenticity determination device 1B and an imaging device 2. The authenticity determination device 1B includes an imaging control unit 102, an observation angle estimation unit 105, an available image selecting unit 107, a reference image generation unit 108, a similarity calculation unit 109, an authenticity determination unit 110, a display unit 112, and an image data storage unit 113. Further, the imaging device 2 includes an imaging unit 101, an exposure control unit 103, and an illumination unit 104. In FIG. 22, the same elements as those of the first embodiment are denoted by the same reference characters.

In the present embodiment, the identification device is configured such that imaging and exposure functions in the first embodiment are separated as the imaging device 2 from the authenticity determination device 1B. With this configuration, general purpose digital cameras or mobile terminals (including mobile phones and smartphones) can be easily used as imaging devices to capture the image data for authenticity determination.

Further, the authenticity determination device 1A may be configured as a cloud so as to communicate with digital cameras or mobile terminals, which are not shown, via an information communication network such as internet. The authenticity determination device 1B may be configured to perform the process of authenticity determination of the anti-counterfeiting medium by using the captured image data supplied from the digital cameras or mobile terminals as with the aforementioned first to third embodiments.

Fifth Embodiment

Hereinafter, with reference to the drawings, a fifth embodiment of the present invention will be described. In the aforementioned first to fourth embodiments, the anti-counterfeiting medium is retroreflective, and the illumination unit 104 is integrated with the authenticity determination device 1 or with the imaging device 2 together with the imaging unit 101. In some cases, however, the anti-counterfeiting medium may be a type of allowing light from the illumination 200 as shown in FIG. 3 to be transmitted (for example, transmission hologram) and the captured image data of the pattern of the transmitted light is used for authenticity determination. In this case, the illumination 200 needs to be provided at a position where light transmitted through the anti-counterfeiting medium is incident on the imaging unit. Accordingly, as with the case of the fourth embodiment of the present invention, the illumination unit 104 needs to be separated from the imaging device 2 or the authenticity determination device 1.

Figure 23:
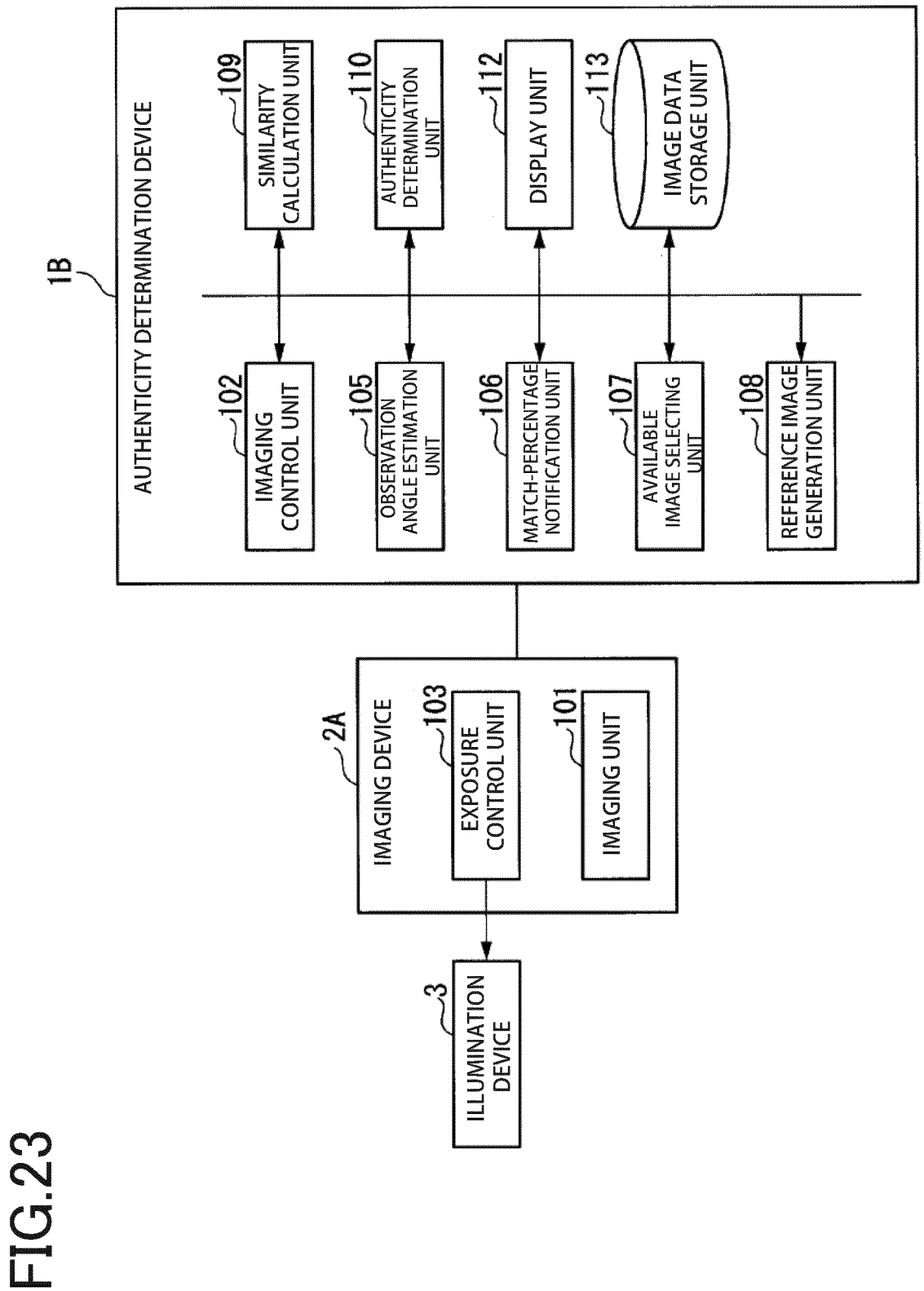
FIG. 23 is a block diagram which illustrates a configuration example of an identification device according to a fifth embodiment.

FIG. 23 is a block diagram which illustrates a configuration example of an identification device according to a fifth embodiment. In FIG. 23, the identification device is configured such that the illumination device 3 (illumination unit 104) is separated from the authenticity determination device 1B and the imaging device 2A. Accordingly, as shown in FIG. 3, imaging light from the illumination device 3 (light source 200) is incident on the anti-counterfeiting medium 400 at an irradiation angle β. As the imaging light is incident, the anti-counterfeiting medium 400 emits a predetermined pattern of light. As described above, the pattern of light is different depending on the observation angle α. Further, the pattern of light emitted from the anti-counterfeiting medium 400 is different depending on the irradiation angle β even at the same observation angle α.

As described above, in the case where the anti-counterfeiting medium has characteristics of emitting a light pattern by transmission, not only the observation angle α but also the irradiation angle β of the illumination light from the lighting device 3 to the anti-counterfeiting medium 400 in capturing of an image for authenticity determination needs to be adjusted so that the irradiation angle β becomes the angle relative to the anti-counterfeiting medium 400 during a simulation corresponding to the structure of the anti-counterfeiting medium 400 for generating the reference image data or in capturing of image data in advance.

Accordingly, in the fifth embodiment, the identification device includes the authenticity determination device 1A, the imaging device 2A and the illumination device 3. The authenticity determination device 1A includes an imaging control unit 102, an observation angle estimation unit 105, an available image selecting unit 107, a reference image generation unit 108, a similarity calculation unit 109, an authenticity determination unit 110, a display unit 112, and an image data storage unit 113. The authenticity determination process is the same as that in the first embodiment and the second embodiment.

Further, the imaging device 2 includes an imaging unit 101 and an exposure control unit 103. In FIG. 23, the same elements as those of the first embodiment are denoted by the same reference characters. The illumination device 3, as with the illumination unit 104, is not limited to general illumination which continuously irradiates an imaging target with light, but also may be a light emission device called flash or electronic flash configured to irradiate the imaging target with light for a short period of time. The illumination device 3 irradiates, in response to the light emission instruction from the exposure control unit 103, the imaging target with a predetermined intensity of light.

According to the present embodiment, the captured image data of the anti-counterfeiting medium is compared with the reference image data which is a genuine anti-counterfeiting medium captured at the observation angle of the captured image data to determine whether the anti-counterfeiting medium is genuine or fake. Hence, without using a conventional special authenticity determination device, and without relying on the disposition condition of the anti-counterfeiting medium, authenticity determination of the anti-counterfeiting medium (genuine or fake) can be readily performed by capturing an image of the anti-counterfeiting medium with a simple image capturing device such as a general purpose digital camera.

Further, according to the present embodiment, since the illumination device 3 is separated from the authenticity determination device 1A or the imaging device 2A, it is possible to capture the image data having the pattern of transmitted light at each observation angle α, corresponding to the anti-counterfeiting medium having different patterns of transmitted light depending on the observation angles α when the light emitted from the illumination device 3 transmits through the anti-counterfeiting medium.

Sixth Embodiment

Hereinafter, with reference to the drawings, a sixth embodiment of the present invention will be described.

Figure 24:
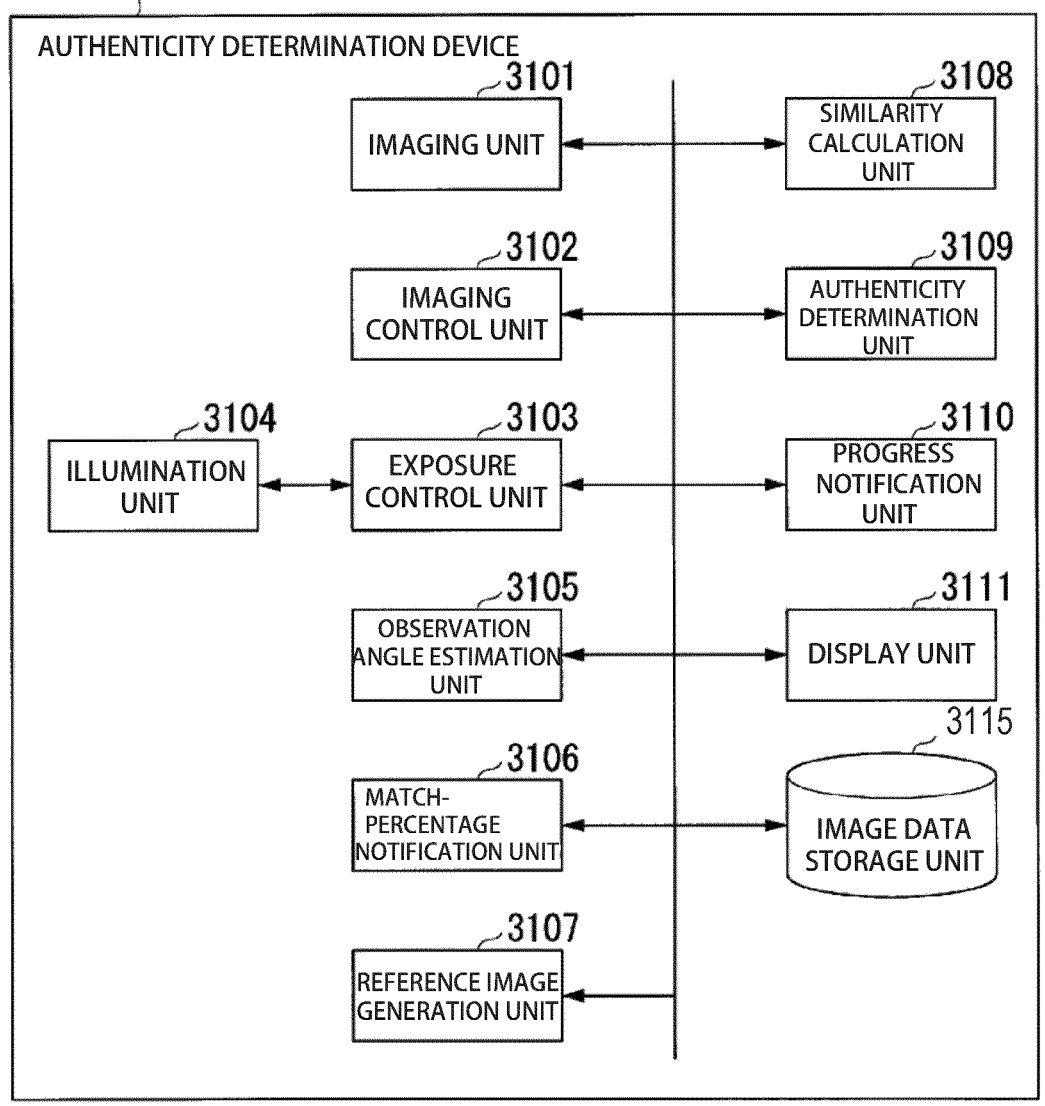
FIG. 24 is a block diagram which illustrates a configuration example of an identification device according to a sixth embodiment.

FIG. 24 is a block diagram which illustrates a configuration example of an identification device (authenticity determination device) according to a sixth embodiment. In FIG. 24, an authenticity determination device 3001 includes an imaging unit 3101, an imaging control unit 3102, an exposure control unit 3103, an illumination unit 3104, an observation angle estimation unit 3105, an available image selecting unit 3106, a reference image generation unit 3107, a similarity calculation unit 3108, an authenticity determination unit 3109, a progress notification unit 3110, a display unit 3111, and an image data storage unit 3115. In the identification device according to the sixth embodiment, the imaging unit 3101 and the illumination unit 3104 are integrated to provide a configuration corresponding to authenticity determination of retroreflective anti-counterfeiting media.

The imaging unit 3101 may be a camera including a CCD (charge coupled device) or a CMOS (complementary metal oxide semiconductor) image sensor. The imaging unit 3101 is configured to capture an image of a target object, and write and store the captured image as captured image data in the image data storage unit 3113.

The imaging control unit 3102 controls imaging conditions of the imaging unit 3101, including a depth of focus and a imaging element sensitivity (International Organization for Standardization (ISO) sensitivity) when the imaging unit 3101 captures image data, which is an image of a light pattern (color of light (wavelength) or an image of letters or pictures) emitted from the anti-counterfeiting medium in response to the incident light.

The exposure control unit 3103 controls imaging conditions of the imaging unit 3101 in exposure, including a shutter speed, an aperture value, the presence or absence of illumination light, and illumination light intensity. Moreover, the exposure control unit 3103 is configured to output a light emission instruction to the illumination unit 3104 to emit imaging light (illumination light) as required during imaging according to the brightness around the anti-counterfeiting medium to be imaged by the authenticity determination device 3001.

The illumination unit 3104 is not limited to general illumination which continuously irradiates an imaging target with light, but also may be a light emission device called an electronic flash or Strob (registered trademark) which irradiates the imaging target with light for a short period of time. The illumination unit 3104 irradiates the imaging target with a predetermined intensity of light in response to the light emission instruction from the exposure control unit 3103. Here, the imaging control unit 3102 supplies a control signal indicative of an imaging timing to the exposure control unit 3103. Accordingly, in response to the control signal supplied from the imaging control unit 3102 for indicating an imaging timing, the exposure control unit 3103 outputs a light emission instruction to the illumination unit 3104 to emit illumination light for illuminating the anti-counterfeiting medium as described above.

The observation angle estimation unit 3105 is configured to calculate an imaging viewpoint from a coordinate conversion equation (described later). The imaging viewpoint is information including an observation position (coordinate value), which is a position at which the image data of the anti-counterfeiting medium are captured in a three-dimensional space, and an imaging direction of the imaging unit 3101. That is, the observation angle estimation unit 3105 calculates the observation angle of the anti-counterfeiting medium in each captured image data from the obtained imaging viewpoint (observation position and imaging direction).

The observation angle estimation unit 3105 writes and stores the captured image data information including the observation position and the imaging direction obtained as above, together with captured image data identification information added to the captured image data for identification of the captured image data, in a captured image data table of the image data storage unit 3115. This observation angle causes a difference in the pattern of observed light when emitted from the anti-counterfeiting medium in response to the incident light.

In the present embodiment, one or more pieces of the image data of the anti-counterfeiting medium are imaged by the imaging unit 3101 with a predetermined focal length. In capturing multiple pieces of the image data, the image data needs to be captured with different observation angles among the pieces of the captured image data. On the basis of these one or more pieces of the captured image data, the observation angle estimation unit 3105 estimates the observation angle of each piece of the captured image data of the anti-counterfeiting medium in the three-dimensional space by using a predetermined coordinate conversion equation as described above.

The coordinate conversion equation used herein is an equation generated in such a manner that a pixel position in the two-dimensional coordinate in each piece of the captured image data and a coordinate position in the three-dimensional space are correlated to each other when the three-dimensional space is reproduced from multiple pieces of the captured image data (the captured image data of a calibration board, which is described later) in advance as a pre-process for authenticity determination (preparation for authenticity determination) of the anti-counterfeiting medium provided in an authenticity determination object. The pre-generated coordinate conversion equation is written and stored in the image data storage unit 3115 in advance for the authenticity determination object or for each authenticity determination object.

Figures 25, 26:
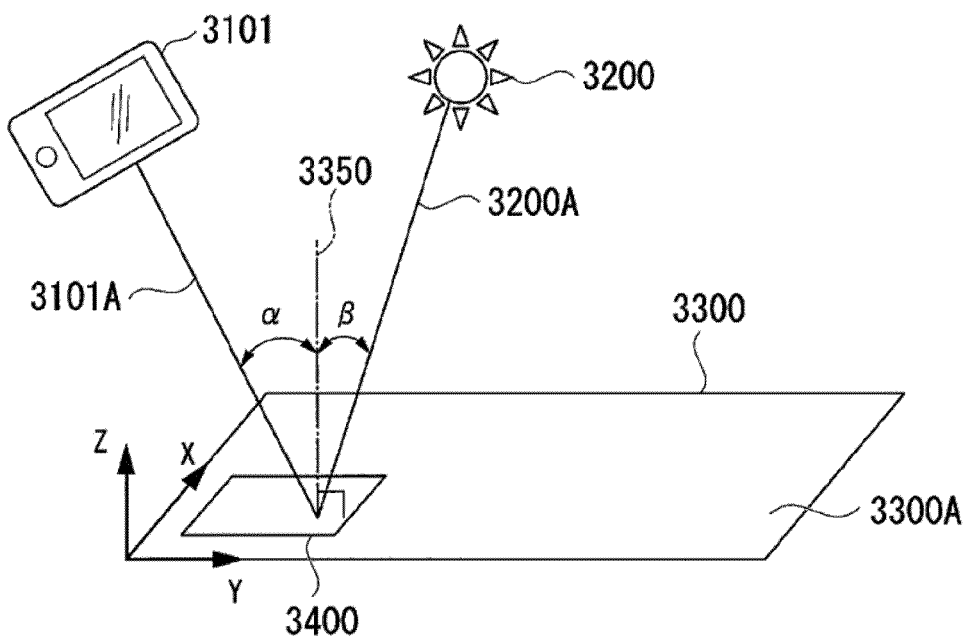
FIG. 25 is a diagram which illustrates a configuration example of a captured image data table in an image data storage unit 3115.
FIG. 26 is a diagram which illustrates an observation angle at which an anti-counterfeiting medium is observed by the imaging unit 3101.

FIG. 25 is a diagram which illustrates a configuration example of a captured image data table in the image data storage unit 3115. In the captured image data table shown in FIG. 25, pieces of captured image data identification information, observation angles and observation positions of the captured image data corresponding to the pieces of captured image data identification information, and captured image data addresses are written and stored. The captured image data identification information refers to information for identifying the captured image data.

The observation angle refers to, for example, an angle formed between the imaging direction of the imaging unit 3101 when capturing the image data and the line normal to the surface of the anti-counterfeiting medium, where an authenticity determination object is placed in a coordinate system of a three-dimensional space (hereinafter referred to as a three-dimensional coordinate system) with the origin being at any one of vertices or coordinate points of the authenticity determination object. The observation position refers to a coordinate position at which the imaging unit 3101 captures an image of the authenticity determination object in the three-dimensional space. The captured image data address refers to an address pointing to a region including each captured image data stored in the image data storage unit 3115 and serves as an index of the captured image data when it is read out.

FIG. 26 is a diagram which illustrates the observation angle of the imaging unit 3101 relative to the anti-counterfeiting medium. In FIG. 26, the anti-counterfeiting medium 3400 is used to prevent forgery and copying of banknotes, stock certificates, and notes such as gift vouchers, valuable securities such as credit cards, products such as pharmaceutical products, food products and high-class brand products. The anti-counterfeiting medium 3400 is directly printed or transferred onto the notes or valuable securities, or printed or transferred onto sealing stickers or tags attached to products (or packages of products).

In FIG. 26, the anti-counterfeiting medium 3400 is provided on the surface of a credit card 3300. Examples of the anti-counterfeiting medium 3400 according to the present embodiment include a diffraction grating or a hologram whose color or pattern changes depending on the observation angle, and may be formed using optically variable device (OVD) ink or a pearl pigment whose color or brightness changes depending on the observation angle. A light source (also referred to as illumination) 3200 is configured to irradiate the anti-counterfeiting medium 3400 with imaging light at the irradiation angle $\beta$, which is an angle formed between a light irradiation direction 3200A and a normal line 3350. With the supply of the imaging light, the anti-counterfeiting medium emits light of a predetermined pattern. The light pattern emitted from the anti-counterfeiting medium in response to the irradiation light depends on the observation angle $\alpha$ and the irradiation angle $\beta$.

The anti-counterfeiting medium 3400 will be detailed below.

The anti-counterfeiting medium 3400 may be a hologram or the like, which emits various types of diffracted light according to the diffraction structure. In this case, various types of holograms such as reflection, transmission, phase, and volume holograms can be used.

The following description will be made particularly on the example of relief structure having uneven structure.

Figure 27:
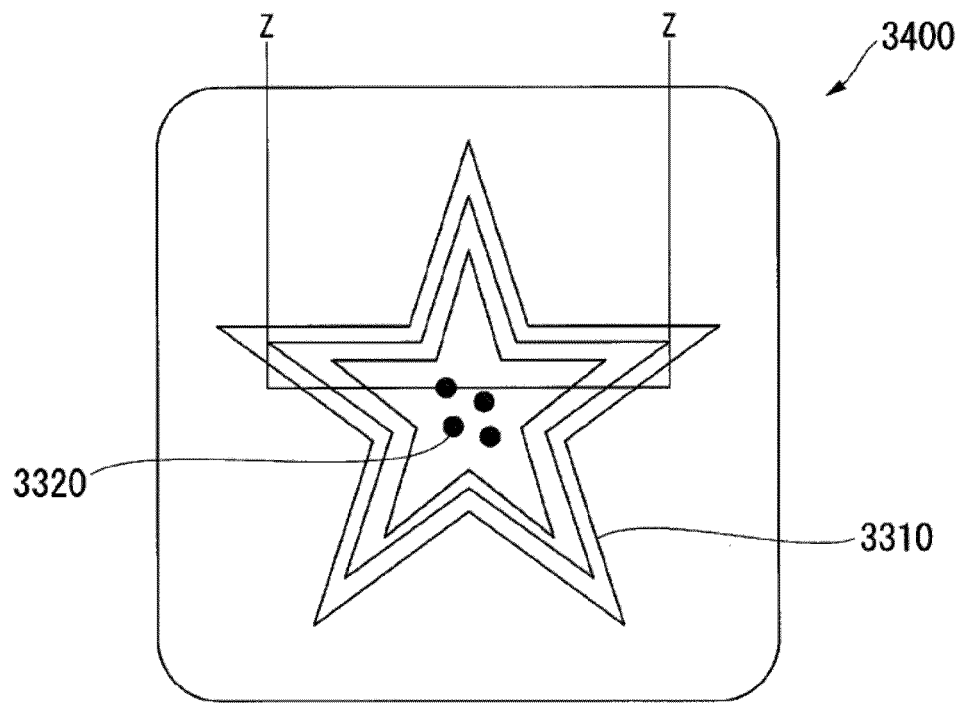
FIG. 27 is a schematic plan view of an anti-counterfeiting medium according to the sixth embodiment.
Figure 28:
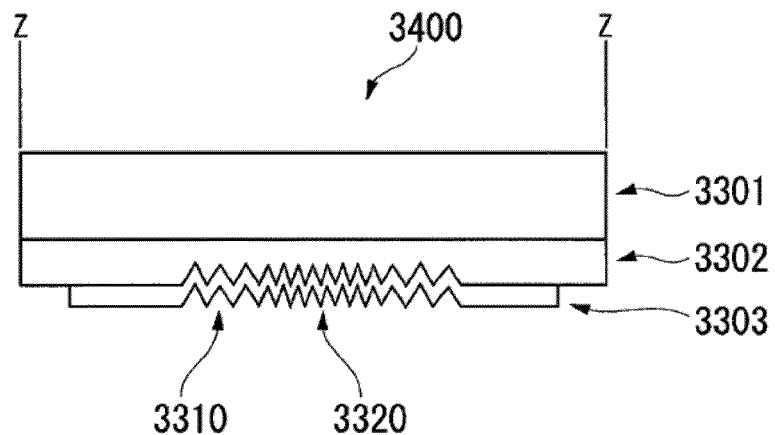
FIG. 28 is a schematic cross-sectional view of the anti-counterfeiting medium taken along the line Z-Z in FIG. 32.

Methods for forming uneven structures such as a first uneven structure 3310 and a second uneven structure 3320 which are formed in a relief structure forming layer 3302 as shown in FIGS. 27 and 28 include various techniques such as radiation curable molding, extrusion molding and thermal press molding using a metal stamper or the like.

The first uneven structure 3310, having a groove-shaped structure including bumps and recesses, may have an uneven structure such as a relief diffraction grating structure or a directional scattering structure having a plurality of regions in which a plurality of linear-shaped bumps and recesses are arrayed in the same direction such that the plurality of regions of mutually different directions are combined with each other.

In general, most diffraction gratings typically used for displays have spatial frequencies in the range from 500 to 1600/mm so that different colors can be displayed to a user observing from a certain direction according to the spatial frequency or the direction of the diffraction grating.

Figures 31, 32:
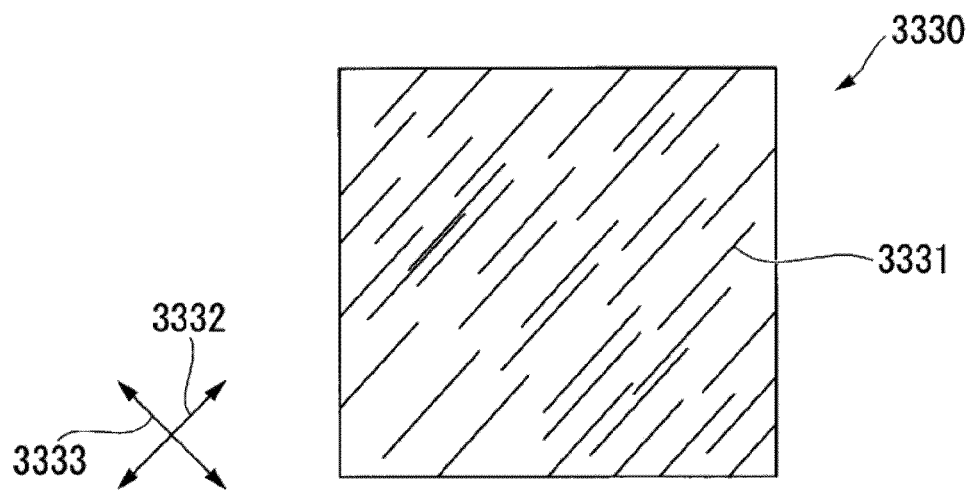
FIG. 31 is a perspective view showing an example of a first uneven structure of the anti-counterfeiting medium according to the sixth embodiment.
FIG. 32 is a diagram which illustrates a configuration example of a captured image data table for authenticity determination in the image data storage unit 3115.

On the other hand, the directional scattering structure shown in FIG. 31 includes a plurality of light scattering structures 3331 having a constant orientation direction 3332 in a particular segment or cell. The light scattering structures 3331 are each in a straight shape, and arrayed substantially parallel with each other in a particular segment or cell.

The light scattering structures 3331 may not necessarily be fully parallel with each other, and a longitudinal direction of some of the light scattering structures 3331 and a longitudinal direction of other ones of the light scattering structures 3331 may intersect with each other as long as the regions of the directional scattering structure 3330 have scattering ability with sufficient anisotropy.

According to the above structure, when the region formed of the directional scattering structure 3330 is observed from the front with light irradiated from an oblique direction perpendicular to the orientation direction 3332, the region appears relatively bright due to the high scattering ability.

On the other hand, when the region including the directional scattering structure 3330 is observed from the front with light irradiated from an oblique direction perpendicular to a light scattering axis 3333, the region appears relatively dark due to low scattering ability.

Accordingly, in the segment or cell including the light scattering structures 3331, any orientation direction 3332 may be determined for each segment or cell to provide a pattern formed of a combination of relatively bright parts and relatively dark parts, and reversing of light and dark parts is observed by changing the observation position or light irradiation position.

The above first uneven structure 3310 can be formed of, but not limited to, a single or composite structure of the above relief diffraction grating structure or directional scattering structure.

Figure 29:
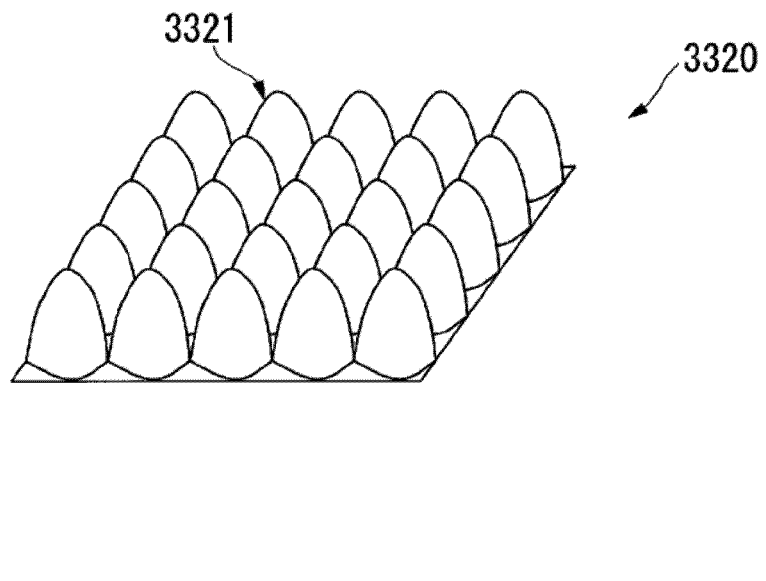
FIG. 29 is a perspective view which illustrates an example of a second uneven structure of the anti-counterfeiting medium according to the sixth embodiment.

Further, FIG. 29 shows a perspective view of an example of a structure that can be applied to the second uneven structure 3320.

The second uneven structure 3320 shown in FIG. 29 includes a plurality of bumps 3321.

Although the second uneven structure 3320 is formed solely by the bumps 3321, this is merely an example. The second uneven structure 3320 of the present embodiment can also be formed by a plurality of recesses.

In the present embodiment, each recess or bump on the second uneven structure 3320 preferably has a surface area 1.5 times larger than the footprint required for each recess or bump when disposed on the surface of the relief structure forming layer 3302.

When the surface area of each recess or bump is at least 1.5 times larger than the footprint, favorable low reflectivity and low scattering properties can be obtained. This is because the second uneven structure 3320 exhibits a color tone obviously different from that of the first uneven structure, and can be readily recognized when imaged by the imaging unit 3101. On the other hand, when the surface area of each recess or bump is less than 1.5 times the footprint, the reflectivity is increased, which is not favorable.

Further, the plurality of bumps or recesses in the second uneven structure 3320 formed in the relief structure formed layer 3302 preferably has a forward tapered shape.

The forward tapered shape refers to a shape having a cross-sectional area of the bumps or recesses, measured parallel with the substrate surface, decreasing from the proximal end to the distal end of the bumps or recesses. More specifically, the forward tapered shape may be conical, pyramid, elliptical, columnar or cylindrical, prismatic or rectangular cylindrical, truncated conical, truncated pyramid, or truncated elliptical shapes, a shape where cone is adjoined to column or cylinder, or a shape where a pyramid is adjoined to a prism or rectangle, hemisphere, semi-ellipsoid, bullet, or round-bowl shape.

Figure 30:
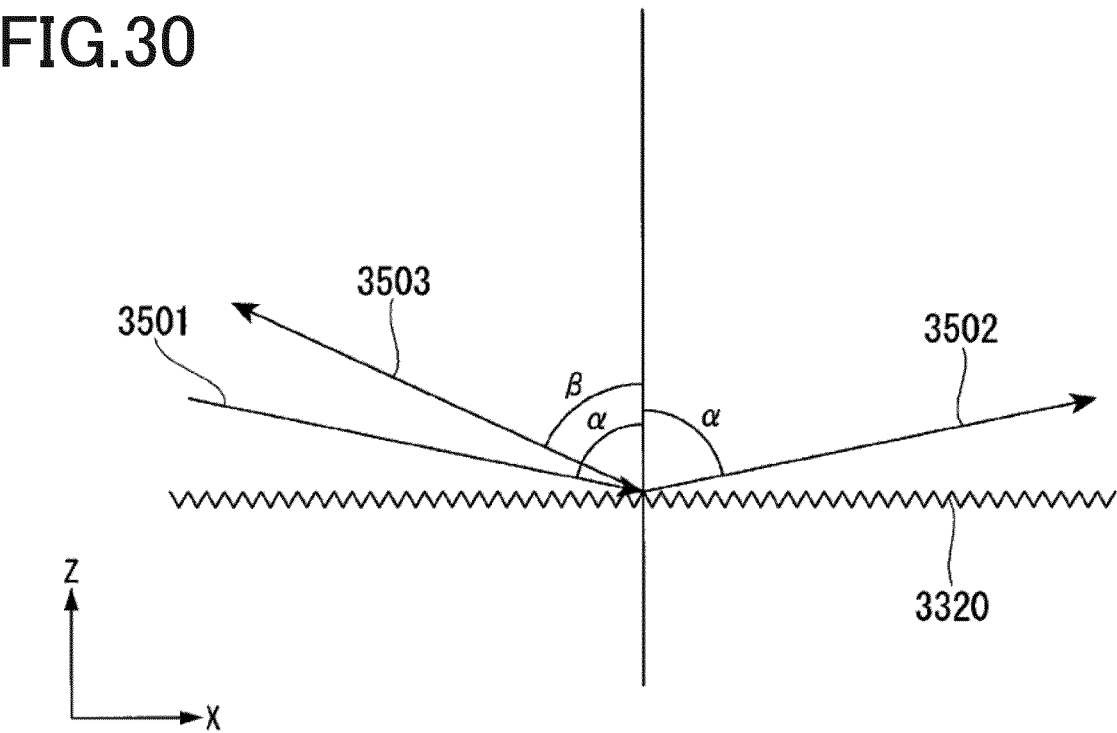
FIG. 30 is a schematic view which illustrates the second uneven structure emitting diffracted light.

FIG. 29 shows an example where the second uneven structure 3320 has a constant center distance between adjacent bumps or recesses. As shown in FIG. 30, when light is irradiated to the second uneven structure 3320, the second uneven structure 3320 emits diffracted light in a specific direction relative to the travel direction of an incident light 3501.

In general, the diffracted light can be represented by the following expression:

$$d(\sin \alpha \pm \sin \beta) = n\lambda \quad (1)$$

In equation (1), d represents the center distance between the bumps or recesses, and $\lambda$ represents the wavelengths of the incident light and the diffracted light. Moreover, $\alpha$ represents the incident angle of the incident light, and $\beta$ represents the emission angle of the diffracted light. Further, n represents an order. Since the most representative diffracted light is primary diffracted light, it can be considered that n=1 is satisfied.

The incidence angle $\alpha$ may be the same as the emission angle of zero order diffracted light, that is, regular reflected light. For parameters $\alpha$ and $\beta$, the positive direction is defined as a clockwise direction with respect to the direction normal to the display, that is, the Z axis shown in FIG. 28. Hence, equation (1) can be transformed as below:

$$d(\sin \alpha - \sin \beta) = \lambda \quad (2)$$

Thus, when the center distance d between the bumps or recesses, and the incident angle $\alpha$, that is, the incident angle of zero order diffracted light are constant, the emission angle $\beta$ of a primary diffracted light 3503 changes according to the wavelength $\lambda$ as clearly seen from equation (2). Therefore, in the case where the illumination light is white, the color imaged by the imaging unit 3101 changes with the change of the observation angle relative to the uneven structure.

The second uneven structure 3320 has a forward tapered shape having the center distance of 400 nm or less between the bumps or recesses. Accordingly, the image appears almost black when captured in the normal direction. However, under a specific condition, that is, an environment where the incident angle $\alpha$ of white light is in the range of 60° to 90°, the emission angle $|\beta|$ of the primary diffracted light 3503 with a particular wavelength can be designed to be close to the incident angle.

For example, in a case where the incident angle $\alpha=60°$ and d=340 nm are satisfied, the emission angle $|\beta|$ at $\lambda=600$ nm is approximately 64°.

On the other hand, since the first uneven structure 3310 is a diffraction grating structure or the like, it is difficult to design the emission angle of the primary diffracted light to be close to the incident angle.

Accordingly, in an identification operation by the authenticity determination device 3001, when the light source 3200 and the imaging unit 3101 are disposed relatively close to each other, a clear change in the color of the second uneven structure 3320 can be captured under a specific condition.

Moreover, the anti-counterfeiting medium 3400 may have a configuration which uses surface plasmon propagation produced by a fine structure such as nano-meter size fine holes provided on the surface, or a configuration which uses a structural color that controls the color of the reflected light or transmitted light with respect to the incident light by controlling the depth of the uneven structure.

The anti-counterfeiting medium 3400 may also have a configuration which uses retro-reflection properties of microspheres or a spherical structure; a configuration like an angle-controlled mirror in which a surface structure of a micro region is provided with an inclination to thereby obtain reflective properties that allows the incident light to be reflected or transmitted only in a specific direction; and a configuration like printed products having an uneven structure produced by intaglio printing.

Further, the anti-counterfeiting medium 3400 may also have a configuration that uses a structure in which a large number of walls with some height, which are used for a peep prevention film or the like, are disposed in a narrow area to limit vision; a configuration which uses a parallax barrier in which thin lines are arrayed at specific intervals on a surface to limit vision so that the image formed behind the surface looks as if it changes; and a configuration which uses lenticular lens or microlens arrays so that the image formed behind the lens looks as if it changes.

Further, the anti-counterfeiting medium 3400 may also have a configuration which includes a pearl pigment in which mica is coated with metal oxide, by printing or the like.

The anti-counterfeiting medium 3400 may have, for example, a configuration using a multi-layered thin film in which a plurality of thin films having different refractive indexes composed of a transparent material or a metal are provided to produce a change in the color depending on the reflection angle and the transmission angle of the incident light due to interference phenomenon; a configuration in which a multi-layered thin film is crushed into flake shapes and applied as a pigment by printing or the like; a configuration using printed particles where micro particles producing an interference phenomenon are coated with thin film by chemical processing; and a configuration in which a liquid crystal material represented by cholesteric liquid crystal is immobilized in polymer or the like. The liquid crystal material may include a material in a planar shape or a material crushed into pigment to be used for printing or the like.

Further, the anti-counterfeiting medium 3400 may have, for example, a configuration which uses a magnetically oriented material in which a magnetic substance such as iron oxide, chromium oxide, cobalt and ferrite is magnetically aligned in a planar shape to impart directivity to the reflective light and transmission light; a configuration having a multi-layered film by using the above magnetically oriented material as a core and additionally performing chemical processing or the like as described above; and a configuration using an optical effect produced by nano-meter sized particles represented by silver nano particles or quantum dots.

The normal line 3350 is a line normal to the plane of the surface 3300A of the credit card 3300. The observation angle α is an angle formed between an imaging direction 3101A of the imaging unit 3101 and the normal line 3350. Here, the observation angle estimating unit 3105 positions the credit card 3300 in a three-dimensional space in which the Z-axis is taken as a direction parallel with the normal line 3350, and the X-axis and Y-axis are taken as directions parallel with each side of the credit card. For example, the credit card 3300 is positioned in a two-dimensional plane including the X-axis and the Y-axis such that any of the vertices formed by the sides of the credit card 3300 corresponds to the origin O of the three-dimensional coordinate system. Hence, the thickness direction of the credit card 3300 is parallel with the Z-axis. The three-dimensional shape of the credit card 3300 is written and stored in the image data storage unit 3115 in advance as known information, together with the coordinate conversion equation described above.

The observation angle estimation unit 3105 reads the captured image data from the image data storage unit 3115 when calculating the observation angle of each piece of the captured image data, and then correlates each coordinate of the three-dimensional shape of the credit card 3300 in the three-dimensional coordinate system to each pixel (coordinate) of the captured image data (two-dimensional coordinate system) by using the above coordinate conversion equation. Thus, the imaging position at which the image data is captured in the three-dimensional coordinate system of the three-dimensional space, and the imaging direction of the captured image data from the imaging position are obtained. Here, the observation angle estimating unit 3105 positions the credit card 3300 in the three-dimensional space as described above such that any of the vertices of the three-dimensional shape of the credit card 3300 corresponds to the origin O of the three-dimensional coordinate system, the normal line 3350 is parallel with the Z axis, and each side is parallel with the X axis or Y axis.

Then, on the basis of the three-dimensional shape of the credit card 3300, the observation angle estimation unit 3105 calculates an imaging position and an imaging direction of the imaging unit 3101 capturing the image data in the three-dimensional coordinate system. Accordingly, the observation angle estimating unit 3105 calculates an observation angle α formed between the normal line 3350 and the imaging direction of the imaging unit 3101. The observation angle estimation unit 3105 writes and stores the captured image data identification information of the captured image data, together with the calculated observation angle, observation position, and a captured image data address of the captured image data into the captured image data table in the image data storage unit 3115.

In the present embodiment, it is assumed that camera calibration (camera correction) is performed in advance for the imaging unit 3101. In the camera calibration, a calibration board whose three-dimensional shape is known is captured one or more times in the imaging region, and one or more pieces of the captured image data are used to correlate coordinate points in a three-dimensional coordinate system of the three-dimensional space to a plurality of coordinate points (two-dimensional pixels) in a two-dimensional coordinate system of the captured image data. Accordingly, the above-described coordinate conversion equation which indicates a relative positional relationship between the imaging unit 3101 and the calibration board (hereinafter, "external parameters"), as well as an optical center of the imaging unit 3101, a light beam incident vector at each pixel (two-dimensional pixel), lens distortion, and the like (hereinafter, "internal parameters of the imaging unit 3101") are estimated.

In other words, according to the present embodiment, since the observation angle estimation unit 3105, which will be described later, estimates the observation angle of the captured image data, a global coordinate system (three-dimensional coordinate system) is re-configured based on the two-dimensional image of the calibration board captured from a plurality of different viewpoint directions by the imaging unit 3101 in advance, that is, based on captured image data of multiple viewpoints. The coordinate conversion equation, which indicates a correlation between the coordinate points in the three-dimensional coordinate system re-configured in the same pixels and the coordinate points of the captured image data captured by the imaging unit 3101 in the two-dimensional coordinate system, is acquired when the camera calibration is performed.

As described above, in the present embodiment, estimation of the observation angle is on the premise that camera calibration (camera correction) is performed in advance for the imaging unit 3101, and internal parameters of the imaging unit 3101 are known at the time of authenticity determination of the anti-counterfeiting medium in the identification device, and the three-dimensional shapes of the authenticity determination object and the anti-counterfeiting medium are also known. Accordingly, image data of the anti-counterfeiting medium is captured from a plurality of different positions, and the above-described coordinate conversion equation is used to obtain information on a plurality of corresponding points between the coordinate points in the three-dimensional coordinate system and the pixels of the captured image data in the two-dimensional coordinate system. Thus, based on the plurality of corresponding point coordinates, the relative positional relationship between the imaging unit 3101 and the anti-counterfeiting medium can be estimated. Similarly, in the case where the anti-counterfeiting medium is captured only once, the above-described coordinate conversion equation is used in a single piece of captured image data to obtain information on a plurality of corresponding points between the coordinate points in the three-dimensional coordinate system and the pixels in the two-dimensional coordinate system. Thus, based on the plurality of corresponding point coordinates, the relative positional relationship between the imaging unit 3101 and the anti-counterfeiting medium can be estimated. That is, the observation position and observation angle (imaging direction) of the imaging unit 3101 in capturing of an image of the anti-counterfeiting medium can be estimated.

In the present embodiment, an observation angle in capturing of image data can be estimated by applying an analysis method of Z. Zhang (Z. Zhang, "A flexible new technique for camera calibration", IEEE Transactions on Pattern Analysis and Machine Intelligence, Vol. 22, No. 11, pages 1330-1334, 2000), which is one of the well-known techniques of camera calibration. Note that, when the analysis method of Z. Zhang is used to estimate the observation angle, the captured image data to be inputted to the identification device is required to be image data captured with a focus similar to (preferably the same focus as) the fixed focus when the camera calibration is performed.

Referring back to FIG. 24, the available image selecting unit 3106 selects available captured image data for use in the authenticity determination process from the image data captured by the imaging unit 3101. When selecting the captured image data that is available for use in the authenticity determination process from among the captured image data captured by the imaging unit 3101, the available image selecting unit 3106 determines whether the observation angle of the captured image data is within a determination angle available for authenticity determination. Further, the available image selecting unit 3106 determines, for example, whether the entire shape of the anti-counterfeiting medium 3400 is captured in the captured image data, whether the anti-counterfeiting medium 3400 is in focus, and whether the luminance histogram is appropriately distributed (described later).

Then, the available image selecting unit 3106 selects the captured image data within the determination angle available for authenticity determination as the captured image data available for use in the authenticity determination process.

The available image selection unit 3106 adds determination image data identification information to the selected captured image data, and writes and stores the captured image data together with the captured image data identification information of the captured image data, into the captured image data table for authenticity determination in the image data storage unit 3115.

Further, the available image selecting unit 3106 determines whether the observation angle calculated by the observation angle estimation unit 3105, which will be described later, is included in any of the predetermined setting observation angles (for example, observation angle range including a predetermined error), or whether the observation angle corresponds to the already-obtained setting observation angle. The number of predetermined setting observation angles is the same as the specified number.

That is, in the present embodiment, the predetermined setting observation angle is defined as the specified number. If the observation angle thus obtained does not correspond to the predetermined setting observation angle or matches with the already-obtained setting observation angle, the available image selecting unit 3106 deletes the data corresponding to the captured image data identification information correlated to the observation angle, from the captured image data table for authenticity determination. On the other hand, if the observation angle obtained corresponds to the predetermined setting observation angle and does not match the already-obtained setting observation angle, the available image selecting unit 3106 causes the reference image generation unit 3107 to generate a reference image.

FIG. 32 is a diagram which illustrates a configuration example of a captured image data table for authenticity determination in the image data storage unit 3115. In the captured image data table for authenticity determination shown in FIG. 32, pieces of determination image data identification information, pieces of captured image data of the captured image data indicated by the determination image data identification information, reference image data addresses that indicate a start address in a region storing the reference image data, and similarities between captured image data and reference image data, which are correlated to each other, are written and stored.

In this captured image data table for authenticity determination, the determination image data identification information refers to identification information for identifying the captured image data available for use in authenticity determination. The captured image data identification information refers to identification information for identifying the captured image data. The reference image data address refers to an address pointing to a region including each image data stored in the image data storage unit 3115 and serves as an index of the reference image data when it is read out from the image data storage unit 3115. The reference image data stored in the reference image data address is image data for comparison with the corresponding captured image data. The degree of similarity is a numerical value representing a similarity between the captured image data and the reference image data.

Referring back to FIG. 24, the reference image generation unit 3107 generates the reference image data to be used for a comparison with the captured image data selected by the available image selection unit 3106. The reference image data is image data observed from the same observation angle as that of the captured image data, and is obtained by simulating the structure of the anti-counterfeiting medium 3400 or obtained from pre-captured image data of the anti-counterfeiting medium 3400. As described above, the anti-counterfeiting medium 3400 may have a configuration formed of diffraction gratings or holograms, a configuration formed of OVD ink or pearl pigment including a pigment in which mica is coated with metal oxide, a configuration formed of a laminate of layers having different refractive indexes, or a configuration formed of cholesteric liquid crystal.

Accordingly, the reference image generation unit 3107 generates the reference image data in accordance with each of the above configurations. For example, in the case where the anti-counterfeiting medium 3400 is formed using the diffraction grating, the reference image data is calculated and generated by simulation using a reference image generation function, which takes the observation angle as a parameter, based on diffraction grating design information. Then, the reference image generation unit 3107 writes and stores the generated reference image data into the image data storage unit 3115, and sets the start address of a region in which the reference image data is written as a reference image data address. The reference image generation unit 3107 correlates them with the captured image identification information of the captured image data to be compared, and writes and stores the above-described reference image data address into the captured image data table for authenticity determination in the image data storage unit 3115.

In some cases such as where OVD ink or pearl pigment is used, layers having different refractive indexes are repeatedly laminated, or cholesteric liquid crystal is used, an object cannot be calculated using a function of the reference image data. In such cases, the anti-counterfeiting medium 3400 is imaged at every observation angle so that the captured image data are stored as a database of reference image data in the image data storage unit 3115. Thus, the reference image generation unit 3107 can read the reference image data from the database corresponding to the observation angle of the captured image data to be compared, and write and store the reference image data into the captured image data table for authenticity determination so as to be correlated to the captured image data identification information of the captured image data to be compared.

The similarity calculation unit 3108 refers to the captured image data table for authenticity determination in the image data storage unit 3115, and sequentially reads the captured image data identification information and the reference image data address corresponding to the determination image data identification information. Then, the similarity calculation unit 3108 reads the captured image data address corresponding to the captured image data identification information from the captured image data table in the image data storage unit 3115. Thus, the similarity calculation unit 3108 reads the captured image data corresponding to the captured image data address and the reference image data corresponding to the reference image data address from the image data storage unit 3115.

The similarity calculation unit 3108 calculates a degree of similarity of the captured image data to the reference image data thus read out, by using template matching. For example, the similarity calculation unit 3108 calculates a mean square error in the luminance of each pixel (each of RGB (red, green, and blue) if a color image is used) corresponding to the captured image data and the reference image data, accumulates the mean square error of all the pixels or part of corresponding pixels, and outputs the addition result as a numerical value indicative of the degree of similarity. Hence, the lower the numerical value of similarity, the higher the similarity between the captured image data and the reference image data. As part of corresponding pixels, a pixel portion having a characteristic light pattern which is significantly different from other pixels in the reference image data depending on the observation angle is selected and used.

Alternatively, the similarity calculation unit 3108 may employ such a configuration that after conversion of each numerical value of RGB of all pixels or some corresponding pixels of the authenticity determination captured image data and the reference image data into a proper color space, a square value of a Euclidean distance of the color space is added up and an addition result is outputted as the numerical value indicating the degree of similarity. As with the case of using mean square error, the lower the numerical value of similarity, the higher the similarity between the captured image data and the reference image data.

As described above, the similarity calculation unit 3108 calculates a degree of similarity between the captured image data and the reference image data corresponding to the captured image data in sequence for each determination image data identification information in the captured image data table for authenticity determination in the image data storage unit 3115. The similarity calculation unit 3108 correlates the calculated degree of similarity with the captured image data identification information of the captured image data from which the degree of similarity is calculated, and writes and stores the calculated degree of similarity into the captured image data table for authenticity determination in the image data storage unit 3115.

Further, in the case where the intensity of the illumination light for the captured image data does not correspond to the reference image data, pixels cannot be simply compared.

For this reason, evaluation can be performed based on the color tone of RGB between predetermined pixels. That is, a difference in mean square error between R/G (a ratio between the gradient of R and the gradient of G) between predetermined pixels in the captured image data and R/G between pixels in the reference image data corresponding to the predetermined pixels of the captured image data may be calculated to thereby eliminate a difference in intensity of the illumination light and calculate the numerical value indicative of degree of similarity with high accuracy. The R/G is calculated for a set of two pixels, a pixel A and a pixel B, as a ratio where the gradient of R of the pixel A is divided by the gradient of G of the pixel B. Alternatively, not only R/G but also B/G (a ratio between the gradient of B and the gradient of G) may also be used in combination. The predetermined pixels as described herein are defined in advance as a combination of pixels of a large R/G or B/G.

Each time a degree of similarity is written in the captured image data table for authenticity determination corresponding to the determination image data identification information, the authenticity determination unit 3109 sequentially reads the degree of similarity corresponding to the determination image data identification information, from the captured image data table for authenticity determination. Then, the authenticity determination unit 3109 compares each of the similarities corresponding to the determination image data identification information, which have been read, with a predetermined similarity threshold. The similarity threshold is obtained and set in advance as an experimental value obtained as follows: a degree of similarity between the captured image data captured at a certain angle (within a predetermined angular range described later) and the reference image data obtained corresponding to the observation angle of the captured image data is calculated for a plurality of different observation angles, and a numerical value exceeding the degree of similarity between the captured image data and the reference image data for each identical observation angle is taken as the experimental value. The different degrees of similarity are obtained according to the observation angle, and the authenticity determination unit 3109 performs an authenticity determination process for the identification medium using the similarity threshold corresponding to the observation angle.

The authenticity determination unit 3109 calculates similarities for one or more pieces of the captured image data, and determines a credit card 3300 (object for authenticity determination) to which the anti-counterfeiting medium 3400 is attached as fake (a non-authentic product) if the degree of similarity of even a single piece of the captured image data to the reference image data is not less than the similarity threshold. Further, the authenticity determination unit 3109 calculates similarities for one or more pieces of the captured image data, and determines that the credit card 3300 (object for authenticity determination) to which the anti-counterfeiting medium 3400 is attached as genuine (an authentic product) if all the similarities are less than the similarity threshold. The number of pieces of captured image data used for authenticity determination, that is, a specified number of different imaging angles at which the image data used for authenticity determination is each captured is set in advance (that is, the number of pieces of reference image data at each of the imaging angles is set in advance).

Here, each time the captured image data at the imaging angle is determined to be "genuine" by authenticity determination, the authenticity determination unit 3109 outputs determination information indicating that the authenticity determination of the anti-counterfeiting medium 3400 has made a determination of "genuine" to the progress notification unit 3110.

Each time a piece of determination information is supplied from the authenticity determination unit 3109, the progress notification unit 3110 integrates the supplied piece of determination information to thereby calculate the number of pieces of the determination information, that is, the number of pieces of the captured image data determined to be "genuine" in comparison with the reference image data. Then, the progress notification unit 3110 calculates the degree of progress by dividing the number of obtained pieces of determination information by a specified number, and notifies the user of the degree of progress calculated.

The display unit 3111 is configured of, for example, a liquid crystal display, and displays images on the screen thereof. The degree of progress is a numerical value representing a progress of the authenticity determination process.

In the image data storage unit 3115, the above-described captured image data, reference image data, captured image data table and the captured image data table for authenticity determination are written and stored.

When notifying the degree of progress calculated, the progress notification unit 3110 displays, for example, a progress indicator so that the user can intuitively recognize the stage of progress.

Figure 33A:
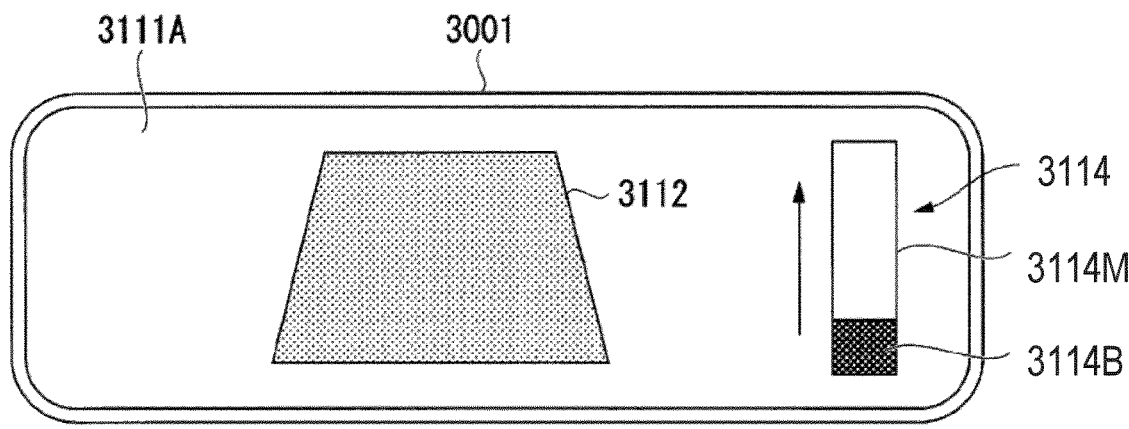
FIG. 33A is a view which illustrates an example of a progress indicator that is displayed on a screen of the display unit 3111 by a progress notification unit 3110.
Figure 33B:
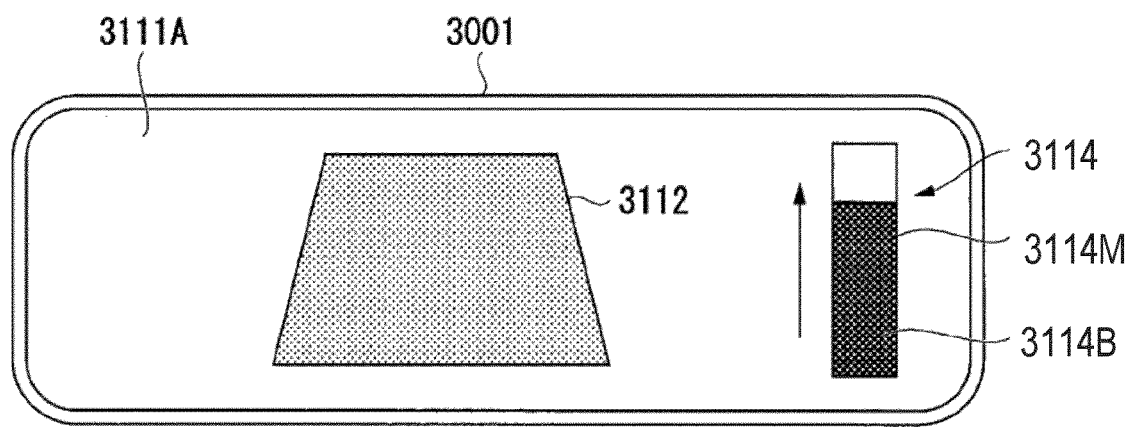
FIG. 33B is a view which illustrates an example of a progress indicator that is displayed on a screen of the display unit 3111 by the progress notification unit 3110.
Figure 33C:
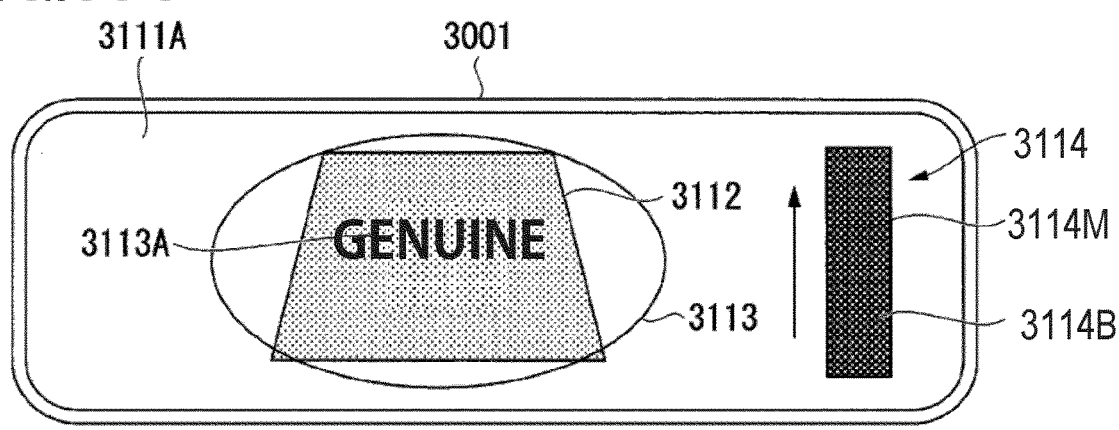
FIG. 33C is a view which illustrates an example of a progress indicator that is displayed on a screen of the display unit 3111 by the progress notification unit 3110.

FIGS. 33A to 33C are views which illustrate an example of a progress indicator that is displayed on a screen of the display unit 3111 by the progress notification unit 3110. In FIGS. 33A to 33C, a captured image including an image 3112 of the credit card 3300 and the progress indicator 3114 is displayed on the screen 3111A (screen of the display unit 3111 in FIG. 24) of the authenticity determination device 3001.

In FIGS. 33A to 33C, a progress bar 3114B is used as the progress indicator 3114.

As shown in FIGS. 33A and 33B, a progress meter 3114M is configured such that a bar 3114B fills the area corresponding to the percentage of calculated degree of progress. Accordingly, in the present embodiment, the user can easily recognize the progress state of authenticity determination. Therefore, the user can visually recognize that the process of authenticity determination is actually in progress, and smoothly perform the process of authenticity determination.

On the basis of the degree of progress obtained by dividing the number of pieces of determination information by a specified number, the progress notification unit 3110 updates the bar 3114B to fill the area corresponding to the degree of progress in the progress meter 3114M each time a new degree of progress is obtained.

FIG. 33C is a view which illustrates an example of the progress indicator in the case where authenticity determination of the anti-counterfeiting medium makes a determination of "genuine".

When the authenticity determination process produces a result of "genuine", the degree of progress becomes 100%. Accordingly, the progress notification unit 3110 fills the entire progress meter 3114M of the progress bar (progress indicator 3114) with the bar 3114B. Further, the progress notification unit 3110 notifies the user in an intuitive manner that the authenticity determination result is "genuine" by displaying a result notification image 3113 on the screen 3111A. For example, when the process of authenticity determination process produces a result of "genuine", the result notification image 3113 is an image which includes a symbol image 3113A representing "genuine" to thereby visually indicate the result of authenticity determination. Although not shown in the figure, when the process of authenticity determination process produces a result of "fake", the progress notification unit 3110 deletes the image of the bar 3114B in the progress meter 3114M of the progress bar. The progress notification unit 3110 notifies the user in an intuitive manner that the authenticity determination result is "fake" by displaying the result notification image 3113 which includes a symbol image representing "fake" on the screen 3111A.

Referring back to FIG. 24, the imaging control unit 3102 determines whether the observation angle in imaging of the anti-counterfeiting medium is within a predetermined angular range. The angular range refers to a range of angles in which different colors or light patterns can be observed depending on the observation angles in diffraction gratings or holograms. If the observation angle is not within the angular range, the reference image data in which the corresponding color or light pattern is captured cannot be generated with high accuracy, and thus the authenticity determination of the anti-counterfeiting medium cannot be performed with high accuracy.

In this case, the imaging control unit 3102 causes the observation angle estimation unit 3105 to estimate an observation angle, which is an imaging direction of the imaging unit 3101. The imaging control unit 3102 displays information on the screen of the display unit 3111 to indicate the user that the angular condition in the imaging process is satisfied when the observation angle estimated by the observation angle estimation unit 3105 is within the angular range, and that the angular condition in the imaging process is not satisfied when the estimated observation angle is not within the angular range to thereby prompt the user to adjust for the observation angle within the angular range.

Moreover, the imaging control unit 3102 determines whether the imaging unit 3101 when capturing images satisfies imaging conditions for capturing image data having a quality available for comparison with the reference image data.

The imaging conditions may include, if necessary, presence or absence of an illumination or intensity of the illumination as an exposure condition.

The imaging control unit 3102 generates, as an imaging condition, a luminance histogram when setting the exposure condition of the imaging unit 3101. The imaging control unit 3102 indicates a gradient distribution of pixels and uses the generated luminance histogram to determine whether the gradient distribution in the captured image data is not biased to a high gradient region or a low gradient region. For example, when the gradient distribution in the luminance histogram is biased to the low gradient region, that is, when the pixels are dominant at the gradient near 0 in the captured image data while the gradient is expressed by 256 tones ranging from 0 to 255, black defects occur in the captured image data so that the comparison with the reference image data cannot be performed. On the other hand, when the gradient distribution in the luminance histogram is biased to the high gradient region, that is, when pixels are dominant at the gradient near 255 in the captured image data, halation occurs in the captured image data so that the comparison with the reference image data cannot be performed.

Therefore, the exposure condition is required to be set to allow the distribution in the luminance histogram to be present around the median of the gradient ranging from 0 to 255.

The imaging control unit 3102 determines whether the illumination is required to be adjusted on the basis of the gradient distribution of the luminance histogram. When the black defects are expected to appear and the illumination is required to be adjusted to shift the distribution of the luminance histogram toward the high gradient region, the imaging control unit 3102 causes the exposure control unit 3103 to illuminate the anti-counterfeiting medium 3400 by the lighting unit 3104 with a predetermined intensity during imaging (for example, by irradiating flash light in the imaging direction). Further, when the authenticity determination device 3001 does not include the exposure control unit 3103 and the lighting unit 3104, the imaging control unit 3102 displays information prompting the user to irradiate illumination with necessary light intensity to the anti-counterfeiting medium 3400 on the screen of the display unit 3111.

On the other hand, when halation is expected to occur and the illumination is required to be adjusted to shift the distribution of the luminance histogram toward the low gradient region, the imaging control unit 3102 controls the exposure control unit 3103 so that the lighting unit 3104 does not illuminate the anti-counterfeiting medium 3400, or can illuminate the anti-counterfeiting medium 3400 with a predetermined intensity during imaging. Further, the imaging control unit 3102 displays information prompting the user to lower the intensity of current ambient illumination around the anti-counterfeiting medium 3400 on the screen of the display unit 3111 in order to irradiate illumination with required light intensity to the anti-counterfeiting medium 3400.

In the above-described processes, an exposure control table, which includes distributions of luminance histogram and control conditions such as exposure conditions and illumination intensities corresponding to the distributions, may be prepared. The exposure control table may be written and stored in the image data storage unit 3115 in advance. In this case, the imaging control unit 3102 searches a luminance histogram similar to the luminance histogram pattern of the image data to be captured from the exposure control table in the image data storage unit 3115, reads the information on the control condition such as the exposure condition and the illumination intensity of the image data to be captured, and displays the control condition on the screen of the display unit 3111 as described above.

Further, an illuminance sensor may also be provided for the exposure control unit 3103, and the exposure condition and the degree of illuminance may be set based on the illuminance detected by the illuminance sensor. Here, an exposure control table, which includes illuminances and control conditions such as exposure conditions and illumination intensities corresponding to the illuminances, may be prepared. The exposure control table may be written and stored into the image data storage unit 3115 in advance. In this case, the imaging control unit 3102 searches through the exposure control table in the image data storage unit 3115, finding correlation with the illuminance in capturing the image data, to read the information on the control condition such as the exposure condition and the illumination intensity of the image data to be captured, and displays the control condition on the screen of the display unit 3111 as described above.

Figure 34:
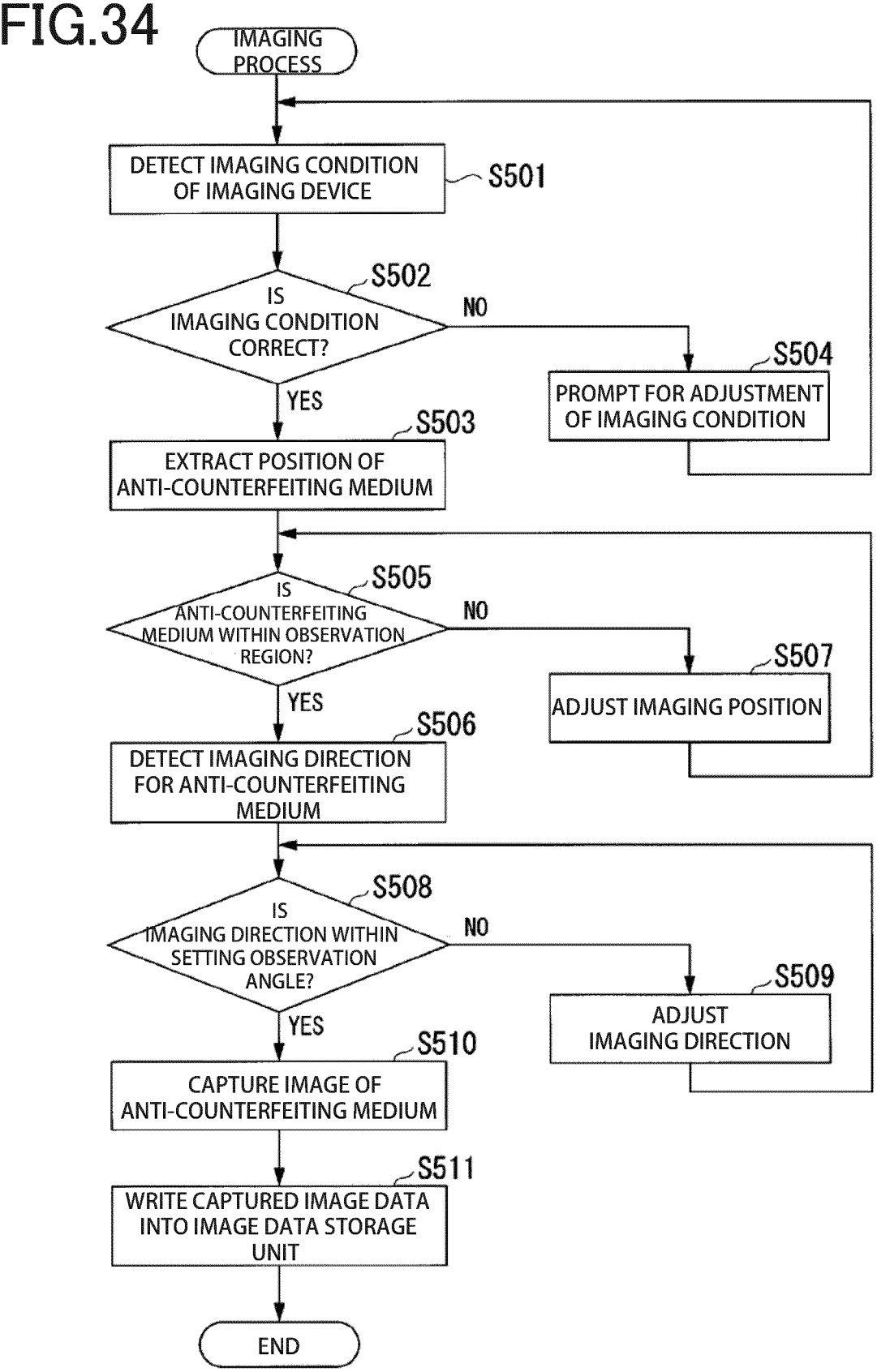
FIG. 34 is a flowchart of an exemplary operation of capturing image data for an authenticity determination process for an authenticity determination object using an anti-counterfeiting medium in the identification device according to the sixth embodiment.

FIG. 34 is a flowchart of an exemplary operation of capturing image data used for an authenticity determination process for an authenticity determination object using an anti-counterfeiting medium in the identification device according to the sixth embodiment. In the imaging process of the captured image data described herein, the process is performed for each of the predetermined observation angles (the number corresponding to the specified number), that is, the number of times corresponding to the specified number so that the captured images corresponding to the respective observation angles can be obtained.

Step S501:

The imaging control unit 3102 detects current imaging conditions such as an exposure condition for the authenticity determination object in the imaging unit 3101.

Step S502:

The imaging control unit 3102 determines whether all the imaging conditions such as the exposure condition satisfy the conditions for capturing the image data having a quality available for comparison with the reference image data.

If the imaging conditions satisfy the conditions for capturing the image data having a quality available for comparison with the reference image data, the imaging control unit 3102 proceeds the process to step S503. On the other hand, if the imaging conditions do not satisfy the conditions for capturing the image data having a quality available for comparison with the reference image data, the imaging control unit 3102 proceeds the process to step S504.

Step S503:

The imaging control unit 3102 extracts an imaging position of the anti-counterfeiting medium 3400 in the captured image data. That is, the imaging control unit 3102 obtains a three-dimensional shape of the credit card 3300 (authenticity determination object) in the imaging range of the imaging unit 3101. The imaging control unit 3102 compares the three-dimensional shape of the credit card 3300 thus obtained and the three-dimensional shape of the credit card 3300 pre-stored to extract the region of the anti-counterfeiting medium 3400 in the imaging range of the imaging unit 3101.

Step S504:

The imaging control unit 3102 displays unsatisfied imaging conditions on the screen of the display unit 3111 to prompt the user to adjust the unsatisfied imaging conditions.

Step S505:

The imaging control unit 3102 compares the anti-counterfeiting medium 3400 in the imaging range of the imaging unit 3101 and the anti-counterfeiting medium 3400 in the pre-stored three-dimensional shape of the credit card 3300. Then, the imaging control unit 3102 determines whether the imaging direction for capturing the image data of the entire anti-counterfeiting medium 3400, that is, the observation angle is within a predetermined angular range.

The imaging control unit 3102 proceeds the process to step S506 if the observation angle of the imaging unit 3101 is within a predetermined angular range, and proceeds the process to step S507 if the observation angle of the imaging unit 3101 is not within a predetermined angular range.

Step S506:

The imaging unit 3102 causes the observation angle estimation unit 3105 to estimate the imaging direction, that is, the observation angle of the anti-counterfeiting medium 3400.

Thus, the observation angle estimation unit 3105 compares the three-dimensional shape of the credit card 3300 obtained from the captured image data in the imaging range of the imaging unit 3101 with the pre-stored three-dimensional shape of the credit card 3300 in the three-dimensional coordinate system to estimate the observation angle of the anti-counterfeiting medium 3400. Here, the observation angle estimation unit 3105 calculates the imaging direction in which the imaging unit 3101 images the credit card 3300 from the above comparison. Then, the observation angle estimation unit 3105 calculates an angle formed between the normal line to the surface of the credit card 3300 in the three-dimensional coordinate system on which the anti-counterfeiting medium 3400 is attached (the top or underside of the credit card 3300 on which the anti-counterfeiting medium 3400 is attached) and the imaging direction of the imaging unit 3101 as the observation angle, and outputs the angle to the imaging control unit 3102.

Step S507:

The imaging unit 3102 displays a message on the screen of the display unit 3111, suggesting to the user to change the imaging position by adjusting the imaging position of the imaging unit 3101 so that the entire region of the anti-counterfeiting medium 3400 is included within the imaging area of the imaging unit 3101.

Step S508:

Then, the imaging control unit 3102 determines whether the imaging direction for capturing the image data of the entire anti-counterfeiting medium 3400, that is, the observation angle is within a predetermined angular range.

The imaging control unit 3102 proceeds the process to step S510 if the observation angle of the imaging unit 3101 is within a predetermined angular range, and proceeds the process to step S509 if the observation angle of the imaging unit 3101 is not within a predetermined angular range.

Step S509:

The imaging unit 3102 displays a message on the screen of the display unit 3111, suggesting to the user to change the imaging direction by adjusting the imaging direction of the imaging unit 3101 so that the observation angle of the imaging unit 3101 is within the predetermined angle range.

Step S510:

The imaging control unit 3102 displays an image on the screen of the display unit 3111, indicating that imaging of the anti-counterfeiting medium 3400 is ready, and prompts the user to image the anti-counterfeiting medium 3400.

As the user confirms the screen, the user inputs an imaging command via an input unit of the authenticity determination device 3001.

Thus, the imaging control unit 3102 causes the imaging unit 3101 to perform imaging process to obtain captured image data.

Step S511:

The imaging control unit 3102 adds captured image data identification information to the captured image data, and writes and stores the captured image data in the image data storage unit 3115 together with a captured image data address, which is an address pointing to a region of the image data storage unit 3115 in which the captured image data is written.

Figure 35:
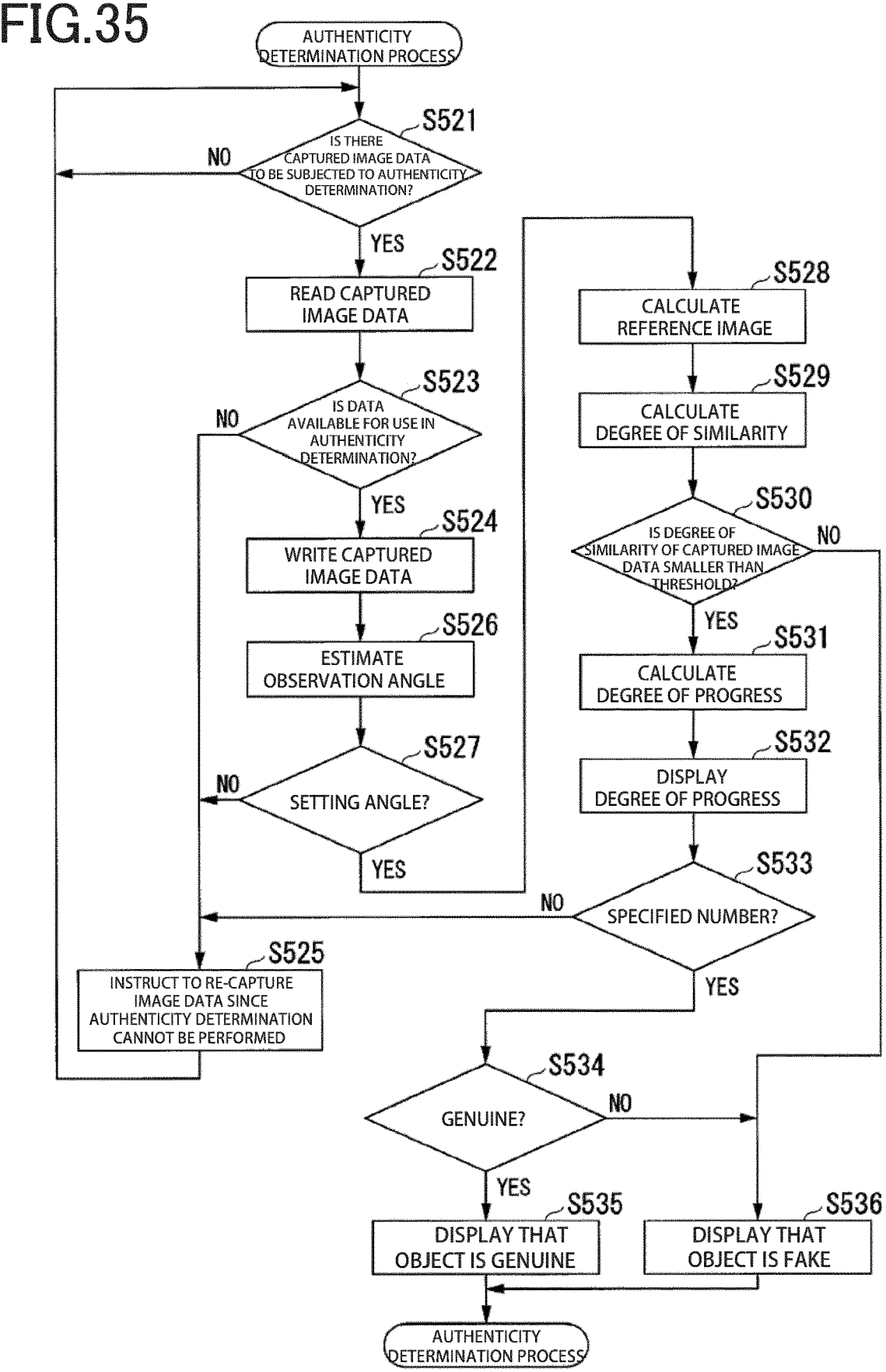
FIG. 35 is a flowchart of an exemplary operation of an authenticity determination process for an authenticity determination object using an anti-counterfeiting medium in the identification device according to the sixth embodiment.

FIG. 35 is a flowchart of an exemplary operation of authenticity determination process for an authenticity determination object using an anti-counterfeiting medium in the identification device according to the sixth embodiment.

Step S521:

The available image selecting unit 3106 determines whether the unprocessed captured image data is present in the captured image data table in the image data storage unit 3115.

If the unprocessed captured image data is present in the captured image data table, the available image selecting unit 3106 proceeds the process to step S522. On the other hand, if the unprocessed captured image data are not present in the captured image data table, the available image selecting unit 3106 repeats step S521.

Step S522:

The available image selecting unit 3106 reads a captured image data address of unprocessed captured image data from the captured image data table.

The available image selection unit 3106 sequentially reads the unprocessed captured image data from the captured image data storage unit 3115 by using the captured image data address to determine whether the data are available for comparison with the reference image data.

Step S523:

The available image selecting unit 3106 determines whether the captured image data which have been read are available for comparison with the reference image data.

The available image selecting unit 3106 determines, for example, whether the entire shape of the anti-counterfeiting medium 3400 is included in the captured image data, whether the anti-counterfeiting medium is in focus, and whether the luminance histogram is appropriately distributed. The available image selecting unit 3106 proceeds the process to step S523 if the captured image data are available for comparison with the reference image data, and proceeds the process to step S524 if the captured image data are not available for comparison with the reference image data.

Step S524:
If the captured image data are determined as being available for comparison with the reference image data, the available image selecting unit 3106 adds determination image data identification information to the captured image data. The available image selecting unit 3106 writes and stores the determination image data identification information of the captured image data, together with the determination image data identification information which has been added as above, in the captured image data table for authenticity determination in the image data storage unit 3115.

Step S525:
If the captured image data are determined as not being available for comparison with the reference image data, the available image selecting unit 3106 returns the process to step S521 and again obtains the captured image data.

Here, the available image selecting unit 3106 may be configured to display a message on the screen of the display unit 3111, suggesting to change the current imaging viewpoint and image the anti-counterfeiting medium 3400. This message is provided for obtaining captured image data with appropriate focus and appropriate distribution of luminance histogram, and obtaining captured image data whose observation angle, described later, is within the predetermined setting observation angle. With this message suggesting to change the imaging viewpoint, the user can recognize that the authenticity determination process for the anti-counterfeiting medium 3400 is being in progress and further information on the anti-counterfeiting medium 3400 is required to advance the authenticity determination process.

Step S526:
The observation angle estimation unit 3105 reads the captured image data identification information from the captured image data table for authenticity determination in the image data storage unit 3115. Then, the observation angle estimation unit 3105 reads the captured image data address corresponding to the captured image data identification information from the captured image data table in the image data storage unit 3115. The observation angle estimation unit 3105 uses the captured image data address to read the captured image data from the image data storage unit 3115, obtains the observation angle for each piece of the captured image data in the three-dimensional coordinate system, and outputs the observation angle obtained to the available image selecting unit 3106.

Step S527:
The available image selecting unit 3106 determines whether the observation angle supplied from the observation angle estimation unit 3105 is included in any of the predetermined setting observation angles, or whether the observation angle corresponds to the already-obtained setting observation angle.

If the observation angle obtained does not correspond to the predetermined setting observation angle or matches with the already-obtained setting observation angle, the available image selecting unit 3106 deletes the data corresponding to the captured image data identification information correlated to the observation angle from the captured image data table for authenticity determination, and proceeds the process to step S525. On the other hand, if the observation angle obtained corresponds to the predetermined setting observation angle and does not match the already-obtained setting observation angle, the available image selecting unit 3106 proceeds the process to step S528.

Step S528:
Based on the observation angle of the captured image data, the reference image generation unit 3107 generates reference image data corresponding to the observation angle of the captured image data by calculation using predetermined simulation or the like. The reference image generation unit 3107 writes the generated reference image data in the image data storage unit 3115, and writes and stores the address of the written data as a reference image data address in the captured image data table for authenticity determination.

Step S529:
The similarity calculation unit 3108 reads the captured image data identification information to which calculation of degree of similarity has not yet been performed from the captured image data table for authenticity determination in the image data storage unit 3115. Then, the similarity calculation unit 3108 reads, from the captured image data table in the image data storage unit 3115, a captured image data address corresponding to the captured image data identification information which has been read. The similarity calculation unit 3108 reads, from the image data storage unit 3115, captured image data corresponding to the captured image data address which has been read. Further, the similarity calculation unit 3108 reads the reference image data address of the corresponding imaging angle from the captured image data table for authenticity determination, and reads the reference image data from the image data storage unit 3115 by using the reference image data address.

The similarity calculation unit 3108 calculates the degree of similarity of the captured image data to the reference image data by using template matching. The similarity calculation unit 3108 correlates the calculated degree of similarity to the captured image data identification information for storage and writing into the captured image data table for authenticity determination in the image data storage unit 3115.

Step S530:
The authenticity determination unit 3109 reads, from the captured image data table for authenticity determination in the image data storage unit 3115, the captured image data to which calculation of degree of similarity has not yet been performed and determines whether the degree of similarity which has been read is less than the predetermined similarity threshold.

Then, the authenticity determination unit 3109 determines whether the degree of similarity of the captured image data indicated by the captured image data identification information which has been read from the captured image data table for authenticity determination is less than the similarity threshold. When the degree of similarity of the captured image data indicated by the captured image data identification information which has been read is less than the similarity threshold, the authenticity determination unit 3109 determines that the anti-counterfeiting medium is genuine and thus the authenticity determination object is genuine (an authentic product), and proceeds the process to step S531. On the other hand, when the degree of similarity of the captured image data indicated by the captured image data identification information is not less than the similarity threshold, the authenticity determination unit 3109 determines that the anti-counterfeiting medium is fake and thus the authenticity determination object is fake (a non-authentic product), and proceeds the process to step S536.

Step S531:
The authenticity determination unit 3109, when determining that the anti-counterfeiting medium is genuine, outputs determination information to the progress notification unit 3110, instructing calculation of the degree of progress as information indicating that the authenticity determination process produces a result of "genuine".

The progress notification unit 3110 increments the number of pieces of determination information (adds 1) each time a piece of determination information is supplied from the authenticity determination unit 3109 to thereby calculate the integrated value.

Then, the progress notification unit 3110 divides the integrated value thus obtained by a predetermined specified number of pieces of determination information to thereby calculate a degree of progress.

Step S532:

The progress notification unit 3110 displays the calculated degree of progress as the progress indicator on the screen of the display unit 3111 (for example, the progress indicator 3111 shown in FIGS. 33A to 33C) to notify the user of the degree of progress.

Step S533:

The progress notification unit 3110 determines whether the number of pieces of determination information reaches a specified number. When it reaches the specified number, the progress notification unit 3110 outputs the calculated degree of progress to the authenticity determination unit 3109, and proceeds the process to step S534.

On the other hand, when the number of pieces of determination information does not reach the specified number, the progress notification unit 3110 proceeds the process to step S525.

Step S534:

The authenticity determination unit 3109 determines whether the degree of progress supplied from the progress notification unit 3110 exceeds a predetermined "genuine"-determination threshold. The authenticity determination unit 3109 proceeds the process to step S536 if the degree of progress exceeds the "genuine"-determination threshold and proceeds the process to step S535 if the degree of progress is not more than the "genuine"-determination threshold.

Step S535:

The authenticity determination unit 3109 displays an image on the display unit 3111 indicating that the authenticity determination object is an authentic product (for example, see FIG. 33C). Then, the authenticity determination device 3001 terminates the authenticity determination process for the authenticity determination object.

Step S536:

The authenticity determination unit 3109 displays an image on the display unit 3111 indicating that the authenticity determination object is a non-authentic product. Then, the authenticity determination device 3001 terminates the authenticity determination process for the authenticity determination object.

With this configuration of the present embodiment, the progress notification unit 3110 displays the progress indicator corresponding to the stage of the authenticity determination on the screen of the display unit 3111. Accordingly, the user can intuitively recognize how the stage of authenticity determination is proceeding as he moves the authenticity determination device 3001 from the changes in the progress indicator. Accordingly, even if the user cannot sufficiently recognize whether the determination algorithm for authenticity determination of the anti-counterfeiting medium 3400 is being performed, the user can smoothly perform authenticity determination without being concerned about how the process of authenticity determination is proceeding.

Further, according to the present embodiment, the captured image data of the anti-counterfeiting medium is compared with the reference image data which is a genuine anti-counterfeiting medium captured at the observation angle of the captured image data to determine whether the anti-counterfeiting medium is genuine or fake. Hence, without using a conventional special authenticity determination device, and without relying on the disposition condition of the anti-counterfeiting medium, authenticity determination of the anti-counterfeiting medium (genuine or fake) can be readily performed by capturing an image of the anti-counterfeiting medium with a simple image capturing device such as a general purpose digital camera.

In the present embodiment, an example is described in which the progress notification unit 3110 displays the progress indicator which displays a progress bar indicative of the degree of progress of authenticity determination on the screen of the display unit 3111 as a technique of progress notification in authenticity determination.

However, the above progress bar is merely an example, and the progress notification unit 3110 may also be configured to display a progress circle or a progress dialogue on the screen of the display unit 3111 as the progress indicator to thereby notify the degree of progress of authenticity determination.

Figure 36A:
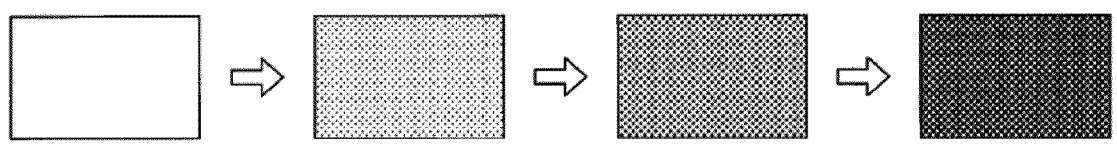
FIG. 36A is a view which illustrates an example of a progress indicator that notifies the degree of progress displayed on a screen of the display unit 3111 by the progress notification unit 3110.
Figure 36B:
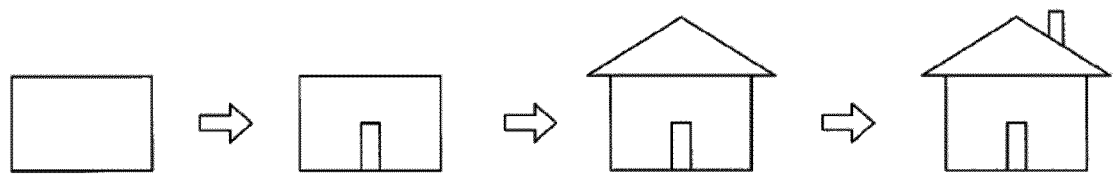
FIG. 36B is a view which illustrates an example of a progress indicator that notifies the degree of progress displayed on a screen of the display unit 3111 by the progress notification unit 3110.
Figure 36C:
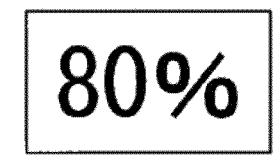
FIG. 36C is a view which illustrates an example of a progress indicator that notifies the degree of progress displayed on a screen of the display unit 3111 by the progress notification unit 3110.

FIGS. 36A to 36C are views which illustrate an example of a progress indicator that notifies the degree of progress displayed on a screen of the display unit 3111 by the progress notification unit 3110.

FIG. 36A shows an example in which the progress indicator displayed on the screen of the display unit 3111 is an image having a rectangular display region whose color density gradually changes from colorless to dark corresponding to the stage of progress. In the example shown in FIG. 36A, the progress indicator may not necessarily be a rectangular shape, and may be an image of any shape as long as the image has a size that the user can recognize.

FIG. 36B shows an example in which the progress indicator displayed on the screen of the display unit 3111 is an image of characters or objects that gradually grows to a predetermined final shape corresponding to the stage of progress. In this case, the final shape may be displayed when the authenticity determination is completed as genuine (an authentic product), and a broken shape may be displayed when the authenticity determination is completed as fake (a non-authentic product). In the example shown in FIG. 36B, the progress indicator may not necessarily be a shape of structure and may be any shape that allows the user to recognize it is approaching the final shape. For example, an image of animal that grows up corresponding to the stage of progress may be displayed. In this case, when the authenticity determination is completed as genuine (an authentic product), an image associated with a matured state or the determination as genuine (for example, an image of an angle) may be displayed. Further, when the authenticity determination is completed as fake (a non-authentic product), an image associated with an initial shape before growing starts or the determination as fake (for example, an image of a demon or devil) may be displayed.

FIG. 36C shows an example in which the progress indicator displayed on the screen of the display unit 3111 is an image of numerical character of percentage (%) that gradually changes corresponding to the stage of progress from 0% to 100%, which indicates the end of determination. In the example shown in FIG. 36C, the progress indicator may not necessarily be a percentage and may be any image that allows the user to recognize it is approaching the end of authenticity determination. For example, an image of numerical character that indicates the changes in level or stage may be displayed.

In addition to the examples shown in FIGS. 36A to 36C, the progress indicator displayed on the screen of the display unit 3111 may also be an image of characters or objects such as sun, light, animal, and structure displayed in a predetermined region. The progress notification unit 3110 may be configured to display the character or object in low to high brightness corresponding to the stage of progress of authenticity determination while increasing the frequency of lighting and flashing of the display as the stage of authenticity determination proceeds so that the user can recognize the degree of progress from the flashing state of the display.

Alternatively, the progress indicator displayed on the screen of the display unit 3111 may be a triangular shape and configured such that a new vertex appears as the authenticity determination proceeds so that the triangle becomes a circle when the authenticity determination is completed as genuine (an authentic product), and a cross mark is displayed when the authenticity determination is completed as fake (a non-authentic product).

Alternatively, the image of the anti-counterfeiting medium 3400 of the captured image displayed on the screen of the display unit 3111 may have a luminance that gradually changes from low to high intensity corresponding to the stage of progress of authenticity determination. That is, the progress notification unit 3110 extracts the image of the anti-counterfeiting medium 3400 from the captured image displayed on the screen of the display unit 3111, and displays the image other than the anti-counterfeiting medium 3400 in the captured image with the same luminance as that of the captured image, while displaying the image of the anti-counterfeiting medium 3400 with the luminance gradually changing from a predetermined low intensity to the same intensity as that of the image of the anti-counterfeiting medium 3400 when it is imaged in the captured image, corresponding to the change in the degree of progress of authenticity determination.

Alternatively, in place of using the aforementioned progress indicator, a vibrator of mobile terminals or smartphones may be used to notify the progress state by vibration frequency. For example, the progress notification unit 3110 may be configured to control a vibrator function unit in mobile terminals or smartphones upon actuation of the application of authenticity determination so that the vibration frequency of the vibrator gradually decreases from the highest frequency to lower frequency as the stage of the authenticity determination proceeds.

Alternatively, the progress notification unit 3110 may be configured to output audio data of a numerical value such as the percentage of the progress of authenticity determination or to what extent the authenticity determination is completed from a speaker or audio output terminal of mobile terminals or smartphones to thereby notify the progress in an intuitive manner as the stage of authenticity determination proceeds.

Alternatively, the progress notification unit 3110 may be configured to output audio data of frequencies corresponding to the degree of progress of authenticity determination, such as the scale of do, re, mi, fa, so, la, ti, and do, from a speaker or audio output terminal of mobile terminals or smartphones so that it moves to a scale of higher frequency as the stage of the authenticity determination proceeds. In this case, change in the degree of progress may also be notified when the authenticity determination process produces a result of "genuine" or by simply enhancing the frequency of a predetermined tone.

Seventh Embodiment

Hereinafter, with reference to the drawings, a seventh embodiment of the present invention will be described.

An identification device of the seventh embodiment is the same as the identification device in the sixth embodiment shown in FIG. 24. In the sixth embodiment, the authenticity determination process is performed even if a single piece of captured image data is available for use in authenticity determination. In the seventh embodiment, however, the authenticity determination process is performed only in the case where not less than a predetermined number of pieces of captured image data is available for use in authenticity determination. Here, each of the above number of pieces of captured image data needs to be captured from a different observation angle. The imaging process is performed in the same manner as the sixth embodiment shown in the flowcharts of FIG. 35.

Figure 37:
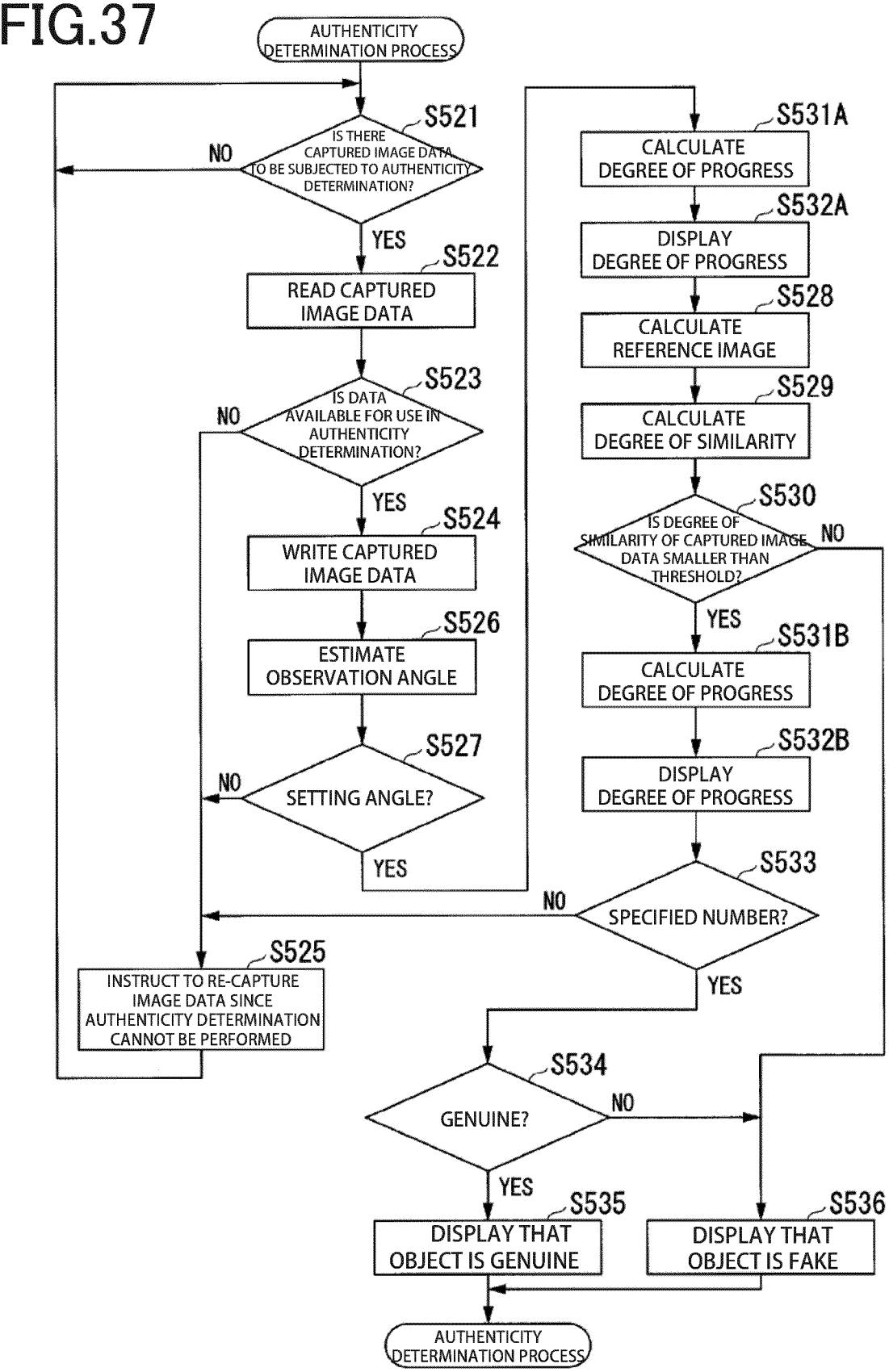
FIG. 37 is a flowchart of an exemplary operation of an authenticity determination process for an authenticity determination object using an anti-counterfeiting medium in the identification device according to a seventh embodiment.

FIG. 37 is a flowchart of an exemplary operation of authenticity determination process for an authenticity determination object using an anti-counterfeiting medium in the identification device according to the seventh embodiment.

Steps S521 to S527, S528 to S530, and S533 onward are similar to the operation of the flowchart in the sixth embodiment shown in FIG. 35. Hereinafter, the description will be given only on operations different from that of the sixth embodiment.

Step S531A (S531B):

The progress notification unit 3110 counts the number of pieces of the captured image data identification information in the captured image data table for authenticity determination in the image data storage unit 3115 to thereby obtain the number of imaging angles.

The progress notification unit 3110 adds the current number of imaging angles to the integrated value of the pieces of determination information, and then divides the sum by a value which is twice the specified number (sum of the number of imaging angles and the specified number) to thereby calculate the degree of progress.

Step S532A (S532B):

The progress notification unit 3110 displays the calculated degree of progress as the progress indicator on the screen of the display unit 3111 (for example, the progress indicator 3114 shown in FIGS. 33A to 33C) to notify the user of the degree of progress.

With this configuration of the present embodiment, the progress notification unit 3110 displays the progress indicator corresponding to the stage of the authenticity determination on the screen of the display unit 3111 together with the state of obtaining the observation angles corresponding to the setting observation angles in advance. Accordingly, the user can intuitively recognize how the stage of authenticity determination is proceeding as he moves the authenticity determination device 3001 from the changes in the progress indicator indicating the progress state more detailed than the sixth embodiment. Accordingly, even if the user cannot sufficiently recognize whether the determination algorithm for authenticity determination of the anti-counterfeiting medium 3400 is being performed, the user can smoothly perform authenticity determination without being concerned about how the process of authenticity determination is proceeding.

Eighth Embodiment

Hereinafter, with reference to the drawings, an eighth embodiment of the present invention will be described.

Figure 38:
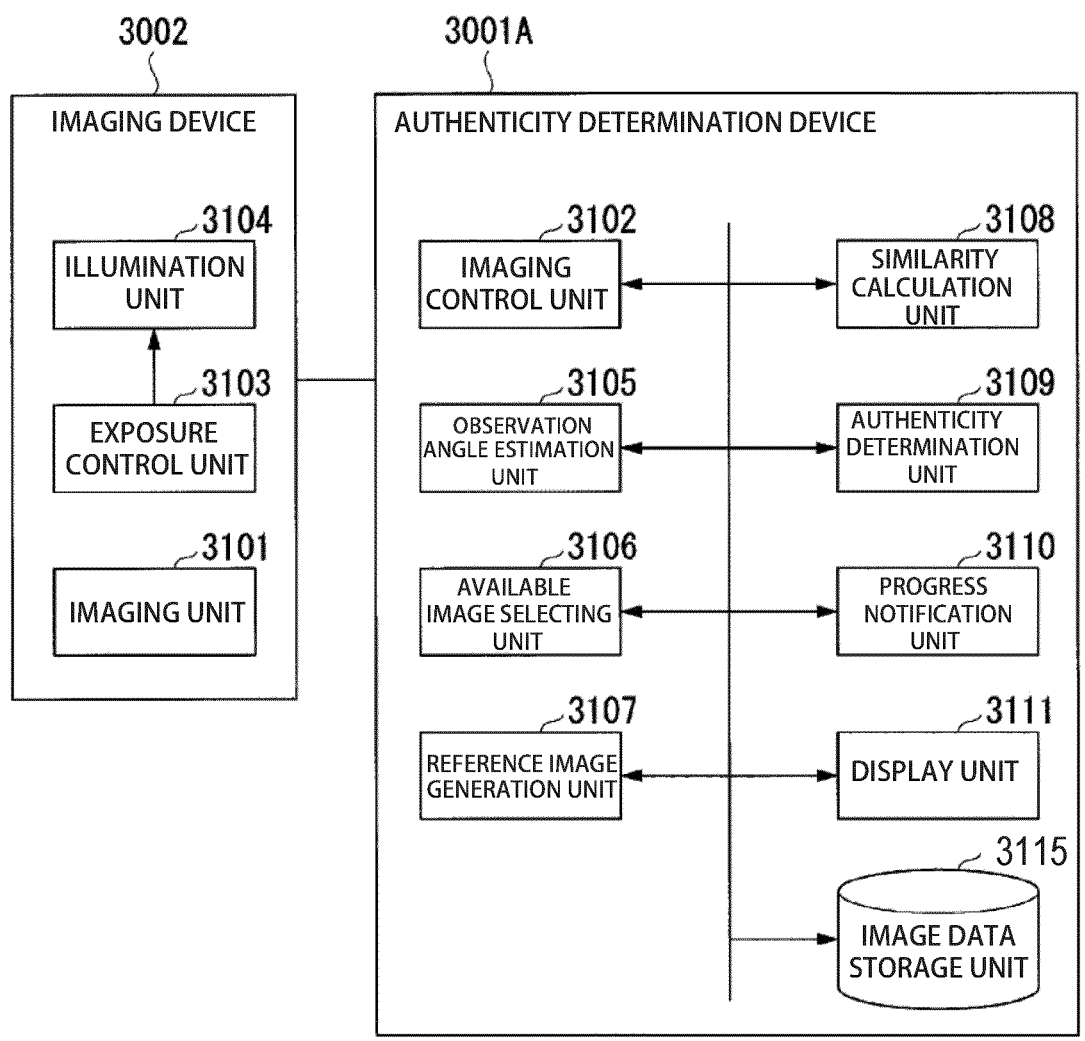
FIG. 38 is a block diagram which illustrates a configuration example of an identification device according to a ninth embodiment.

FIG. 38 is a block diagram which illustrates a configuration example of an identification device according to the eighth embodiment. In FIG. 38, the identification device includes an authenticity determination device 3001A and an imaging device 3002. The authenticity determination device 3001A includes an imaging control unit 3102, an observation angle estimation unit 3105, an available image selecting unit 3106, a reference image generation unit 3107, a similarity calculation unit 3108, an authenticity determination unit 3109, a display unit 3111, and an image data storage unit 3115. Further, the imaging device 3002 includes an imaging unit 3101, an exposure control unit 3103, and an illumination unit 3104. In FIG. 38, the same elements as those of the sixth embodiment are denoted by the same reference characters.

In the present embodiment, the identification device is configured such that imaging and exposure functions in the sixth embodiment are separated as the imaging device 3002 from the authenticity determination device 3001A. With this configuration, general purpose digital cameras or mobile terminals (including mobile phones and smartphones) can be easily used as imaging devices to capture the image data for authenticity determination.

Further, the authenticity determination device 3001A may be configured as a cloud so as to communicate with digital cameras or mobile terminals, which are not shown, via an information communication network such as internet. The authenticity determination device 3001A may be configured to perform the process of authenticity determination of the anti-counterfeiting medium by using the captured image data supplied from the digital cameras or mobile terminals as with the aforementioned sixth and seventh embodiments.

Ninth Embodiment

Hereinafter, with reference to the drawings, a ninth embodiment of the present invention will be described. In the aforementioned sixth to eighth embodiments, the anti-counterfeiting medium is retroreflective, and the illumination unit 3104 is integrated with the authenticity determination device 3001 or with the imaging device 3002 together with the imaging unit 3101. In some cases, however, the anti-counterfeiting medium may be a type of allowing light from the illumination 3200 as shown in FIG. 26 to be transmitted (for example, transmission hologram) and the captured image data of the pattern of the transmitted light is used for authenticity determination. In this case, the illumination 3200 needs to be provided at a position where light transmitted through the anti-counterfeiting medium is incident on the imaging unit. Accordingly, as with the case of the ninth embodiment of the present invention, the illumination unit 3104 needs to be separated from the imaging device 3002 or the authenticity determination device 3001.

Figure 39:
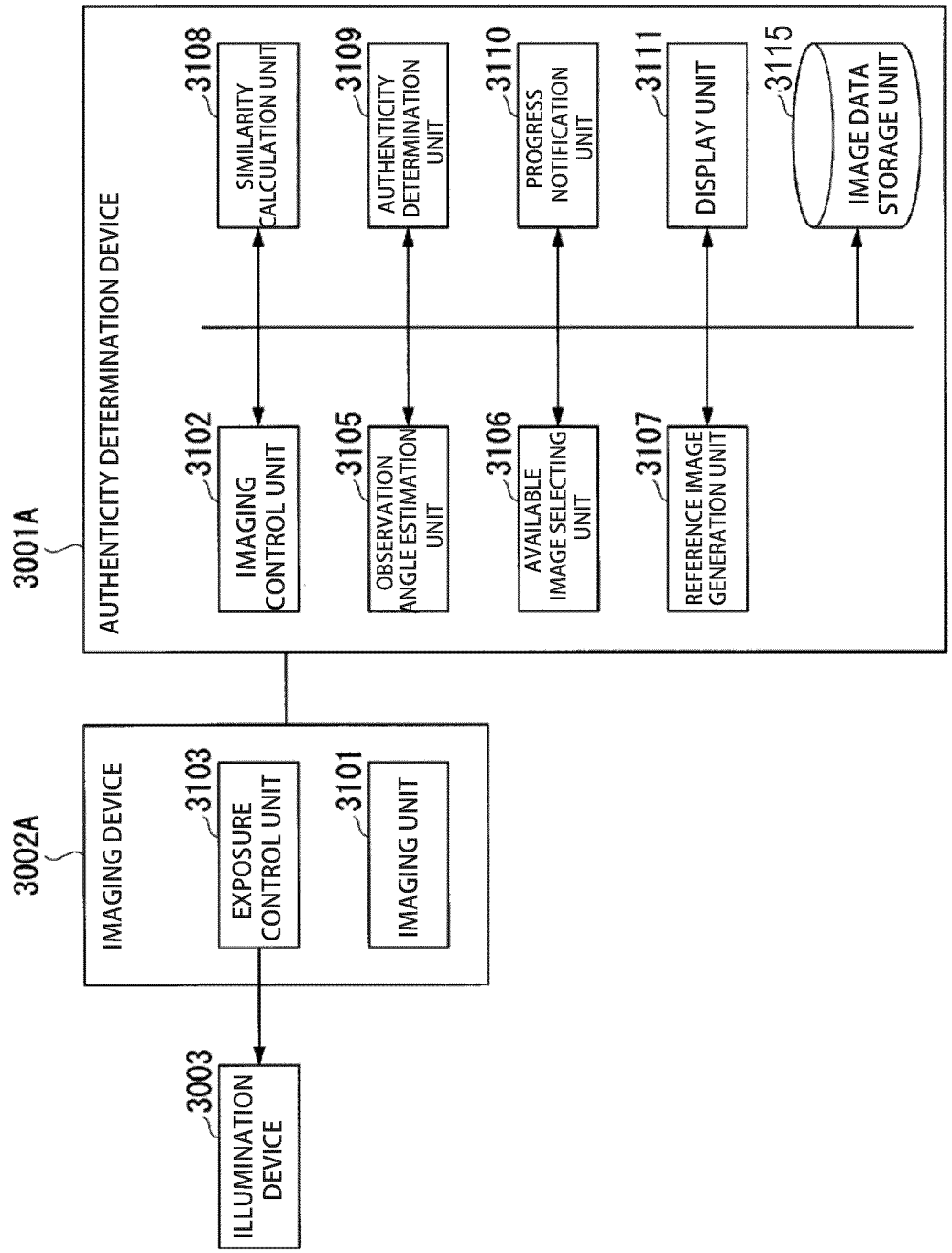
FIG. 39 is a block diagram which illustrates a configuration example of an identification device according to a ninth embodiment.

FIG. 39 is a block diagram which illustrates a configuration example of an identification device according to the ninth embodiment. In FIG. 39, the identification device is configured such that the illumination device 3003 (illumination unit 3104) is separated from the authenticity determination device 3001A and the imaging device 3002A. Accordingly, as shown in FIG. 26, imaging light from the illumination device 3003 (light source 3200) is incident on the anti-counterfeiting medium 3400 at an irradiation angle β. With the supply of the imaging light, the anti-counterfeiting medium 3400 emits light of a predetermined pattern. As described above, the pattern of light is different depending on the observation angle α. Further, the pattern of light emitted from the anti-counterfeiting medium 3400 is different depending on the irradiation angle β even at the same observation angle α.

As described above, in the case where the anti-counterfeiting medium has characteristics of emitting a light pattern by transmission, not only the observation angle α but also the irradiation angle β of the illumination light from the lighting device 3003 to the anti-counterfeiting medium 3400 in capturing of an image for authenticity determination needs to be adjusted so that the irradiation angle β becomes the angle relative to the anti-counterfeiting medium 3400 during a simulation corresponding to the structure of the anti-counterfeiting medium 3400 for generating the reference image data or in capturing of image data in advance.

Accordingly, in the ninth embodiment, the identification device includes the authenticity determination device 3001A, the imaging device 3002A and the illumination device 3003. The authenticity determination device 3001A includes an imaging control unit 3102, an observation angle estimation unit 3105, an available image selecting unit 3106, a reference image generation unit 3107, a similarity calculation unit 3108, an authenticity determination unit 3109, a display unit 3111, and an image data storage unit 3115. The authenticity determination process is the same as that in the sixth embodiment and the seventh embodiment.

Further, the imaging device 3002 includes the imaging unit 3101 and the exposure control unit 3103. In FIG. 39, the same elements as those of the sixth embodiment are denoted by the same reference characters. The illumination device 3003, as with the illumination unit 3104, is not limited to general illumination which continuously irradiates an imaging target with light, but also may be a light emission device called flash or electronic flash configured to irradiate the imaging target with light for a short period of time. The illumination device 3003 irradiates, in response to the light emission instruction from the exposure control unit 3103, the imaging target with a predetermined intensity of light.

According to the present embodiment, the captured image data of the anti-counterfeiting medium is compared with the reference image data which is a genuine anti-counterfeiting medium captured at the observation angle of the captured image data to determine whether the anti-counterfeiting medium is genuine or fake. Hence, without using a conventional special authenticity determination device, and without relying on the disposition condition of the anti-counterfeiting medium, authenticity determination of the anti-counterfeiting medium (genuine or fake) can be readily performed by capturing an image of the anti-counterfeiting medium with a simple image capturing device such as a general purpose digital camera.

Further, according to the present embodiment, since the illumination device 3003 is separated from the authenticity determination device 3001A or the imaging device 3002A, it is possible to capture the image data having the pattern of transmitted light at each observation angle α, corresponding to the anti-counterfeiting medium having different patterns of transmitted light depending on the observation angles α when the light emitted from the illumination device 3003 transmits through the anti-counterfeiting medium.

Furthermore, a program for implementing the functions of the authenticity determination device 1 of FIG. 1, the functions of the authenticity determination device 1A of FIG. 22, the functions of the authenticity determination device 3001 of FIG. 24, and the functions of the authenticity determination device 3001A of FIG. 38 according to the present invention may be stored in a computer-readable recording medium so that the program stored in the computer-readable recording medium can be loaded into a computer system to execute the program to thereby perform the authenticity determination of the anti-counterfeiting medium using the captured image data. The computer system should be construed to include operating systems (OS) and hardware such as peripheral devices.

Further, the computer system should be construed to include a World Wide Web (WWW) system provided with a website provision environment (or display environment). Further, the computer-readable recording medium refers to a mobile medium such as flexible disc, magneto-optical disk, read only memory (ROM), or compact disc-read only memory (CD-ROM), or a storage device such as hard disc built into the computer system. Moreover, the computer-readable recording medium should be construed to include devices that store programs for a certain period of time, such as volatile memory (random access memory (RAM)) in the computer system which serves as a server or client when a program is transmitted via a network such as the internet or a communication circuit such as a telephone line.

Furthermore, the above program may be transmitted from a computer system that stores the program in a storage device or the like to another computer system via a transmission medium or transmission waves in a transmission medium. The transmission medium that transmits the program refers to a medium having a function of transmitting information, including a network (communication network) such as the internet, and a communication circuit (communication line) such as a telephone line. The above program may be the one that implements part of the above functions. Further, the program may be a differential file (differential program) which implements the above functions when combined with a program pre-recorded in the computer system.

Reference Signs List 1, 1A, 1B, 3001, 3001A: Authenticity determination device (identification device); 2, 2A, 3002, 3002A: Imaging device; 3, 3003: Illumination device; 101, 3101: Imaging unit; 102, 3102: Imaging control unit; 103, 3103: Exposure control unit; 104, 3104: Illumination unit; 105, 3105: Observation angle estimation unit; 106: match-percentage notification unit; 107, 3106: Available image selecting unit; 108, 3107: Reference image generation unit; 109, 3108: Similarity calculation unit; 110, 3109: Authenticity determination unit; 111, 3110: Progress notification unit; 112, 3111: Display unit; 113, 3115: Image data storage unit; 200, 3200: Light source; 300, 3300: Credit card; 302, 3302: Relief structure forming layer; 310, 3310: First uneven structure; 320, 3320: Second uneven structure; 310, 3310: Bump; 330, 3330: Directional scattering structure; 331, 3331: Light scattering structure.

What is claimed is:

1. A computer readable medium including an identification program for causing a computer to execute an identification process for performing authenticity determination of an article provided with an anti-counterfeiting medium whose observed light pattern changes depending on an observation angle, the medium comprising instructions to cause the computer to perform the identification method comprising:
    calculating a degree of similarity between captured image data of the anti-counterfeiting medium and reference image data;
    performing authenticity determination as to whether the anti-counterfeiting medium is genuine or not on the basis of whether the degree of similarity exceeds a predetermined threshold or not; and
    notifying a match-percentage indicative of a degree of match between an imaging viewpoint for imaging the anti-counterfeiting medium and a reference imaging viewpoint which is predefined as the imaging viewpoint for the captured image data used for authenticity determination, wherein the notifying comprises calculating the match-percentage on the basis of an imaging angle difference and a coordinate value difference, which are differences between an imaging angle and an imaging device coordinate value of the imaging viewpoint and a reference imaging angle and a reference imaging device coordinate value of the reference imaging viewpoint, respectively, in a three-dimensional coordinate system.

2. The computer readable medium of claim 1, wherein the identification method comprises calculating and notifying the match-percentage of the imaging viewpoint for each reference imaging viewpoint, as well as a captured percentage of the captured image data which is required for authenticity determination.

3. The computer readable medium of claim 1, wherein the identification method further comprises generating the reference image data corresponding to the predefined reference imaging viewpoint, the reference image data being used for comparison with the captured image data of the anti-counterfeiting medium.

4. The computer readable medium of claim 1, wherein said performing authenticity determination comprises using a frame image corresponding to the reference imaging viewpoint of the reference image data as the captured image data from among frame images in a video of the anti-counterfeiting medium.

5. The computer readable medium of claim 1, wherein the identification method further comprises displaying an image corresponding to the captured image data, wherein the match-percentage notification unit displays a match-percentage indicator indicative of the match-percentage on a screen of the display unit to notify the match-percentage.

6. An identification method for performing authenticity determination of an article provided with an anti-counterfeiting medium whose observed light pattern changes depending on an observation angle, the method comprising:
    calculating a degree of similarity between captured image data of the anti-counterfeiting medium and reference image data, the degree of similarity being calculated by a similarity calculating unit;
    performing authenticity determination as to whether the anti-counterfeiting medium is genuine or not on the basis of whether the degree of similarity exceeds a predetermined threshold or not, the authenticity determination being performed by an authenticity determination unit; and
    notifying a match-percentage indicative of a degree of match between an imaging viewpoint for imaging the anti-counterfeiting medium and a reference imaging viewpoint which is predefined as the imaging viewpoint for the captured image data used for authenticity determination, the match-percentage being notified by a match-percentage notification unit, wherein the notifying comprises calculating the match-percentage on the basis of an imaging angle difference and a coordinate value difference, which are differences between an imaging angle and an imaging device coordinate value of the imaging viewpoint and a reference imaging angle and a reference imaging device coordinate value of the reference imaging viewpoint, respectively, in a three-dimensional coordinate system.

7. An identification device that performs authenticity determination of an article provided with an anti-counterfeiting medium whose observed light pattern changes depending on an observation angle, the identification device comprising:

a similarity calculating unit that calculates a degree of degree of similarity between captured image data of the anti-counterfeiting medium and reference image data;

an authenticity determination unit that performs authenticity determination as to whether the anti-counterfeiting medium is genuine or not on the basis of whether the degree of similarity exceeds a predetermined threshold or not; and a progress notification unit that calculates and notifies a degree of progress, which is a ratio of a completed number of authenticity determinations to a predetermined number of authenticity determinations to thereby indicate a progress state of the authenticity determination.

8. The identification device of claim 7, wherein the progress notification unit calculates the degree of progress as a ratio of the number of pieces of captured image data which are determined to be "genuine" with respect to a predetermined reference image data to a predetermined number of pieces of reference image data.

9. The identification device of claim 8, wherein the reference image data is obtained for each predetermined imaging angle, and the degree of progress is calculated including the number of pieces of captured image data captured at an imaging angle corresponding to the predetermined imaging angle.

10. The identification device of claim 7, further comprising a reference image generation unit that generates the reference image data corresponding to the predefined imaging viewpoint, the reference image data being used for comparison with the captured image data in which the anti-counterfeiting medium is captured.

11. The identification device of claim 7, wherein the authenticity determination unit uses a frame image corresponding to the imaging viewpoint of the reference image data as the captured image data from among frame images in a video of the anti-counterfeiting medium.

12. The identification device of claim 7, further comprising a display unit that displays an image corresponding to the captured image data, wherein the progress notification unit displays a progress indicator indicative of the degree of progress on a screen of the display unit to notify the degree of progress.

13. A computer readable medium including an identification program for causing a computer to execute an identification process for performing authenticity determination of an article provided with an anti-counterfeiting medium whose observed light pattern changes depending on an observation angle, the medium comprising instructions to cause the computer to perform the identification process comprising:

calculating a degree of similarity between captured image data of the anti-counterfeiting medium and reference image data;

performing authenticity determination as to whether the anti-counterfeiting medium is genuine or not on the basis of whether the degree of similarity exceeds a predetermined threshold or not; and calculating and notifying a degree of progress, which is a ratio of a completed number of authenticity determinations to a predetermined number of authenticity determinations to thereby indicate a progress state of the authenticity determination.

14. An identification method for performing authenticity determination of an article provided with an anti-counterfeiting medium whose observed light pattern changes depending on an observation angle, the method comprising:

calculating a degree of similarity between captured image data of the anti-counterfeiting medium and reference image data, the degree of similarity being calculated by a similarity calculating unit;

performing authenticity determination as to whether the anti-counterfeiting medium is genuine or not on the basis of whether the degree of similarity exceeds a predetermined threshold or not, the authenticity determination being performed by an authenticity determination unit; and notifying a match-percentage indicative of a degree of match between an imaging viewpoint for imaging the anti-counterfeiting medium and a reference imaging viewpoint which is predefined as the imaging viewpoint for the captured image data used for authenticity determination, the match-percentage being notified by a match-percentage notification unit, wherein the match-percentage notification unit calculates and notifies the match-percentage of the imaging viewpoint for each reference imaging viewpoint, as well as a captured percentage of the captured image data which is required for authenticity determination.

15. A computer readable medium including an identification program for causing a computer to execute an identification process for performing authenticity determination of an article provided with an anti-counterfeiting medium whose observed light pattern changes depending on an observation angle, the medium comprising instructions to cause the computer to perform the identification method comprising:

calculating a degree of similarity between captured image data of the anti-counterfeiting medium and reference image data;

performing authenticity determination as to whether the anti-counterfeiting medium is genuine or not on the basis of whether the degree of similarity exceeds a predetermined threshold or not; and notifying a match-percentage indicative of a degree of match between an imaging viewpoint for imaging the anti-counterfeiting medium and a reference imaging viewpoint which is predefined as the imaging viewpoint for the captured image data used for authenticity determination, wherein the notifying comprises calculating and notifying the match-percentage of the imaging viewpoint for each reference imaging viewpoint, as well as a captured percentage of the captured image data which is required for authenticity determination.

* * * * *